US011900086B2

(12) United States Patent
Haile et al.

(10) Patent No.: US 11,900,086 B2
(45) Date of Patent: Feb. 13, 2024

(54) SYSTEMS AND METHODS FOR ARCHITECTURE-INDEPENDENT BINARY CODE ANALYSIS

(71) Applicant: BATTELLE ENERGY ALLIANCE, LLC, Idaho Falls, ID (US)

(72) Inventors: Jedediah T. Haile, Idaho Falls, ID (US); Bryan R. Beckman, Idaho Falls, ID (US); Sage R. Havens, Idaho Falls, ID (US); Jared A. Verba, Idaho Falls, ID (US); Garrett W. Larsen, Idaho Falls, ID (US); May R. Chaffin, Idaho Falls, ID (US); Rita A. Foster, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 209 days.

(21) Appl. No.: 17/505,613

(22) Filed: Oct. 19, 2021

(65) Prior Publication Data
US 2022/0121429 A1 Apr. 21, 2022

Related U.S. Application Data

(60) Provisional application No. 63/094,331, filed on Oct. 20, 2020.

(51) Int. Cl.
*G06F 8/41* (2018.01)
*G06F 8/52* (2018.01)

(52) U.S. Cl.
CPC ............... *G06F 8/44* (2013.01); *G06F 8/427* (2013.01); *G06F 8/43* (2013.01); *G06F 8/52* (2013.01)

(58) Field of Classification Search
None
See application file for complete search history.

(56) References Cited

U.S. PATENT DOCUMENTS

| | | | |
|---|---|---|---|
| 6,154,844 A | 11/2000 | Touboul et al. | |
| 6,965,968 B1 | 11/2005 | Touboul et al. | |
| 9,846,776 B1 | 12/2017 | Paithane et al. | |
| 10,089,460 B2 | 10/2018 | Moon et al. | |
| 10,282,368 B2 * | 5/2019 | Larsen | G06F 16/954 |
| 10,929,532 B1 * | 2/2021 | Margaritelli | G06N 20/00 |
| 2011/0138370 A1 * | 6/2011 | Albert | G06F 9/543 |
| | | | 717/136 |

(Continued)

OTHER PUBLICATIONS

Hwang et al., "Platform-Independent Malware Analysis Applicable to Windows and Linux Environments," MDPI Electronics, May 12, 2020, 18pg. (Year: 2020).*

(Continued)

*Primary Examiner* — Ryan D. Coyer

(57) ABSTRACT

Binaries configured for execution within respective computing environments may be disassembled into architecture-specific intermediate (AIL) representations. The AIL representations may be converted into canonical intermediate language (CIL) representations. The CIL representations may comprise normalized, architecture-independent code configured to characterize functionality of respective components of a binary (e.g., respective functions or the like). Feature vectors may be extracted from the CIL representations. The feature vectors may be used to identify components of respective binaries, assign security classifications to the binaries, and/or the like.

25 Claims, 28 Drawing Sheets

1400 ⟶

Generate a normalized, architecture-independent representation of a binary
1410

Extract a feature vector for the binary from the normalized, architecture-independent representation of the binary
1420

Apply a security classification to the binary in response to classification of the feature by a machine-learned classifier
1430

(56) References Cited

U.S. PATENT DOCUMENTS

2021/0211291 A1* 7/2021 Jindal .................. H04L 9/3231

OTHER PUBLICATIONS

Losche et al., "A Platform Independent Malware Analysis Framework," IEEE, 2015, 5pg. (Year: 2015).*

Namani et al., "Symbolic execution based feature extraction for detection of malware," IEEE, Oct. 16, 2020, 6pg. (Year: 2020).*

Naz et al., "Review of Machine Learning Methods for Windows Malware Detection," IEEE, 2019, 6pg. (Year: 2019).*

F. Artuso, G. Di Luna, L. Massarelli, L. Querzoni. "In Nomine Function: Naming Functions in Stripped Binaries with Neural Networks" arXiv preprint arXiv:1912.07946 (Dec. 17, 2019).

P. Haridas, G. Chennupati, N. Santhi, P. Romero and S. Eidenbenz, "Code Characterization With Graph Convolutions and Capsule Networks," in IEEE Access, vol. 8, pp. 136307-136315, 2020, doi: 10.1109/ACCESS.2020.3011909.

Nal Kalchbrenner and Phil Blunsom. 2013. "Recurrent Continuous Translation Models. In Proceedings of the 2013 Conference on Empirical Methods in Natural Language Processing," pp. 1700-1709, Seattle, Washington, USA. Association for Computational Linguistics.

Popel, M., Tomkova, M., Tomek, J. et al. "Transforming machine translation: a deep learning system reaches news translation quality comparable to human professionals." Nat Commun 11, 4381 (2020). https://doi.org/10.1038/s41467-020-18073-9.

Denny Britz et al, "Massive Exploration of Neural Machine Translation Architectures," arXiv:1703.03906 (Mar. 11, 2017).

Liu, Zhiyuan & Han, Xianpei. (2018). "Deep Learning in Knowledge Graph." 10.1007/978-981-10-5209-5_5; Deep Learning in Natural Language Processing (pp. 117-145) (2018).

Liu, Zhiyuan & Han, Xianpei. (2018). "Deep Learning in Machine Translation." 10.1007/978-981-10-5209-5_5; Deep Learning in Natural Language Processing (pp. 147-183) (2018).

Luong, Thang, Hieu Pham and Christopher D. Manning. "Effective Approaches to Attention-based Neural Machine Translation." EMNLP (2015).

Meemulla Kandi, Shabeel. (2018). "Language Modelling for Handling Out-of-Vocabulary Words in Natural Language Processing." 10.13140/RG.2.2.32252.08329.

Babii, H., Janes, A., & Robbes, R. (2019). "Modeling Vocabulary for Big Code Machine Learning." ArXiv, abs/1904.01873.

Ashish Vaswani et al. "Attention is all you need." NIPS'17: Proceedings of the 31st International Conference on Neural Information Processing Systems, Dec. 2017 pp. 6000-6010.

* cited by examiner

700 ↘
╭─715
│ [ select from library ]
↓

| METADATA (MD) | | | PROPERTIES | | | |
|---|---|---|---|---|---|---|
| @rid | @ver | @class | analyzed | arch | base | name |
| #169:0 | 2 | library | true | x86_64 | /lib64 | ld-linux-x86-64.s0.2 |
| #169:1 | 42 | library | true | x86_64 | /lib/x86_64-linux-gnu | libexpat.so.1.6.7 |
| #169:2 | 42 | library | true | thumb2 | var/run/schroot/mount/trusty-amd64-armhf-311b4110-4732-4eaf-bb82-fbf7ca54d5/3/lib/arm-linux-gnueabihf | ld-2.19.so |
| #170:0 | 3 | library | true | x86_64 | /lib/x86_64-linux-gnu | ld-2.27.s0 |
| #170:1 | 42 | library | true | x86_64 | /lib/x86_64-linux-gnu | libuuid.so.1 |
| ... | ... | ... | ... | ... | ... | ... |

--- continued ---

| MD | PROPERTIES (cont.) | | | IN | OUT | ... |
|---|---|---|---|---|---|---|
| @rid | path_to_file | uid | version | calls | has_function | ... |
| #169:0 | /lib64/ld-linux-x86-64.so.2 | 25 | .27-3ubuntu1 | | #449:6, #449:9, #449:82, #449:85, #450:6, #450:9, [...More (187)] | ... |
| #169:1 | /lib/x86_64-linux-gnu/libexpat.so.1.6.7 | 26 | 2.2.5-3 | | #449:112, #449:123, #449:124, #450:122, #450:123, #451:122 [...More (103)] | |
| #169:2 | /var/run/schroot/mount/trusty-amd64-armhf-3f1b4110-4732-4eaf-bb82-fbf7ca54d5f3/lib/arm-linux-gnueabihf/ld-2.19.so | 35 | | | #449:153, #449:154, #450:150, #450:151, #450:152, #450:153 [...More (99)] | |
| #170:0 | fib/x86_64-linux-gnu/ld-2.27.s0 | 11 | 2.27 | | #449:0, #449:3, #449:61, #449:64, #449:67, #449:70 [...More (186)] | |
| #170:1 | /lib/x86_64-linux-gnu/libuuid.so.1 | 27 | 231.1-0.4ubuntu3.2 | | #449:125, #449:126, #451:125, #452:124, #452:125, #454:125 [...More (36)] | |
| ... | ... | ... | ... | ... | ... | ... |

716
[select from function]

| METADATA (MD) | | | PROPERTIES | | | |
|---|---|---|---|---|---|---|
| @rid | @ver | @class | analyzed | uid | name | library |
| #209:0 | 2 | function | true | 4482 | _start | #170:0 |
| #209:1 | 2 | function | true | 6987 | wstool__wcstoul_internal | #172:0 |
| #209:2 | 2 | function | true | 7568 | sub_15db10 | #172:0 |
| #209:3 | 2 | function | true | 9301 | sub_17f70 | #169:0 |
| #209:4 | 2 | function | true | 5149 | sub_b9c60 | #172:0 |
| #209:5 | 2 | function | true | 7408 | ether_ntohost | #172:0 |
| #209:6 | 2 | function | true | 9190 | sub_1a00 | #169:0 |
| #209:7 | 2 | function | true | 6868 | argz_add | #172:0 |
| #209:8 | 2 | function | true | 7221 | sub_10eb80 | #172:0 |
| #209:9 | 2 | function | true | 9136 | adler32_combine | #181:0 |
| ... | ... | ... | ... | ... | ... | ... |

----- continued -----

| MD | IN | | OUT | ... |
|---|---|---|---|---|
| @rid | has_function | calls | has_block | ... |
| #209:0 | #482:51 | | #411:42 | |
| #209:1 | #455:99 | #753:0, #742:518 | #433:15 | |
| #209:2 | #454:20 | | #431:115 | |
| #209:3 | #462:97 | #735:55, #761:82, #734:124, #766:137, #758:151, #741:179, [...More] | #410:57 | |
| #209:4 | #452:80 | | #433:9 | |
| #209:5 | #455:87 | | #443:24 | |
| #209:6 | #458:100 | | #440:23 | |
| #209:7 | #482:77 | #741:457, #763:3, #768:169, #738:225 | #427:64 | |
| #209:8 | #459:29 | #737:428 | #432:57 | |
| #209:9 | #483:2 | | #447:65 | |
| ... | ... | ... | ... | ... |

FIG. 7D 702 select from block

METADATA (MD)

| @rid | @ver | @class | uid | PROPERTIES | | | | |
|---|---|---|---|---|---|---|---|---|
| | | | | name | feature | block_id | library | function |
| #129:0 | 2 | block | 116002 | block0_0x13070 | #103:164 | 0 | #170:0 | #220:18 |
| #129:1 | 2 | block | 117576 | block13_0x14e38 | #90:1 | 13 | #170:0 | #216:85 |
| #129:2 | 2 | block | 119178 | block41_0x1ecc0 | #89:2386 | 41 | #170:0 | #247:60 |
| #129:3 | 2 | block | 120783 | block136_0x18a05 | #106:3044 | 136 | #170:0 | #220:15 |
| #129:4 | 2 | block | 122384 | block344_0x363c | #112:3127 | 344 | #170:0 | #227:106 |
| #129:5 | 2 | block | 124957 | block0_0_0x11e630 | #125:4 | 0 | #170:0 | #213:59 |
| #129:6 | 2 | block | 124978 | block0_0_0x123810 | #122:415 | 0 | #172:0 | #238:107 |
| #129:7 | 2 | block | 127564 | block1_0_0x1464c7 | #107:664 | 1 | #172:0 | #210:120 |
| #129:8 | 2 | block | 128395 | block1_0_0x1385e0 | #91:254 | 1 | #172:0 | #238:16 |
| #129:9 | 2 | block | 130753 | block3_0_0x11e488 | #95:2886 | 3 | #172:0 | #228:34 |
| ... | | | | | | | | |

718 continued

| MD | IN | | | | | OUT | | | | |
|---|---|---|---|---|---|---|---|---|---|---|
| @rid | has_blk | br_uncond | br_true | br_false | has_feature | next_inst | br_true | br_false | br_uncond | calls |
| #129:0 | #445:92 | | | | #524:3120 | #975:5376 | | | | |
| #129:1 | | #647:349 | #725:1135 | | #507:329 | #1002:4036 | #713:1004 | #685:1004 | #631:1079 | |
| #129:2 | | | #727:1571 | | #515:494 | #993:5397 | #727:1224 | #661:264 | | |
| #129:3 | | | | #672:1660 | #525:659 | #977:4046 | #726:700 | #679:1137 | | |
| #129:4 | | | | #668:439 | #499:660 | #979:7072 | | | | |
| #129:5 | #428:66 | | | | #498:1483 | #982:10433 | #694:1703 | #665:832 | | #729:497, #734:139 |
| #129:6 | #440:12 | | | #667:220 | #489:2223 | #999:6401 | | | | |
| #129:7 | | | #706:1268 | | #502:2388 | #996:7130 | #701:751 | #671:1406 | | #766:3 |
| #129:8 | | | #721:664 | | #523:1896 | #1001:6414 | #697:443 | #674:1357 | | #743:346 |
| #129:9 | | | #713:616 | | #527:1322 | | | | | |
| ... | | | | | | | | | | ... |

METADATA (MD)

| @rid | @ver | @class | analyzed | PROPERTIES ||||||
|------|------|--------|----------|-----|------|---------|---------|--------|----------|
|      |      |        |          | uid | name | library | feature | blk_id | function |
| #209:7 | 2 | function | true | 6868 | argz_add | #172:0 | | | |
| #130:2226 | 2 | block | true | 127173 | block1_0xa0cf0 | #172:0 | #106:1157 | 1 | #218:28 |
| #106:1157 | 2 | feature | true | | | | | | |
| #141:2307 | 2 | block | true | 125917 | block0_0xa0c00 | #172:0 | #102:2225 | 0 | #218:28 |
| #102:2225 | 2 | feature | true | | | | | | |
| #218:28 | 2 | function | true | 5074 | argz_insert | #172:0 | | | |
| #172:0 | 2 | library | true | 13 | libc-2.27.so | | | | |
| #165:171 | 2 | block | true | 127716 | block1_0x1667d8 | #172:0 | #102:2638 | 1 | #238:74 |
| #102:2638 | 2 | feature | true | | | | | | |
| #148:914 | 2 | block | true | 132969 | block4_0x16680c | #172:0 | #99:1079 | 4 | #238:74 |
| ... | | | | | | | | | |

------- continued -------

PROPERTIES (cont.)

| MD @rid | const | call | stack | assn | reg | math | ret | syscall | noret | cmp | flag | ctrl | nop | phi | cast | stop | jump |
|---------|-------|------|-------|------|-----|------|-----|---------|-------|-----|------|------|-----|-----|------|------|------|
| #209:7 | | | | | | | | | | | | | | | | | |
| #130:2226 | | | | | | | | | | | | | | | | | |
| #106:1157 | 2 | 1 | 6 | 8 | 2 | 1 | 0 | 0 | 0 | 0 | 0 | 0 | 0 | 0 | 0 | 0 | 0 |
| #141:2307 | | | | | | | | | | | | | | | | | |
| #102:2225 | 10 | 0 | 6 | 3 | 10 | 1 | 0 | 0 | 0 | 1 | 0 | 1 | 0 | 1 | 0 | 0 | 0 |
| #218:28 | | | | | | | | | | | | | | | | | |
| #172:0 | | | | | | | | | | | | | | | | | |
| #102:2638 | 8 | 1 | 0 | 7 | 7 | 4 | 0 | 1 | 0 | 1 | 0 | 1 | 0 | 1 | 0 | 0 | 0 |
| #148:914 | | | | | | | | | | | | | | | | | |
| ... | | | | | | | | | | | | | | | | | |

| MD | | | PROPERTIES (cont.) | | | |
|---|---|---|---|---|---|---|
| @rid | arch | base | path_to_file | version | calls | has_function |
| #209:7 | | | | | #741:457, #763:3, #768:169, #738:225 | #482:77 |
| #130:2226 | | | | | | |
| #106:1157 | | | | | | |
| #141:2307 | | | | | | |
| #102:2225 | | | | | | |
| #218:28 | | | | | | #479:100 |
| #172:0 | X8_64 | /lib/x86_6-linux-gnu | /lib/x86_64-linux-gnu/libc-2.27.so | 2.27 | #750:43, #747:319, #760:305, #729:471, #756:306, #758:403, [...More(5)] | |
| #165:171 | | | | | | |
| #102:2638 | | | | | | |
| #148:914 | | | | | | |
| ⋮ | ⋮ | | | | ⋮ | ⋮ |

```
Select segments of binary for computing architecture analysis
                            1310
```

```
Extract computing architecture features from the selected segments
                         of the binary
                            1320
```

```
Utilize machine-learned computing architecture classifier to
    determine the computing architecture of binary
                         1330
```

```
Generate a normalized, architecture-independent representation of a
                            binary
                            1410
```

```
Extract a feature vector for the binary from the normalized,
architecture-independent representation of the binary
                         1420
```

```
Apply a security classification to the binary in response to
classification of the feature by a machine-learned classifier
                         1430
```

FIG. 14

SYSTEMS AND METHODS FOR ARCHITECTURE-INDEPENDENT BINARY CODE ANALYSIS

CROSS-REFERENCE TO RELATED APPLICATIONS

This application claims priority to U.S. Provisional Patent Application No. 63/094,331, filed Oct. 20, 2020, which is hereby incorporated by reference in its entirety.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

BACKGROUND

Critical infrastructure devices can be attacked through software vulnerabilities. Although it may be possible to identify some types of vulnerabilities by analyzing the underlying binary code, or intermediate representations of that code, binary analysis techniques can have significant limitations. These techniques are often only capable of detecting known threats, are platform specific, and can be thwarted by modifications unrelated to functionality, such as compiler settings, optimization, obfuscation, or the like. Moreover, behavior-based analysis that utilize information captured during execution (or emulated execution) can be highly architecture-specific and, as such, may suffer from similar limitations.

BRIEF DESCRIPTION OF THE DRAWINGS

The details of one or more implementations of machine learning and/or machine-learned (ML) architecture-independent binary analysis are set forth in the accompanying figures and the detailed description below.

FIG. 7C illustrates an example of a binary view of a datastore comprising normalized, architecture-independent representations of binaries, as disclosed herein.

FIG. 7D illustrates an example of a function view of a datastore comprising normalized, architecture-independent representations of binaries, as disclosed herein.

FIG. 7E illustrates an example of a code-block view of a datastore comprising normalized, architecture-independent representations of binaries, as disclosed herein.

FIGS. 7F and 7G illustrate an example of a traversal view of a datastore comprising normalized, architecture-independent representations of binaries, as disclosed herein.

FIG. 13 illustrates a flow diagram of an example of a method for determining the computing architecture and/or endianness of a binary.

FIGS. 14-15 are flow diagrams illustrating examples of methods for architecture-independent binary analysis, as disclosed herein.

DETAILED DESCRIPTION

Figure 1A:
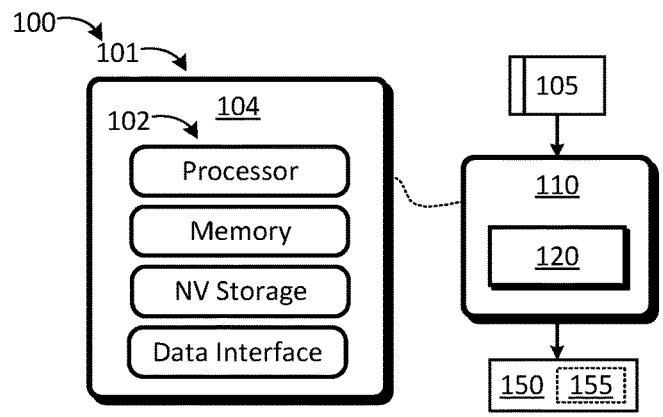
FIG. 1A illustrates an example of a system configured to implement aspects of architecture-independent binary analysis, as disclosed herein.

Critical systems may be vulnerable to attack through software. Although it may be possible to identify some types software vulnerabilities through binary code analysis, these techniques can have significant limitations. For example, binary analysis techniques may be limited to detecting known threats, be platform specific, and may modifications unrelated to functionality, such as compiler settings, optimization, obfuscation, and so on. Furthermore, techniques behavior information captured during execution (or emulated execution) can be highly architecture-specific and, as such, may suffer from similar limitations. What is needed, therefore, are systems and methods for platform-independent, functionality-based binary code analysis.

Many techniques for vulnerability analysis can have significant disadvantages. Techniques that rely on patterns in architecture-specific representations, such as binary code, assembly, and/or other intermediate forms, are only capable of detecting known threats. Techniques that rely on non-normalized and/or non-canonical representations are susceptible to being thwarted by minor changes, which may not affect functionality, such as compiler settings, optimizations, static versus dynamic linking, compilation on different architectures, and/or the like. Binary code representations may not adequately express code semantics or structure and, as such, may be unsuitable for use with more sophisticated analysis techniques, such as machine learning. Moreover, the use of architecture-specific references in conventional representations, such as memory addresses and/or the like, may produce intractable namespaces that are not feasible for translation to machine learning models and/or vocabularies. Although behavior-based analysis has been performed in limited contexts, these approaches rely on information captured during execution (and/or emulated execution), which is highly architecture-specific and can be easily bypassed.

This disclosure describes systems, methods, and apparatus for ML-enabled software analysis. In contrast with conventional software representations, the disclosure describes a canonical intermediate language (CIL) configured to provide a normalized, architecture-independent representation of binary code. The CIL representation of a binary may comprise CIL code, e.g., a set of CIL instructions. The CIL code may comprise a normalized, architecture-independent representation of the functionality implemented by the binary. The CIL code generated for a binary may be further configured to encode semantics and/or structure of the binary (and/or respective modules thereof), while limiting the scope of the vocabulary of the CIL.

The following discussion describes an operating environment, techniques that may be employed in the operating environment, and a system in which components of the operating environment can be embodied. In the context of the present disclosure, reference is made to the operating environment by way of example only.

FIG. 1A illustrates an example of an operating environment for architecture independent binary analysis. The operating environment may include a binary analysis system 100. The binary analysis system 100 may comprise an apparatus or device configured to implement aspects of architecture-independent binary analysis (a binary analysis device 101). The binary analysis device 101 may comprise and/or be embodied by computing resources 102. The computing resources 102 may include, but are not limited to: a processor, a memory, non-volatile (NV) storage, a data interface, and/or the like.

The processor may include any suitable processing resources, such as logic circuitry, processing circuitry, computation circuitry, a processing unit, a central processing unit (CPU), a processor core, an Arithmetic Logic Unit (ALU), a general-purpose processor, an application-specific integrated circuit (AILC), programmable processing elements, programmable logic, a Field Programmable Gate Array (FPGA), and/or the like. The memory may include any suitable memory resource, such as volatile memory, non-volatile memory, random access memory (RAM), dynamic RAM (DRAM), synchronous DRAM (SDRAM), static RAM (SRAM), cache memory, and/or the like. The NV storage may include any suitable non-transitory, persistent, and/or NV storage resource, including, but not limited to: a non-transitory storage device, a persistent storage device, an internal storage device, an external storage device, a remote storage device, Network Attached Storage (NAS) resources, a magnetic disk drive, a hard disk drive (HDD), a solid-state storage device (SSD), a Flash memory device, and/or the like. The data interface may include any suitable data and/or communication resource such as, an input/output (I/O) interface, an I/O port, a communication interface, a network interface, a Universal Serial Bus (USB) interface, and/or the like.

The computing resources 102 may be implemented and/or embodied by one or more hardware components and/or devices, such as a computing device 104. The computing device 104 may be comprise one or more of a personal computer, a desktop computer, a server computer, a general-purpose computing device, an application-specific computing device, a portable computing device, a laptop, a tablet, a smartphone, a virtual machine, a virtual computing system, a virtual computing environment, a distributed computing system, a cluster computing system, a grid computing system, and/or the like.

The system 100 may comprise a binary analysis platform 110. The binary analysis platform 110 may comprise and/or embodied by a computer-implemented application, library, service, and/or the like. The binary analysis platform 110 may be configured for operation on computing resources 102 of the computing device 104. The binary analysis application may comprise and/or be embodied by computer-readable instructions stored on a non-transitory storage medium, such as the NV storage of the computing device 104. The computer-readable instructions may be configured to cause the processor of the computing device 104 to implement aspects of architecture-independent binary analysis, as disclosed herein. Alternatively, or in addition, portions of the binary analysis system 100, binary analysis device 101, and/or binary analysis platform 110 may be implemented and/or embodied by hardware components, such as application-specific circuitry, programmable circuitry, an FPGA, hardware components of the computing device 104, one or more peripheral devices, coprocessors, and/or the like.

The binary analysis platform 110 may be configured to analyze a binary 105 for potential security threats and/or vulnerabilities. The binary 105 may comprise any suitable form of electronic data including, but not limited to: a bit sequence, a byte sequence, a word sequence, a dword sequence, binary data, binary code, machine code, machine-readable code, computer-readable code, an executable, executable code, an application, application code, a program, a service, a module, a software module, a code module, a loadable module, a library, a static link library, a dynamic link library, a driver, a device driver, firmware, a firmware module, firmware code, and/or the like.

The binary analysis platform 110 may be configured to generate normalized, architecture-independent representations of binaries 105 (CIL representations 120), which may be adapted to capture and/or preserve the structure and/or semantics of the binaries 105. As disclosed in further detail herein, the CIL representation 120 of a binary 105 may comprise a normalized, architecture-independent characterization of the functionality implemented by the binary 105 (e.g., may comprise canonical representations of respective functions of the binary 105).

The CIL representations 120 may be utilized in binary analysis tasks, such as component matching, security threat and/or vulnerability identification, function encoding, instruction encoding, and/or the like. The binary analysis platform 110 may receive a binary 105 and, in response, produce analysis data 150 for the binary 105. The analysis data 150 may include security label 155. The security label 155 may be configured to quantify and/or represent a security threat posed by the binary 105. The security label 155 may comprise and/or reference any suitable information pertaining to security threats and/or vulnerabilities associated with the binary 105, including, but not limited to: a text label, a semantic label, a symbol, an ML label, a classification label, a quantity indicating a degree and/or confidence that the binary 105 is free from security threats and/or vulnerabilities (a trust metric), a quantity indicating a degree and/or confidence that the binary 105 is associated with security threats and/or vulnerabilities (a threat metric and/or vulnerability metric), an identifier or reference to security threats and/or vulnerabilities associated with the binary 105 (if any), an identifier or reference to security threats and/or vulnerabilities associated with binaries 105 that are functionally similar (or equivalent) to the binary 105, an identifier or reference to components of the binary 105 (e.g., functions and/or code blocks) that are functionally similar (or equivalent) to components associated with security threats and/or vulnerabilities, and/or the like.

Figure 1B:
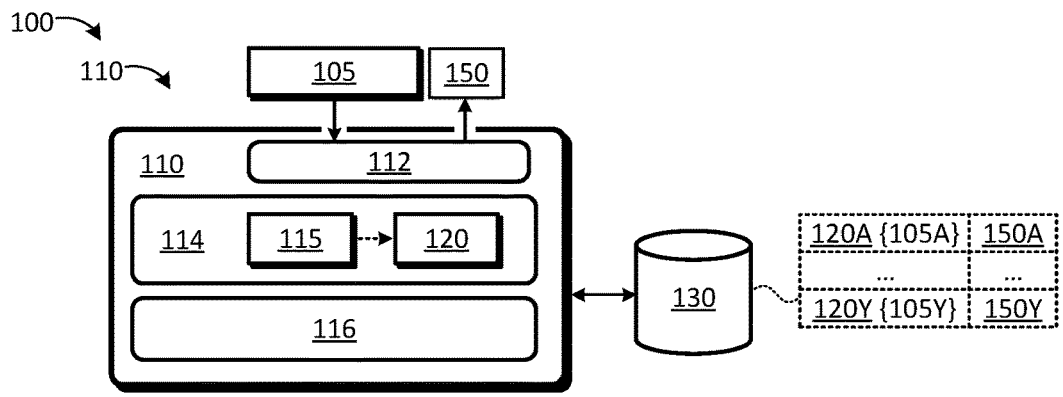
FIG. 1B illustrates an example of a binary analysis module.

FIG. 1B illustrates another example of a binary analysis system 100 comprising a binary analysis platform 110. The binary analysis platform 110 may be implemented as a component or module of a binary analysis device 101; in some implementations, the binary analysis platform 110 may be configured for operation on computing resources 102 of a computing device 104, as illustrated in FIG. 1A. Portions of the binary analysis platform 110 may be implemented and/or embodied by computer-readable code stored on a non-transitory storage medium (e.g., NV storage of the computing device 104). Alternatively, or in addition, portions of the binary analysis platform 110 may be implemented by hardware components, such as application-specific circuitry, programmable circuitry, and/or the like.

The binary analysis platform 110 may receive binaries 105 (and/or information pertaining to binaries 105) and output corresponding analysis data 150 through an interface 112. The interface 112 may be coupled to the data interface of a computing device (e.g., a data interface of the computing device 104). The interface 112 may comprise and/or implement an application programming interface (API) or the like. In some implementations, the interface 112 may be coupled to an electronic communication network, such as an Internet Protocol (IP) network, local area network (LAN), wide area network (WAN), secure network, internal network, virtual private network (VPN), and/or the like.

The binary 105 may be configured for operation on a particular computing architecture (e.g., may be compiled or targeted to the particular computing architecture). As used herein, a "computing architecture" may refer an architecture of computing hardware (e.g., the functionality, organization, and/or implementation of a computer system), such as a microarchitecture, system design, instruction set architecture (ISA), and/or the like. A computing architecture also refer to a computing environment or platform configured to manage execution of computer-readable code, such as an operating system, database management system, operational technology (OT) system, cyber-physical system, control system, virtual machine, virtual execution environment, sandbox, script execution environment, and/or the like.

The binary analysis platform 110 may include and/or be coupled to a normalization module 114. The normalization module 114 may be configured to generate CIL representations 120 of binaries 105. The CIL representation 120 of a binary 105 may be generated in a normalized, architecture independent reverse engineering (CILRE) process implemented by the normalization module 114. Implementing the normalization process on a binary 105 may comprise: a) producing an architecture-specific intermediate language (AIL) representation 115 of the binary 105, and b) deriving a CIL representation 120 of the binary 105 from the AIL representation 115. The AIL representation 115 may include any suitable architecture-specific representation including, but not limited to: intermediate language code, architecture-specific intermediate language code, assembly language (asm) code, raw asm, bytecode, portable code (p-code), Low-Level Intermediate Language (LLIL) code, a syntax tree, an abstract syntax tree (AST), and/or the like. In some implementations, the AIL representation 115 of a binary 105 may be produced by decompiling and/or disassembling the binary 105. The AIL representation 115 may be generated by use of one or more architecture-specific (or architecture-aware) tools or components.

The binary analysis platform 110 may further include and/or be coupled to an analysis module 116. The analysis module 116 may be configured to produce analysis data 150 for the binary 105 based, at least in part, on the CIL representation 120 of the binary 105. The analysis data 150 may include security label 155, which may indicate a degree and/or confidence that the binary 105 and/or components thereof pose security threats and/or vulnerabilities, identify security threats and/or vulnerabilities associated with the binary 105 and/or components thereof (if any), and/or the like.

The binary analysis platform 110 may further comprise and/or be coupled to a datastore 130. The datastore 130 may be maintained on persistent, non-transitory storage resources of a computing system, such as an internal storage device, an external storage device, a NV storage device, an NV storage system, NV storage resources of the computing device 104, a remote storage device, NAS, a database management system (DBMS), a distributed storage system, a cluster storage system, a grid storage system, a cloud storage system, a graph datastore, a soft schema datastore, and/or the like. The datastore 130 may be configured to maintain CIL representations 120 of binaries 105. In the FIG. 1B example, the datastore 130 may comprise a plurality of CIL representations 120 (e.g., CIL representations 120A-Y of binaries 105A-Y). The CIL representations 120 maintained within the datastore 130 may comprise analysis data 150 for respective binaries 105 (e.g., analysis data 150A-Y for binaries 105A-Y). The datastore 130 may comprise and/or be coupled to an interface (e.g., the interface 112). The interface 112 may be configured to provide access to the datastore 130 and/or data stored therein through a suitable interface mechanism, such as an API, a representational state transfer (REST) API or the like.

The normalization module 114 may produce AIL representations 115 by use of architecture-specific tools or components. In some implementations, the computing architecture of a binary 105 may not be known. As such, the binary analysis platform 110 may comprise and/or be coupled to means for determining information pertaining to the computing architectures to which binaries 105 are targeted (e.g., identify computing architectures on which respective binaries 105 are configured to operate).

Figure 2:
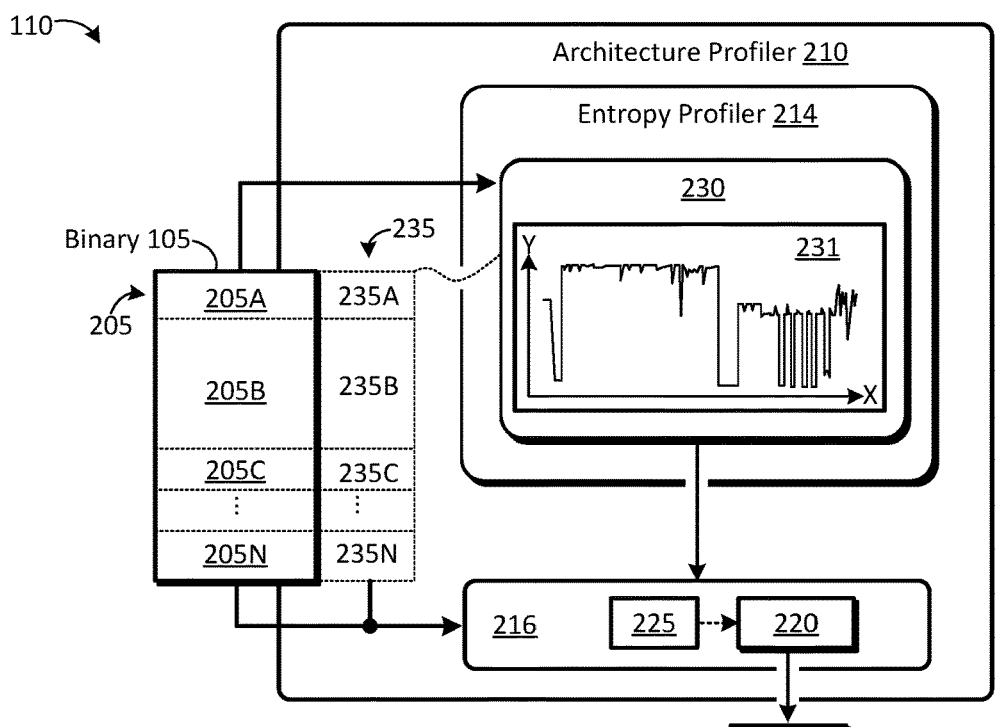
FIG. 2 illustrates an example of an architecture profiler.

FIG. 2 illustrates an example of an architecture profiler 210. The architecture profiler 210 may be implemented as a component or module of a binary analysis device 101; in some implementations, the architecture profiler 210 may be configured for operation on computing resources 102 of a computing device 104, as illustrated in FIG. 1A. Portions of the architecture profiler 210 may be implemented and/or embodied by computer-readable code stored on a non-transitory storage medium (e.g., NV storage of the computing device 104). Alternatively, or in addition, portions of the architecture profiler 210 may be implemented by hardware components, such as application-specific circuitry, programmable circuitry, and/or the like.

The architecture profiler 210 may be configured to determine computing architecture (CA) metadata 250 for a binary 105. The CA metadata 250 determined for a binary 105 may include any suitable information, including, but not limited to: the computing architecture corresponding to the binary 105 (e.g., identify the computing architecture on which the binary 105 is configured to operate), a format of the binary 105, an endianness of the binary 105, and/or the like.

The architecture profiler 210 may include an entropy profiler 214, which may be configured determine an entropy profile 230 for the binary 105. In some implementations, the entropy profile 230 quantifies entropy of the binary 105 versus code size (entropy versus the size and/or extent of the binary 105). Alternatively, or in addition, the entropy profile 230 may quantify entropy at respective locations within the binary 105. The entropy profiler 214 may be configured to quantify entropy of the binary 105 from an initial location (a head of the binary 105, such as address 0) an end location (an end of the binary 105, such as address X where X is a size or length of the binary 105). In FIG. 2, an example of entropy at respective locations within a binary 105 is illustrated in an example entropy plot (plot 231). The horizontal or X axis of the plot 231 may correspond to respective locations within the binary 105 and the vertical or Y axis of the plot 231 may correspond to an amount of entropy quantified at the respective locations (with entropy increasing up the Y axis).

The entropy profiler 214 may be configured to classify and/or divide the binary 105 into a plurality of portions or segments 205 (e.g., a plurality of segments 205A-N each having respective entropy metrics 235A-N). The binary 105 may be divided into segments 205 based, at least in part, on entropy metrics 235 of the respective segments 205. The segments 205 may be formed from contiguous portions of the binary 105 having same or similar entropy metrics 235 (e.g., entropy metrics 235 within a threshold).

In some aspects, the entropy profiler 214 is configured to identify and/or distinguish segments 205 of the binary 105 that are suitable for determining CA metadata 250 and/or unsuitable. The unsuitable segments 205 may be identified and excluded from subsequent analysis by the architecture profiler 210. The unsuitable segments 205 may be identified based, at least in part, on the entropy metrics 235 thereof. The unsuitable segments 205 may include segments 205 of the binary 105 having entropy metrics 235 at or above a first threshold (e.g., a high-entropy threshold). The entropy profiler 214 may determine that "high-entropy" segments 205 of the binary 105 comprise data that are compressed, encrypted, or the like. The high-entropy segments 205 may, therefore, be unsuitable for determining CA metadata 250 pertaining to the binary 105. The unsuitable segments 205 may also include portions of the binary 105 having entropy metrics 235 at or below a second threshold (e.g., a low-entropy threshold). The entropy profiler 214 may determine that the "low-entropy" segments 205 of the binary 105 comprise padding data, constant values, and/or the like. The low-entropy segments 205 may, therefore, be unsuitable for determining CA metadata 250 pertaining to the binary 105.

Alternatively, or in addition, the entropy profiler 214 may be configured to identify segments 205 of the binary 105 from which CA metadata 250 pertaining to the binary 105 can be derived ("suitable" segments 205). The entropy profiler 214 may identify suitable segments 205 having entropy metrics 235 are between the first, high-entropy threshold and the second, low-entropy threshold. The suitable segments 205 may include machine-readable code, such as executable instructions and/or the like. The entropy profiler 214 may determine that the suitable segments 205 comprise machine code (e.g., opcodes or instructions). The suitable segments 205 may, therefore, be referred to as "opcode," "instruction," or "code" segments 205.

The entropy profiler 214 may be configured to locate and/or filter out unsuitable segments 205 of the binary 105. Alternatively, the entropy profiler 214 may identify and/or provide suitable segments 205 of the binary 105 to a computing architecture (CA) analysis module 216. The CA analysis module 216 may be configured to determine CA metadata 250 for the binary 105 based, at least in part, on the suitable segments 205 of the binary 105. The CA analysis module 216 may produce CA metadata 250 indicating the computing architecture, endianness, and/or other information pertaining to the binary 105, which may be used to, inter alia, decompile and/or disassemble the binary 105 to produce an AIL representation 115 of the binary 105, as disclosed herein.

In some aspects, the CA analysis module 216 may determine an endianness of the binary 105. The endianness of the binary 105 may be based, at least in part, on byte pairs corresponding to increments of one (0x0001 vs 0x0100) and/or decrements of one (0xFFFE vs 0xFEFF) within the binary 105 (and/or within suitable segments 205 of the binary 105).

In some implementations, the architecture profiler 210 may generate byte histogram(s) from the suitable segments 205. Generating the byte histogram(s) may include counting individual bytes as well as increments of one observed between byte pairs. The architecture profiler 210 may determine the endianness of the binary 105 based the quantity increments corresponding to a Big Endian (BE) endianness (e.g., 0x0001) versus increments corresponding to a Little Endian (LE) endianness (e.g., 0x0100). A higher quantity of BE increments versus LE increments may indicate that the binary 105 corresponds to a BE format whereas a lower quantity of BE increments versus LE increments may indicate that the binary 105 corresponds to an LE format.

The CA analysis module 216 may be further configured to determine the computing architecture associated with the binary 105. In some implementations, the CA analysis module 216 includes a machine-learning or machine-learned computing architecture (MLCA) classifier 220. The MLCA classifier 220 may be configured to estimate and/or predict the computing architecture on which the binary 105 is configured to operate based, at least in part, on one or more computing architecture (CA) feature(s) 225. The CA features 225 may comprise and/or be derived from byte histogram(s) produced from the suitable segments 205 of the binary 105 (may comprise byte histogram vectors, or the like). The MLCA classifier 220 may implement any suitable ML technique including, but not limited to: an artificial neural network (ANN), AdaBoost, Random Forest, clustering algorithm, k-nearest neighbor (kNN), Tree, support vector machine (SVM), Naïve Bayes, Logistic Regression, and/or the like. The MLCA classifier 220 may be trained to associate binaries 105 with respective computing architectures (e.g., identify and/or classify binaries 105 configured for operation on and/or within respective computing architectures).

The CA features 225 may comprise byte histograms derived from the binary 105. In some aspects, the CA features 225 may include byte histograms derived from suitable segments 205 of the binary 105 (e.g., code and/or instruction sections of the binary 105). The suitable segments 205 of the binary 105 may be identified by the entropy profiler 214 (e.g., based on an entropy profile 230 of the binary 105). The CA features 225 may be derived from contiguous portions of the binary 105 (e.g., portions of suitable segments 205 of the binary 105). In some examples, the portions may comprise 10 kilobyte (KB) overlapping blocks, each 10 KB block having about a 50% overlap with adjacent 10 KB blocks. The CA features 225 may comprise byte histograms (and/or byte histogram vectors) generated from the 10 KB blocks.

Figure 3A:
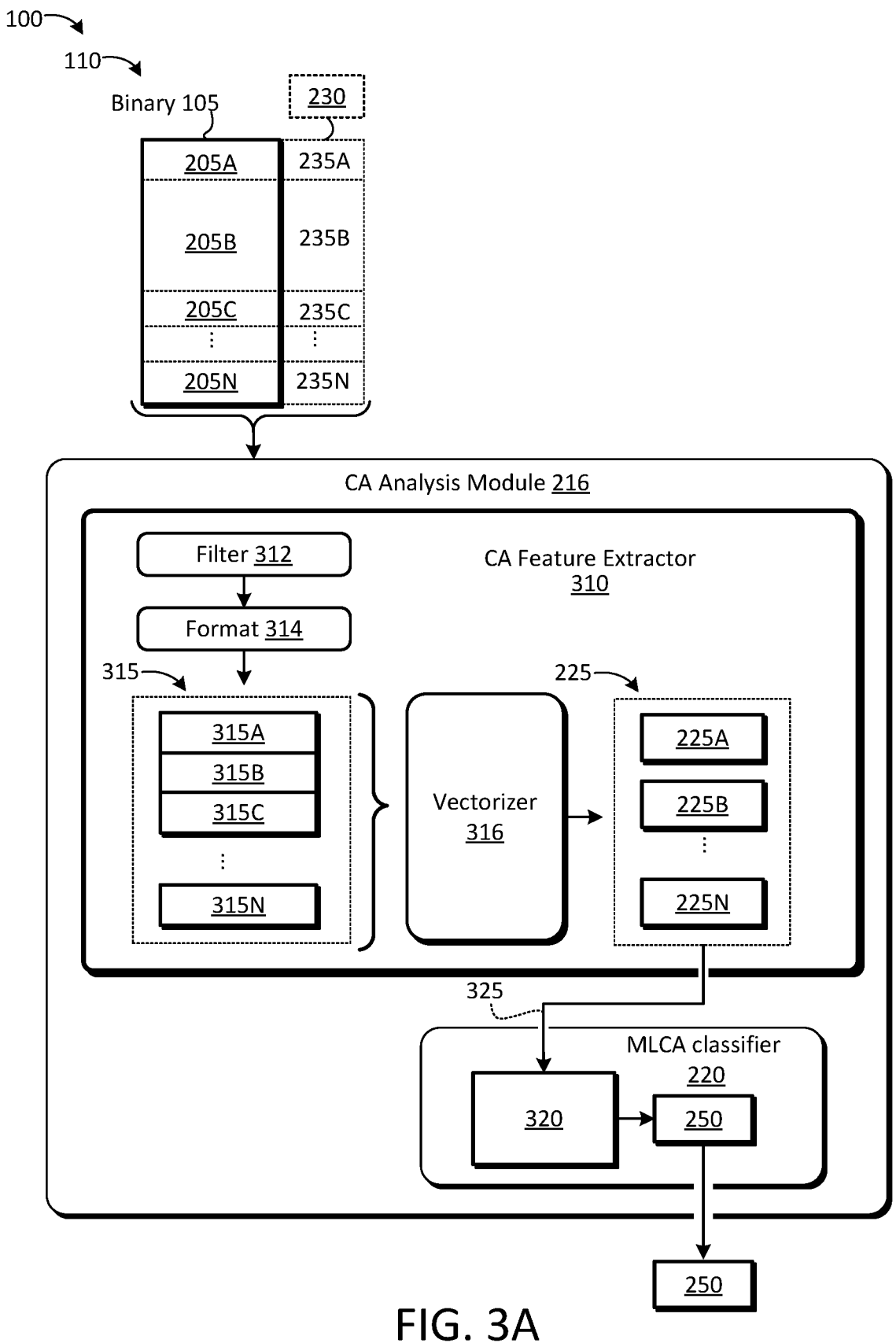
FIG. 3A illustrates an example of a computing architecture analysis module.

FIG. 3A illustrates an example of an CA analysis module 216. The CA analysis module 216 may be implemented as a component or module of a binary analysis device 101; in some implementations, the CA analysis module 216 may be configured for operation on computing resources 102 of a computing device 104, as illustrated in FIG. 1A. Portions of the CA analysis module 216 may be implemented and/or embodied by computer-readable code stored on a non-transitory storage medium (e.g., NV storage of the computing device 104). Alternatively, or in addition, portions of the CA analysis module 216 may be implemented by hardware components, such as application-specific circuitry, programmable circuitry, and/or the like.

As illustrated, the CA analysis module 216 may include and/or be coupled a computing architecture (CA) feature extractor 310. The CA feature extractor 310 may be configured to generate and/or derive CA features 225 from binary 105 (and/or an entropy profile 230 of the binary 105). The CA feature extractor 310 may include a filter module (a filter 312), which may be configured to select (and/or filter out) respective segments 205 of the binary 105 based, at least in part, on entropy within the respective segments 205. The filter 312 may be configured to select suitable segments 205 of the binary 105 having an entropy between a first, high-entropy threshold and a second, low-entropy threshold. Alternatively, or in addition, the filter 312 may be configured to exclude or filter out unsuitable segments 205 of the binary 105 having an entropy at or above the first, high-entropy threshold or at or below the second, low-entropy threshold.

The CA feature extractor 310 may further include a format module (formatter 314), which may be configured to form binary data (BD) blocks 315 from the segments 205 of the binary 105 selected by the filter 312 (e.g., a plurality of BD 315A through 315N). The BD blocks 315 may comprise 10 KB blocks of contiguous data within respective segments 205 of the binary 105. The BD blocks 315 may be constructed to overlap with one another. In some examples, each BD block 315 has about a 50% overlap with adjacent feature block(s) 315. In the FIG. 3A example, BD block 315A may overlap with BD block 315B, BD block 315B may overlap with BD block 315A and/or 315C, and so on. The BD blocks 315 may be formed using a windowing technique (e.g., a rolling window) configured to split or partition the binary 105 (or respective suitable segments 205 thereof) into a set of BD blocks 315, each comprising a respective overlapping portion of the binary 105 (e.g., BD blocks 315A through 315N).

A vector module (vectorizer 316) may be configured to generate and/or derive CA features 225 from the BD blocks 315. The vectorizer 316 may be configured to produce byte histograms (and/or byte histogram vectors) for each BD block 315. The vectorizer 316 may be further configured to quantify an amount of BE increments versus LE increments (or BE decrements versus LE decrements) within the BD blocks 315 (between byte pairs within the BD blocks 315). As disclosed herein, the quantity of BE increments versus LE increments may indicate an endianness of the binary 105. Accordingly, generating the CA features 225 may include determining an endianness of the binary 105.

In some implementations, vectorizer 316 may be configured to generate a plurality of CA features 225, each corresponding to a respective BD block 315 (e.g., generate CA features 225A through 225N corresponding to BD blocks 315A through 315N, respectively). Alternatively, or in addition, the vectorizer 316 may generate one or more composite CA features 225 that incorporate and/or derived from a plurality of BD blocks 315 (e.g., an CA feature 225 incorporating BD blocks 315A through 315N, or subset thereof, a CA feature 225 derived from CA features 225A-N, or the like).

The MLCA classifier 220 may be configured to determine a computing architecture corresponding to the binary 105 based on the CA feature(s) 225 derived from the binary 105 (and/or the determined endianness of the binary 105). The MLCA classifier 220 may include and/or be coupled to a machine-learned or machine-learning computing architecture (MLCA) model 320. The MLCA model 320 may be configured to implement an ML algorithm or technique, such as ANN, AdaBoost, Random Forest, clustering algorithm, kNN, Tree, SVM, Naïve Bayes, Logistic Regression, and/or the like. The MLCA model 320 may be trained to distinguish binaries 105 corresponding to a plurality of computing architectures (an architecture vocabulary), which may include, but is not limited to: a reduced instruction set computing (RISC) architecture, complex instruction set computing (CISC) architecture, i386 architecture, i686 architecture, x86 architecture, x64 architecture, an x86-64 architecture, AMD64 architecture, ARM, Power ISA, Scalable Processor Architecture (SPARC) architecture, amd64 architecture, an armhf architecture, an armel architecture, a mips architecture, a mipsel architecture, a PowerPC architecture, and/or the like. The MLCA model 320 may be trained using any suitable training and/or optimization algorithm including, but not limited to: gradient descent, batch gradient descent, stochastic gradient descent, Adam optimization, or the like. The optimization algorithm may incorporate any suitable cost or loss function, such as a binary cross-entropy as the loss function or the like.

The CA analysis module 216 may be configured to produce CA metadata 250 comprising information pertaining to respective binaries 105. The CA metadata 250 may indicate an endianness of a binary 105, a computing architecture associated with the binary 105 (as determined by the MLCA classifier 220), and/or the like. The CA metadata 250 may be used by the normalization module 114 to produce an AIL representation 115 of the binary 105, as disclosed herein.

In the FIG. 3A example, the CA analysis module 216 may determine CA metadata 250 for a binary 105 by, inter alia, extracting one or more CA features 225 from the binary 105, providing CA input data 325 to the MLCA model 320, and configuring the MLCA model 320 to produce a computing architecture (CA) classification 350 for the binary 105 responsive to the CA input data 325. The CA classification 350 may comprise a classification output, classification label, computing architecture (CA) classification, CA label, and/or the like. The CA classification 350 may indicate the computing architecture corresponding to the binary 105. In some implementations, the CA classification 350 may include a confidence factor indicating a level or degree of confidence in the CA classification 350. The CA analysis module 216 may utilize the CA classification 350 to generate the CA metadata 250 for the binary 105. In some implementations, the CA metadata 250 may comprise, incorporate, and/or be derived from the CA classification 350.

Figure 3B:
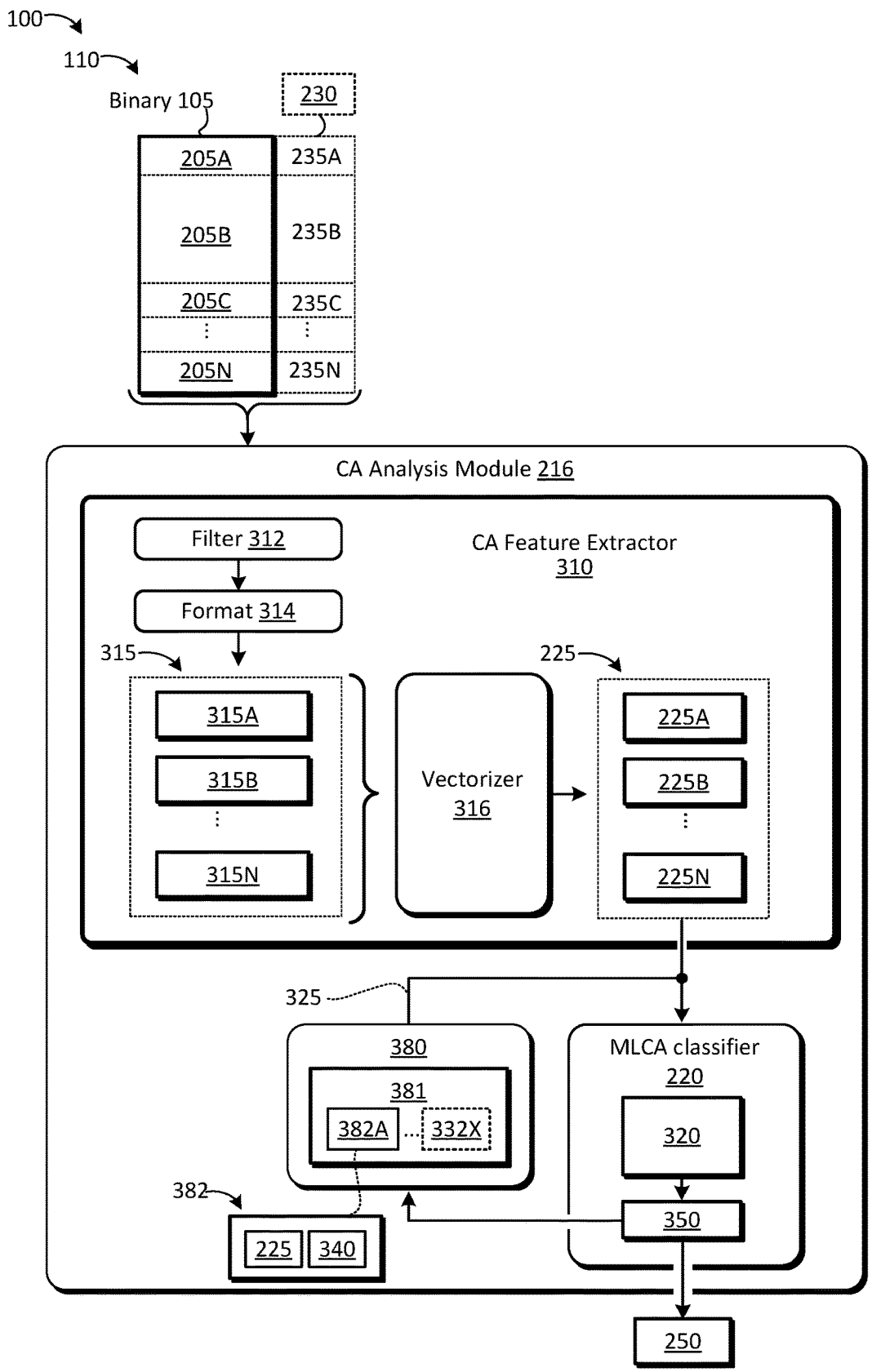
FIG. 3B illustrates another example of a computing architecture analysis module.

FIG. 3B illustrates another example of an CA analysis module 216. In the FIG. 3B example, the CA analysis module 216 may further comprise and/or be coupled to a machine-learning computing architecture (MLCA) training engine 380. The MLCA training engine 380 may be configured to train the MLCA model 320 of the MLCA classifier 220 to produce accurate CA classifications 350. The MLCA training engine 380 may comprise and/or be coupled to one or more computing architecture (CA) training dataset(s) 381. As illustrated, a CA training dataset 381 may include a plurality of CA training entries 382, each CA training entry 382 comprising one or more computing architecture (CA) features 225 and a computing architecture (CA) label 340 (e.g., may comprise a plurality of CA training entries 382A through 382X). The CA features 225 of the CA training entries 382 may be extracted from binaries 105 corresponding to known and/or predetermined computing architectures. The CA label 340 of each CA training entry 382 may indicate the computing architecture of the CA feature(s) 225 of the CA training entry 382. More specifically, the CA labels 340 of the CA training entries 382 may indicate known or predetermined computing architectures (and/or endianness) of the training binaries 105 from which the corresponding CA features 225 were derived. The CA labels 340 may, therefore, comprise ground truths or training classifications of the CA training entries 382. A CA training dataset 381 may be produced using binaries 105 compiled for known computing architectures, such as pre-compiled operating system images, or the like.

The MLCA training engine 380 may be configured to implement any suitable training process or procedure. The training may comprise providing CA input data 325 comprising CA features 225 of respective CA training entries 382 to the MLCA model 320, configuring the MLCA model 320 to produce CA classifications 350 responsive to the CA input data 325, and comparing the CA classifications 350 produced by the MLCA model 320 to the CA labels 340 of the respective CA training entries 382. The training procedure implemented by the MLCA training engine 380 may comprise causing the MLCA model 320 to learn a ML configuration that enables the MLCA model 320 to accurately reproduce CA labels 340 of CA training entries 382 responsive to CA features 225 of the CA training entries 382 (e.g., learn weights, biases, and/or other parameters of the MLCA model 320). The MLCA training engine 380 may implement any suitable training process, procedure, algorithm, including, but not limited to: a train, test, validate training procedure, a dropout training procedure, gradient descent, batch gradient descent, stochastic gradient descent, Adam optimization, and/or the like.

The CA analysis module 216 may utilize the MLCA classifier (and trained MLCA model 320) to determine CA metadata 250 for binaries 105. Determining CA metadata 250 for a binary 105 may comprise: a) identifying segments 205 of the binary 105 that are suitable for CA analysis (e.g., identifying segments 205 having entropy metrics 235 between a first, high-entropy threshold and a second, low-entropy threshold), b) extracting one or more CA feature(s) 225 from the identified segments 205, c) providing CA input data 325 comprising the extracted CA features 225 to the MLCA model 320, and d) causing the MLCA model 320 to produce a CA classification 350 responsive to the CA input data 325. In some implementations, extracting the CA features 225 further comprises determining an endianness of the binary 105 and including the determined endianness in the CA input data 325 provided to the MLCA model 320.

Figure 3C:
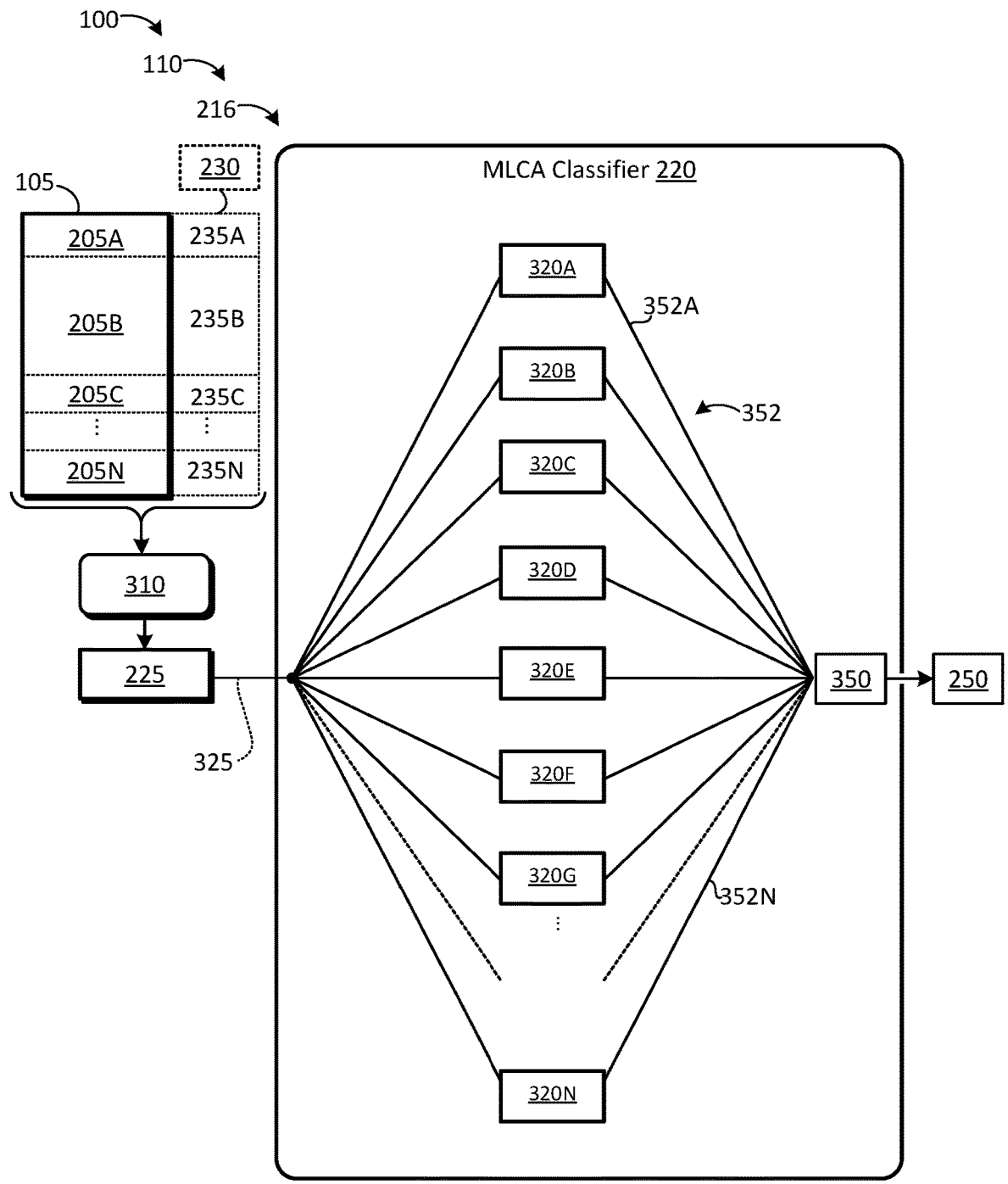
FIG. 3C illustrates an example of a machine-learned computing architecture classifier.

FIG. 3C illustrates another example of an CA analysis module 216. In the FIG. 3C example, the MLCA classifier 220 may include a plurality of MLCA models 320, each configured to implement a respective ML algorithm, technique or structure (in accordance with a respective learned ML configuration). In the FIG. 3C example, MLCA model 320A may be configured to implement an ANN, MLCA model 320B may be configured to implement an AdaBoost ML algorithm, MLCA model 320C may be configured to implement a Random Forest ML algorithm, MLCA model 320D may be configured to implement a kNN ML algorithm, MLCA model 320E may be configured to implement a Tree ML algorithm, MLCA model 320F may be configured to implement an SVM, MLCA model 320G may be configured to implement a Naïve Bayes ML algorithm, and so on, with MLCA model 320N being configured to implement a Logistic Regression ML algorithm. Although an example of an MLCA classifier 220 comprising a particular set of MLCA models 320 is described, the disclosure is not limited in this regard. The MLCA classifier 220 could be configured to include any number of MLCA models 320 configured to implement any suitable ML structure, ML algorithm, and/or the like.

The MLCA models 320 may be trained to distinguish computing architectures of binaries 105 based, at least in part, on CA features 225 extracted from the binaries 105 (and/or an endianness of the binaries 105). The MLCA models 320 may be trained by use of a CA training dataset 381 (and/or MLCA training engine 380), as disclosed herein. The CA training dataset 381 may comprise a plurality of CA training entries 382, each comprising CA feature(s) 225 extracted from a binary 105 corresponding to a known or determined computing architecture and a CA label 340 identifying the known or determined computing architecture. The MLCA models 320 may be trained to accurately replicate CA labels 340 of the CA training entries 382 responsive to CA features 225 of the CA training entries 382. The MLCA models 320 may be trained by use of an MLCA training engine 380 (and/or respective MLCA training engines 380). Alternatively, the CA analysis module 216 may not include an MLCA training engine 380; one or more of the MLCA models 320 of the MLCA classifier 220 may be configured to implement ML configuration(s) learned in previous training processes or procedures.

As disclosed herein, the MLCA classifier 220 may be configured to determine CA metadata 250 for a binary 105. Determining the CA metadata 250 for the binary 105 may comprise: a) extracting CA feature(s) 225 from the binary 105, b) providing CA input data 325 comprising the CA feature(s) 225 into one or more of the MLCA models 320A-N, and c) configuring the MLCA models 320A-N to produce computing architecture (CA) estimates 352 responsive to the CA feature(s) 225, e.g., produce CA estimates 352A-N, respectively. The CA input data 325 may be input to each MLCA model 320 of the plurality of MLCA models 320A-N. In some implementations, the CA input data 325 may be further configured to indicate the determined endianness of the binary 105.

The MLCA models 320A-N may be trained to produce CA estimates 352A-N response to the CA input data 325, as disclosed herein. The CA estimates 325A-N may comprise respective estimates of the computing architecture of the binary 105 determined by respective MLCA models 320A-N (each implementing a respective ML algorithm, architecture, or technique). In some implementations, the CA estimates 352A-N may include confidence metrics configured to quantify a probability and/or confidence in the accuracy of the respective CA estimates 352A-N. The CA classification 350 determined for the binary 105 may be based, at least in part, on one or more of the CA estimates 325A-N. In some implementations, the CA classification 350 may comprise a combination of one or more of the CA estimates 352A-N. The CA classification 350 may be determined by vote (e.g., the CA estimate 325A-N generated by a majority of the MLCA models 320). Alternatively, the CA classification 350 may be the CA estimate 325A-N having a highest confidence, or the like. The disclosure is not limited in this regard, however, and could be adapted to derive a CA classification 350 from a plurality of CA estimates 325A-N using any suitable technique or algorithm. The CA classification 350 may be included in CA metadata 250 produced for the binary 105, as disclosed herein (e.g., the CA metadata 250 may comprise, incorporate, and/or be derived from the CA classification 350 produced by the MLCA classifier 220).

Figure 4:
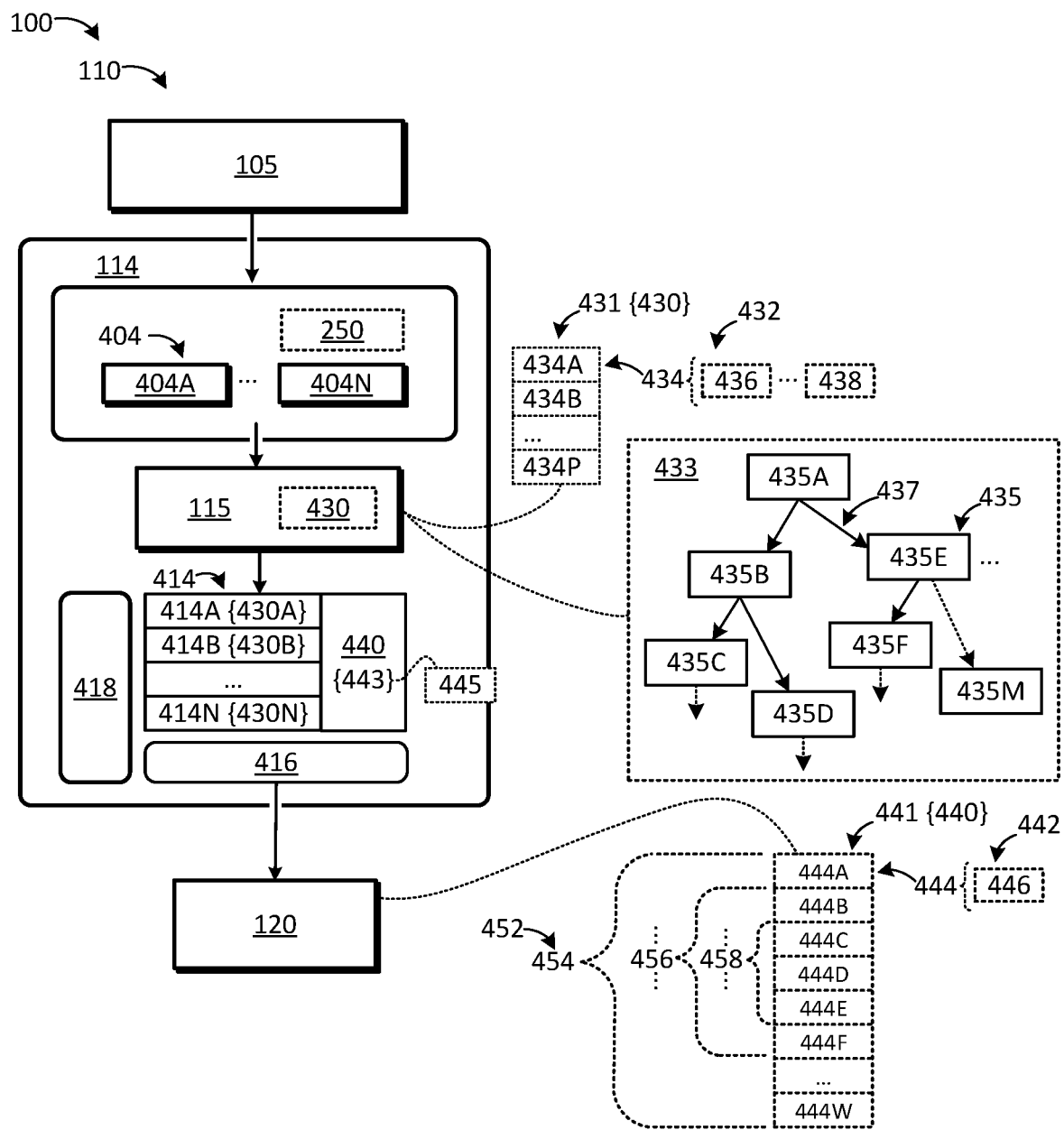
FIG. 4 illustrates an example of a normalization module configured to produce a normalized, application-independent representations of binaries.

FIG. 4 illustrates an example of a normalization module 114. The normalization module 114 may be implemented as a component or module of a binary analysis device 101; in some implementations, the normalization module 114 may be configured for operation on computing resources 102 of a computing device 104, as illustrated in FIG. 1A. Portions of the normalization module 114 may be implemented and/or embodied by computer-readable code stored on a non-transitory storage medium (e.g., NV storage of the computing device 104). Alternatively, or in addition, portions of the normalization module 114 may be implemented by hardware components, such as application-specific circuitry, programmable circuitry, and/or the like.

As disclosed herein, the normalization module 114 may be configured to produce CIL representations 120 of binaries 105. Producing a CIL representation 120 of a binary 105 may comprise: generating an initial AIL representation 115 of the binary 105, analyzing the AIL representation 115, and deriving the CIL representation 120 from the AIL representation 115 based, at least in part, on the analysis of the AIL representation 115.

The initial AIL representation 115 of a binary 105 may be generated by use of architecture-specific tools or components (architecture-specific modules 404). As used herein, an architecture-specific module 404 may refer to any suitable means for generating and/or deriving an intermediate representation of a binary 105, including, but not limited to: a decompiler, a disassembler, an assembler lifter, a debugger, a memory analyzer, an execution tracer, a reversing platform, and/or the like. In the FIG. 4 example, the normalization module 114 may comprise and/or be coupled to a plurality of architecture-specific modules 404 (e.g., architecture-specific modules 404A through 404N), each configured for use in generating initial AIL representations 115 of a respective type of binary 105 (e.g., binaries 105 compiled for operation on one or more of a RISC, CISC, i386, x86, x64, x86-64, ARM, Power ISA, SPARC, amd64, armhf, armel, mips, mipsel, PowerPC, and/or other computing architecture).

Generating an AIL representation 115 of a binary 105 may comprise selecting an architecture-specific module 404 corresponding to the computing architecture of the binary 105 and utilizing the selected architecture-specific module 404 to produce the AIL representation 115. In some implementations, the architecture-specific modules 404 may be selected based on a known computing architecture of the binary 105 (e.g., based on known CA metadata 250 pertaining to the binary 105). Alternatively, or in addition, the architecture-specific modules 404 may be selected based on CA metadata 250 determined for the binary 105. The CA metadata 250 may be determined for the binary 105 by, inter alia, the architecture profiler 210, as disclosed herein.

The AIL representations 115 may comprise any suitable type of intermediate representation of a binary 105 including, but not limited to: intermediate code, intermediate language code, asm, bytecode, p-code, LLIL code, a syntax tree, an AST, and/or the like. In the FIG. 4 example, the AIL representations 115 may comprise AIL code 431. The AIL code 431 may comprise AIL tokens 432, such as AIL opcodes 436, AIL operands or arguments (AIL arguments 438), and so on. The AIL tokens 432 may be combined in accordance with an AIL syntax 430 to produce AIL instructions 434 of the AIL code 431 (e.g., AIL instructions 434A through 434P). An AIL instruction 434 may comprise one or more AIL tokens 432 (may comprise one or more AIL opcodes 436 and/or AIL arguments 438). An AIL opcode 436 may comprise any suitable means for specifying a machine code operation or instruction supported by a computing architecture including, but not limited to: an instruction code, operation code, instruction syllable, instruction parcel, opcode, raw opcode, asm opcode, operation string, and/or the like. An AIL argument 438 may comprise any suitable operand and/or argument of an AIL opcode 436, such as a symbol, variable, local variable, global variable, memory address, architecture-specific resource, architecture-specific register, and/or the like.

The AIL syntax 430 may define, inter alia, the vocabulary of the AIL representation 115. The AIL vocabulary may define the set of possible AIL tokens 432 of the AIL code 431 (e.g., the set of possible AIL opcodes 436, AIL arguments 438, and/or the like). An AIL vocabulary may comprise an AIL opcode vocabulary, which may enumerate and/or define the set of possible AIL opcodes 436 of the AIL code 431. The AIL vocabulary may further comprise an AIL argument vocabulary, which may define the set of possible AIL arguments 438 of the AIL code 431.

AIL representations 115, such as AIL code 431, may have a number of drawbacks, particularly when used with ML analysis techniques. First, the AIL vocabulary of these representations is often extremely large. AIL arguments 438 of AIL code 431 may refer to memory addresses. In a 64-bit computing architecture there are as many as $2^{64}$ possibilities for these memory addresses, resulting in an AIL vocabulary size that is many orders of magnitude too large for vocabulary-based ML techniques. Second, AIL representations 115 are often incapable of capturing the structure and semantics of the AIL code 431, which can reach far beyond local scope of individual AIL instructions 434. Although some graph-based approaches attempt to capture some of this information, due to complexity constraints and data availability, important aspects of the structure and/or semantics may be omitted. For example, the binary 105 may be stripped of symbols comprising structural and/or semantic information pertaining to respective AIL arguments 438 (e.g., symbols may be replaced with generic memory addresses). Third, since AIL representations 115 are highly platform specific, an ML model trained on AIL representations 115 corresponding to a particular computing architecture (e.g., trained on AIL code 431 and/or an AIL syntax 430 of a particular computing architecture) will be incapable of analyzing AIL representations 115 associated with other computing architectures. Fourth, different builds of the same source code can result in completely different memory addresses being used within the binary 105, without impacting the logical functionality of the binary 105. Therefore, functionality similar or equivalent binaries 105 may have significantly different AIL representations 115, even on the same computing architecture.

The CIL representations 120 generated by the normalization module 114 may be configured to address these and other shortcomings. The CIL representation 120 of a binary 105 may include CIL code 441 (CIL instructions 444). The CIL code 441 generated for a binary 105 may comprise a normalized, architecture-independent representation of the functionality implemented by the binary 105. In the FIG. 4 example, the CIL code 441 may include CIL instructions 444 corresponding to the AIL instructions 434 of the AIL code 431 (e.g., CIL instructions 444A-W corresponding to the AIL instructions 434A-P of the AIL representation 115).

The normalization module 114 may comprise and/or define a CIL syntax 440 having a CIL vocabulary 443. The CIL code 441 may comprise CIL tokens 442, which may be combined and/or arranged in accordance with the CIL syntax 440 to form CIL instructions 444 of the CIL code 441. The CIL vocabulary 443 may define the set of CIL tokens 442 comprising and/or referenced within the CIL representation 120 of the binary 105 (e.g., may define the set of possible CIL tokens 442 utilized and/or referenced within the CIL instructions 444 of the CIL code 441).

In the FIG. 4 example, the CIL tokens 442 may include CIL opcodes 446. The CIL vocabulary 443 may comprise and/or define a CIL opcode vocabulary 445, which may enumerate and/or define the set of possible CIL opcodes 446 of the CIL syntax 440 (possible CIL tokens 442 of the CIL code 441). The CIL syntax 440 and/or CIL opcode vocabulary 445 may comprise a many-to-one translation layer configured to provide one-to-M translations between AIL instructions 434 and CIL instructions 444 (and/or one-to-M translations between AIL opcodes 436 and CIL opcodes 446). The CIL syntax 440 may be defined such that each AIL opcode 436 of each AIL syntax 430 corresponds to at least one CIL opcode 446 and/or each AIL instruction 434 corresponds to at least one CIL instruction 444. The CIL syntax 440 may be configured to define one-to-M translations for each of a plurality of different types of AIL representations 115 (and/or a plurality of AIL syntaxes 430A-N). The CIL syntax 440 may be defined such that each AIL opcode 436 of each AIL syntax 430A-N corresponds to at least one CIL opcode 446. The CIL syntax 440 may be further configured to define M-to-one mappings between CIL instructions 444 and AIL instructions 434. The CIL syntax 440 may be configured such that each set of one or more CIL opcode(s) 446 (e.g., each set of M CIL opcode(s) 446) corresponds to, at most, a single AIL opcode 436 of each AIL syntax 430A-N.

The normalization module 114 may generate the CIL representation 120 of a binary 105 in a normalization process. The normalization process may comprise a) producing an AIL representation 115 of the binary 105, and b) translating AIL code 431 of the AIL representation 115 into CIL code 441 of the resulting CIL representation 120. The AIL instructions 434 may be converted into corresponding CIL instructions 444 by use of a translation module 414. The translation module 414 may be configured to define and/or implement conversions between a specified AIL syntax 430 and the CIL syntax 440 (or vice versa). The translation module 414 may define one-to-M mappings between AIL opcodes 436 of an AIL syntax 430 and CIL opcodes 446 of the CIL syntax 440. A translation module 414 may include any suitable information for defining and/or implementing translations including, but not limited to: a data structure, a table, a lookup table, a translation table, a mapping table, a mapping, a mapping schema, an index, an array, an associative array, one or more mapping rules, one or more translation rules, and/or the like.

As illustrated in FIG. 4, the normalization module 114 may include and/or be coupled to a plurality of translation modules 414A-N, each configured to translate AIL code 431 of a respective AIL syntax 430A-N to the CIL syntax 440 (and/or vice versa). The translation modules 414A-N may define one-to-M translations between each AIL opcode 436 of each AIL syntax 430A-N and corresponding CIL opcode(s) 446 of the CIL syntax 440. The normalization module 114 may be configured to select translation modules 414 to process AIL representations 115 of respective binaries 105. The selection may be based on the AIL syntax 430 of the AIL representations 115. The AIL syntax 430 of an AIL representation 115 may be based, at least in part, on the computing architecture associated with the binary 105 (and/or the architecture-specific module 404 used to generate the AIL code 431 of the AIL representation 115).

The normalization module 114 may be further configured to manage the CIL vocabulary 443 of the CIL representations 120 (and/or CIL syntax 440). As disclosed above, the CIL vocabulary 443 may comprise and/or define a CIL opcode vocabulary 445, which may enumerate and/or define the set of possible CIL opcodes 446 of the CIL representations 120. The CIL opcode vocabulary 445 may define a CIL opcode 446 for each AIL opcode 436 defined by each AIL syntax 430A-N. The CIL vocabulary 443 may, therefore, span and/or encompass the AIL opcode vocabularies of each AIL syntax 430A-N and/or AIL representation 115 generated by each architecture-specific module 404A-N.

The AIL opcode vocabularies may be limited to the machine code instructions supported by the corresponding computing architectures. The argument vocabularies of the AIL representations 115, however, may be much more expansive. As described above, the AIL arguments 438 of the AIL representations 115 may include memory addresses, which may span $2^{64}$ possible values or more (depending on the memory address space of the computing architecture). If the CIL vocabulary 443 were to cover the full range of possible AIL arguments 438, the CIL vocabulary 443 would be many orders of magnitude too large for use with vocabulary-based ML techniques. Furthermore, memory addresses may not adequately convey the structure and/or semantics of the AIL code 431 (e.g., may not adequately represent the structure and/or semantics of the data or functions at the memory addresses). Also, since the memory addresses referenced by a binary 105 are highly platform specific, and can change from build to build, applying ML techniques to CIL representations 120 that incorporate such memory addresses is unlikely to provide useful results.

In some implementations, normalization module 114 is further configured to manage the size of the CIL vocabulary 443 by omitting and/or ignoring the AIL arguments 438 of the AIL instructions 434. In the FIG. 4 example, the CIL instructions 444 of the CIL code 441 (CIL instructions 444A-Y) may include CIL opcodes 446 corresponding to respective AIL instructions 434 (AIL instructions 434A-Y) but may omit and/or exclude information pertaining to the AIL arguments 438 of the respective AIL instructions 434.

As disclosed above, the normalization process implemented by the normalization module 114 may comprise translating AIL instructions 434 of AIL representations 115 into CIL code 441 of the resulting CIL representation 120. The normalization process may comprise producing one or more CIL instructions 444 for each AIL instruction 434 of the AIL code 431. In the FIG. 4 example, the normalization module 114 may produce CIL instructions 444A-Y corresponding to AIL instructions 434A-P. The normalization process may comprise iterating over each AIL instruction 434 and, in response, generating one or more corresponding CIL instructions 444.

In some aspects, the AIL representation 115 of the binary 105 may include an architecture-specific abstract syntax tree (AST) 433. The AST 433 may include a plurality of interconnected AST vertices or nodes 435 (e.g., AST nodes 435A-M), each AST node 435 comprising and/or corresponding to one or more AIL instructions 434 and being interconnected by one or more AST edges 437. The AST edges 437 may represent logical control flow of the AIL code 431. In these implementations, the normalization process may comprise generating the CIL code 441 (and/or respective CIL instructions 444) in response to walking the AST 433 (e.g., traversing the AST 433 and producing CIL instruction(s) 444 for each AST node 435 and/or AST edge 437).

As disclosed above, the AIL representation 115 of a binary 105 may reference resources of a specific computing architecture (reference architecture-specific resources). For example, the AIL code 431 of a binary 105 my reference registers specific to a particular processor, reference hardware capabilities of the particular processor, and/or the like. Consider a first binary 105 and second binary 105 compiled from the same or substantially similar source code. The first binary 105 may be compiled for operation on an x86 computing architecture whereas the second binary 105 may be compiled for operation on a different computing architecture (e.g., an ARM computing architecture). The AIL code 431 of the first binary 105 may reference architecture-specific resources of the x86 computing architecture, such as an accumulator register (AX), counter register (CX), data register (DX), base register (BX), stack pointer register (SP), stack base pointer register (BP), source index register (SI), destination index register (DI), and/or the like. The AIL code 431 of the second binary 105 may reference architecture-specific resources of the ARM architecture, such as general-purpose registers (R0-R12), a stack pointer register (SP), a link register (LP), a program counter register (PC), an application program status register (APSR), and so on. Accordingly, although the first and second binaries 105 may be functionally equivalent (e.g., compiled from the same or similar source code), the architecture-specific resources referenced by the AIL code 431 of the first and second binaries 105 may differ.

In some implementations, the normalization process implemented by the normalization module 114 may further comprise normalizing references to architecture-specific resources. More specifically, the CIL syntax 440 and/or CIL vocabulary 443 may define a set of normalized, architecture-independent (CIL) resources corresponding to architecture-specific resources of respective computing architectures and/or AIL syntaxes 430. For example, the CIL syntax 440 may define a set of CIL registers corresponding to registers of the plurality of computing architectures, such as registers corresponding to a RISC architecture, CISC architecture, i386 architecture, x86 architecture, x64 architecture, x86-64 architecture, ARM architecture, Power ISA architecture, SPARC architecture, amd64 architecture, armhf architecture, armel architecture, mips architecture, mipsel architecture, PowerPC architecture, and/or the like. The translation module 414 associated with a particular computing architecture (and/or AIL syntax 430) may be further configured to translate, map, and/or otherwise convert references to architecture-specific resources to corresponding CIL resources defined by the CIL syntax 440.

The NARE process implemented by the normalization module 114 may further comprise compensating for binary-specific characteristics, such as build operations. As used herein, a "binary-specific" or "build" operation or characteristic of a binary 105 refers to an operation implemented in the "build" or "make" process in which the binary 105 was produced. A build operation may refer to an operation performed while compiling source code of the binary 105 into a format suitable for execution by and/or within a target computing architecture. A build operation may refer to an optimization implemented by the assembler and/or compiler, such as a loop optimization, data-flow optimization, code generator optimization, functional language optimization, interprocedural optimization, and/or the like. Build operations may be specified by the configuration and/or settings of a build process (e.g., the configuration and/or settings of the assembler, compiler, linker, and/or the like). The build characteristics of a binary 105 may, therefore, be specific to the binary 105 (may be binary-specific characteristics).

The build operations implemented during construction of a binary 105 may affect the AIL representation 115 of the binary 105 (e.g., the AIL code 431). For example, the AIL code 431 of a first binary 105 generated with a loop unrolling optimization may include a plurality of similar AIL code blocks (loop blocks); the AIL code 431 of the first binary 105 may include L loop blocks, where L is a loop unrolling factor (the L loop blocks included within a loop of I/L iterations, where I is the iteration count of the original loop). A second binary 105 may be built from the same (or similar) source code without the loop unrolling optimization. As such, the AIL code 431 of the second binary 105 may include a single loop block (a single loop block of I iterations). Thus, although the first and second binaries 105 may be functionally similar (or equivalent), the AIL representation 115 of the first binary 105 may differ from the AIL representation 115 of the second binary 105.

In some implementations, the normalization module 114 may be further include and/or be coupled to a binary-specific normalization (BSN) module 416. The BSN module 416 may be configured to implement one or more "build-specific normalization" operations on the AIL representation 115 and/or resulting CIL representation 120 of a binary 105. As used herein, a "binary" or "build-specific normalization" (BSN) operation refers to an operation to normalize a representation of a binary 105 based, at least in part, on a build operation implemented on the binary 105.

The BSN module 416 may be configured to normalize portions of the CIL code 441 affected by binary-specific operations (e.g., build operations). The binary-specific normalization operations implemented by the normalization module 114 may be configured such that functionally equivalent binaries 105 correspond to same (or substantially similar) CIL representations 120 and/or CIL code 441, regardless of the particular build operations implemented to produce the binaries 105 (e.g., regardless of assembler optimizations or settings, compiler optimizations or settings, and/or the like).

The BSN module 416 may be configured to identify binary-specific characteristics of binaries 105 (build operations implemented during production of the binaries 105) within AIL representations 115 of the binaries (e.g., within the AIL code 431 or the like). The BSN module 416 may identify binary-specific characteristics based on information extracted from the binary 105 (e.g., from information pertaining to compiler and/or assembler settings included in the binary 105). Alternatively, or in addition, the BSN module 416 may detect binary-specific characteristics through analysis of the AIL representation 115 (and/or resulting CIL representation 120). For example, the normalization module 114 may determine that the binary 105 was compiled with a loop optimization in response to detecting AIL code 431 comprising a repeated series of same or similar AIL code blocks, as disclosed above. The BSN module 416 may be further configured to implement BSN operations corresponding to the identified binary-specific operations. The BSN operations may be configured to, inter alia, normalize the resulting CIL representation 120 (e.g., CIL code 441). For example, the binary-specific normalization operations may comprise transforming portions of the CIL code 441 to undo or reverse an identified build operation (e.g., may comprise reversing a loop unrolling operation). The BSN operations may be configured to normalize the CIL code 441 such that binaries 105 that implement equivalent functionality correspond to the same (or substantially similar) CIL representations 120.

In some implementations, the normalization module 114 may further comprise and/or be coupled to a code analyzer 418. The code analyzer 418 may be configured to determine and/or capture structural and/or semantic information. The code analyzer 418 may be configured to identify and/or organize the CIL code 441 into functional and/or logical components (components 452). The components 452 may correspond to any suitable functional and/or logical organization of the binary 105 and/or CIL code 441. The components 452 may include, but are not limited to: binary components 454, function components 456, code block components 458, and/or the like.

The organization and/or arrangement of the components 452 may correspond to hierarchical and/or containment relationships. For example, a binary component 454 may represent an executable, library, package, or other top-level component of the binary 105 and, as such, may comprise and/or contain zero or more function components 456, which in turn, may comprise and/or contain zero or more code-block components 458, and so on. A function component 456 may represent functionality implemented by a specified binary component 454, such as function, procedure, object, method, or the like. A code-block component 458 of a function component 456 may comprise instructions configured to implement at least a portion of the functionality represented by the function component 456 (e.g., binary instructions, AIL instructions 434, CIL instructions 444, or the like).

In the FIG. 4 example, the binary 105 may comprise a single executable and, as such, the binary component 454 of the CIL representation 120 of the binary 105 may correspond to (or contain) substantially all of the CIL code 441 of the CIL representation 120, e.g., CIL instructions 444A-W. Function components 456 may correspond to (or contain) CIL code 441 associated with respective functions of the binary component 454 (e.g., CIL instructions 444B-F). Code-block components 458 may correspond to (or contain) CIL code 441 associated with respective portions of a function component 456 (e.g., CIL instructions 444C-E).

Referring back to FIG. 1B, the binary analysis platform 110 may further include and/or be coupled to an analysis module 116, which may be configured to determine analysis data 150 for the binary 105 based, at least in part, on the CIL representation 120 of the binary 105 produced by the normalization module 114. The analysis data 150 may comprise security label 155, which may be configured to identify potential security threats and/or vulnerabilities associated with the binary 105.

Figure 5A:
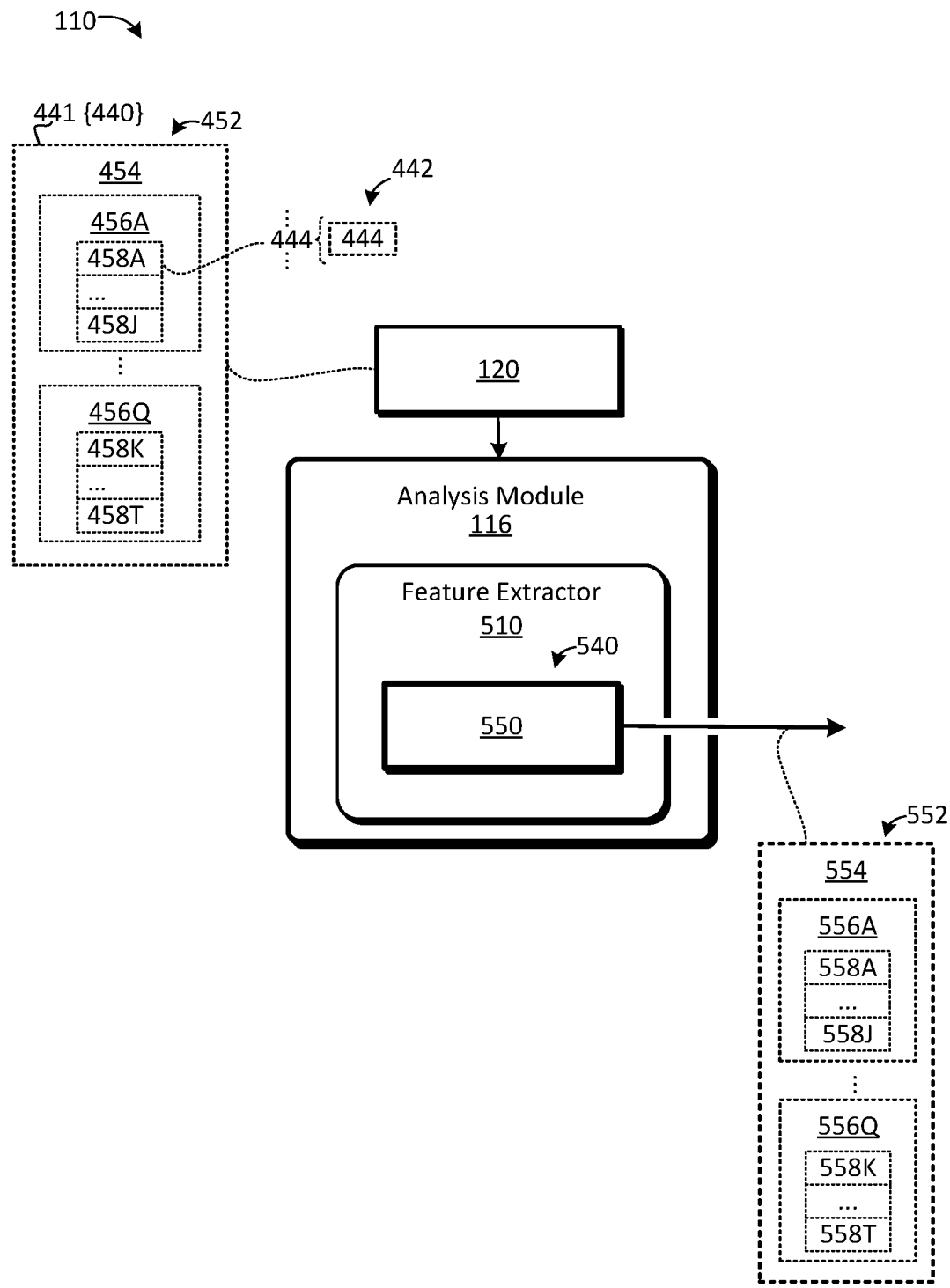
FIG. 5A illustrates a first example of a machine-learning and/or machine-learned analysis module for architecture-independent binary analysis.

FIG. 5A illustrates a first example of an analysis module 116. The analysis module 116 may be implemented as a component or module of the binary analysis platform 110. In some implementations, the analysis module 116 may be configured for operation on computing resources 102 of the operating environment (and/or system 100) illustrated in FIG. 1A; the analysis module 116 (and/or portions thereof) may be configured to operate on computing resources 102 realized by an electronic device, such as the computing device 104 or the like. Portions of the analysis module 116 may be implemented and/or embodied by computer-readable code stored on a non-transitory storage medium (e.g., NV storage of the computing device 104). Alternatively, or in addition, portions of the analysis module 116 may be implemented by hardware components, such as application-specific circuitry, programmable circuitry, and/or the like.

The analysis module 116 may include and/or be coupled to a feature module 510. The feature module 510 may be configured to derive feature vectors 550 for binaries 105 that are suitable for ML analysis techniques, including vocabulary-based ML analysis techniques. In the FIG. 5A example, the feature module 510 may be configured to generate feature vectors 550 that are suitable for use with a classifier, pattern recognition implementation, supervised ML implementation, ML clustering implementation, semi-supervised ML implementation, vocabulary-based ML implementation, an ANN, an AdaBoost ML implementation, a Random Forest ML implementation, a kNN ML implementation, a Tree ML implementation, an SVM, a Naïve Bayes ML implementation, a Logistic Regression ML implementation, and/or the like.

As disclosed above, AIL representations 115 of binaries, such as AIL code 431, AST, or the like, may be unsuitable for use with ML analysis techniques. The AIL argument vocabulary of the AIL representations 115 may span the memory address space of the computing architecture (e.g., a 64-bit virtual memory address space), which may preclude the use of many ML analysis techniques, such as vocabulary-based ML analysis techniques. The AIL representations 115 may also be incapable of adequately capturing the structure and/or semantics of the AIL code 431. In addition, since AIL representations 115 are highly platform specific, an ML model trained on AIL representations 115 for one computing architecture will be incapable of accurately analyzing AIL representations 115 of other computing architectures. Furthermore, different builds of the same source code can result in completely different memory addresses being used within the binary 105, which may result in analysis error, even when used with binaries 105 corresponding to the same computing architecture.

The feature module 510 may be configured to generate normalized, architecture-independent (CIL) features 540 for binaries 105 that address these and other issues. The CIL features 540 (or simply features 540) may be configured to characterize functionality implemented by respective binaries 105 (and/or characterize respective functions implemented by the binary 105) in a normalized, architecture-independent manner. In the FIG. 5A example, the CIL features 540 include CIL opcode feature vectors 550 (also referred to as "opcode" feature vectors or simply feature vectors 550). The feature vectors 550 may be derived from the CIL representations 120 of the binaries 105 (e.g., CIL code 441), which may be produced by use of the normalization module 114, as disclosed herein. Since the CIL features 540 (e.g., feature vectors 550) are extracted from CIL representations 120, the feature vectors 550 may be consistent across a plurality of computing architectures. The CIL features 540 (feature vectors 550) may be configured to characterize the functionality of binaries 105 as opposed to architecture-specific aspects of the binaries 105. Accordingly, CIL features 540 (feature vectors 550) for binaries 105 that are functionally equivalent (or similar) may be the same (or similar) regardless of the computing architecture for which the binaries 105 were compiled (and/or binary-specific operations implemented to produce the binaries 105, such as compiler optimizations or the like).

In the FIG. 5A example, the CIL code 441 of the CIL representations 120 may omit raw memory addresses (omit AIL arguments 438), thereby significantly reducing the size of the CIL vocabulary 443 (as compared to the AIL vocabulary).

As disclosed above, the CIL representation 120 of a binary 105 may include CIL code 441. The CIL representation 120 may include structural and/or semantic information pertaining to the CIL code 441. As disclosed above, the CIL representation 120 may organize and/or arrange the CIL code 441 into logical and/or functional components 452, such as binary components 454, function components 456, code-block components 458, and/or the like. In the FIG. 5A example, the binary 105 implements a single executable or library and, as such, corresponds to a single binary component 454. The binary component 454 may include a plurality of function components 456A-Q each corresponding to respective functionality implemented by the binary 105. The function components 456A-Q may comprise respective code-block components 458, each comprising CIL instructions 444 configured to implement at least a portion of the corresponding function component 456A-Q. In the illustrated example, the function component 456A includes code-block components 458A-J, function component 456Q includes code-block components 458K-T, and so on.

The feature module 510 may be configured to derive a feature vector 550 for a binary 105 from, inter alia, the CIL representation 120 of the binary 105 (e.g., the CIL code 441 generated from the binary 105). In some implementations, the CIL representation 120 may be configured to limit the CIL vocabulary 443 of the CIL code 441 by, inter alia, ignoring references to the memory address space within the AIL representation 115. More specifically, the CIL instructions 444 of the CIL representation 120 may omit arguments and/or operands of the AIL code 431. The CIL code 441 may, therefore, focus on the singular operations performed within each function component 456 and/or code-block component 458 (CIL opcodes 446).

In some implementations, generating the feature vector 550 for a binary 105 may comprise quantifying the number of times respective instructions or instruction types appear within the CIL representation 120 of the binary 105. In some aspects, the feature vector 550 is configured to quantify the number of times respective CIL opcodes 446 appear within the CIL code 441 derived from the binary 105 (and/or within respective components 452 of the CIL code 441).

In some aspects, a feature vector 550 may comprise, incorporate, and/or be derived from one or more component vectors 552, each component vector 552 configured to characterize a respective components 452 of the CIL code 441 (e.g., quantify a number of times respective CIL opcodes 446 appear within CIL instructions 444 associated with the specified component 452). The component vectors 552 may include, but are not limited to: binary component (BC) vector(s) 554, which may be configured to characterize a specified binary 105 (e.g., characterize the binary component 454 of the CIL code 441 generated for the binary 105); function component (FC) vector(s) 556, which may be configured to characterize specified function component(s) 456 of the CIL code 441; code-block component (CBC) vector(s) 558, which may be configured to characterize specified code-block component(s) 458 of the CIL code 441; and so on. In some implementations, the component vectors 552 may correspond to a hierarchy having a top level (BC vector(s) 554), a middle level (function vectors 556), and a bottom level (CBC vectors 558). Upper-level component vectors 552 may comprise, incorporate and/or be derived from one or more lower-level component vectors 552. An upper-level component vector 552 may comprise a sum, aggregation, or other combination of the lower-level component vectors 552.

As disclosed above, the BC vector 554 may be configured to quantify the number of times each CIL opcode 446 appears within the CIL code 441 associated with the specified binary component 454 (e.g., may comprise a histogram of CIL opcodes 446). In the FIG. 5A example, the binary 105 may comprise a single binary component 454 (implements a single executable or library) and, as such, the BC vector 554 may cover substantially all of the CIL code 441 generated for the binary 105.

The feature vector 550 (and/or BC vector 554) may comprise, incorporate, and/or be derived from one or more lower-level component vectors 552, such as function vectors 556. A function vector 556 may be configured to characterize the CIL code 441 associated with a specified function component 456 of the CIL code 441 (e.g., quantify the number of times respective CIL opcodes 446 appear within CIL instructions 444 associated with the specified function component 456). In the FIG. 5A example, the feature vector 550 (and/or BC vector 554) may comprise, incorporate, and/or be derived from function vectors 556A-Q, each configured to characterize a respective one of the function components 456A-Q of the component 454. The function vector 556A may quantify the number of times respective CIL opcodes 446 appear in code-block components 458A through 458J, the function vector 556Q may quantify a number of times respective CIL opcodes 446 appear in code-block components 458K through 458T, and so on.

The function vectors 556 may comprise, incorporate, and/or be derived from one or more lower-level component vectors 552, such as CBC vectors 558. A CBC vector 558 may be configured to characterize a specified code-block component 458 of the CIL code 441 (e.g., quantify the number of times respective CIL opcodes 446 appear within CIL instructions 444 of the specified code-block component 458). In the FIG. 5A example, the CBC vector 558A may be configured to characterize code-block component 458A, the CBC vector 558J may be configured to characterize code-block component 458J, the CBC vector 558K may be configured to characterize code-block component 458K, the CBC vector 558T may be configured to characterize code-block component 458T, and so on.

The feature vector 550 may comprise any combination of zero or more component vectors 552. In a first example, the feature vector 550 comprises a single BC vector 554 and omits other, lower-level component vectors 552 (e.g., omits the function vectors 556A-Q and/or CBC vectors 558A-T). In a second example, the feature vector 550 may comprise one or more function vectors 556 (e.g., may comprise function vectors 556A-Q) and may omit the BC vector 554 and/or lower-level CBC vectors 558 from which the function vectors 556 were derived. In a third example, the feature vector 550 may comprise one or more CBC vectors 558 (e.g., CBC vectors 558A-T) and may omit the BC vector 554 and function vectors 556A-Q. In a fourth example, the feature vector 550 may include the BC vector 554 and one or more function vectors 556 (e.g., function vectors 556A-Q). In a fifth example, the feature vector 550 may include the BC vector 554 and one or more CBC vectors 558 (e.g., CBC vectors 558A-T) and may omit the function vectors 556A-Q. In a sixth example, the feature vector 550 may include one or more function vectors 556 and one or more CBC vectors 558 (e.g., function vectors 556A-Q and CBC vectors 558A-T) and may omit the BC vector 554. In a seventh example, and as illustrated in FIG. 5C, the feature vector 550 may include the BC vector 554, one or more function vectors 556 (e.g., function vectors 556A-Q), and one or more CBC vectors 558 (e.g., CBC vectors 558A-T).

The analysis module 116 may utilize the feature module 510 to generate feature vectors 550 for respective binaries 105 and may provide the feature vectors 550 to one or more ML analysis components. Alternatively, or in addition, the feature vectors 550 may be utilized in an ML implementation of the analysis module 116 (e.g., in an implementation of a classification algorithm, pattern recognition algorithm, or the like). As disclosed in further detail herein, the feature vector 550 derived from the CIL representation 120 of the binary 105 may be used to determine analysis data 150 for the binary 105, such as a security label 155. The analysis module 116 may utilize the feature vector 550 to quantify a degree or confidence that the binary 105 is associated with a security threat and/or vulnerability. The determination may be based, at least in part, on a similarity between the binary 105 and binaries 105 associated with known security threats and/or vulnerabilities.

In some implementations, the binary analysis platform 110 may utilize the feature vectors 550 to identify and/or characterize CIL representations 120 of respective binaries 105. The feature vectors 550 may be used to, inter alia, identify functionally similar binaries 105 (and/or binaries 105 comprising functionally similar or equivalent components 452, such as similar or functionally equivalent function components 456). The analysis module 116 may be configured to quantify a functional similarity between a first binary 105 and a second binary 105 based, at least in part, by comparing feature vectors 550 of the first and second binaries 105. The functional similarity may comprise an error, difference, distance, edit distance, or other quantity determined between the feature vectors 550. The analysis module 116 may determine that the first binary 105 is functionally similar (or equivalent) to the second binary 105 responsive to determining that the functional similarity quantity derived from the feature vectors 550 of the first and second binaries 105 exceeds a threshold.

The analysis module 116 may be further configured to quantify the functional similarity between components 452 of respective binaries 105. The analysis module 116 may quantify a functional similarity between components 452 of respective binaries 105 based, at least in part, on component vectors 552 determined for the components 452. The functional similarity between a first component 452 and a second component 452 may be based, at least in part, on an error, difference, distance, edit distance, or other quantity determined between the component vector 552 generated for the first component 452 and the component vector 552 generated for the second component 452. For example, the analysis module 116 may determine that a first binary 105 comprises a first function component 456 that is functionally similar (or equivalent) to a second function component 456 of a second binary 105 in response to determining that the functional similarity quantity calculated between the first function component 456 and the second functional component 456 exceeds a threshold.

Figure 5B:
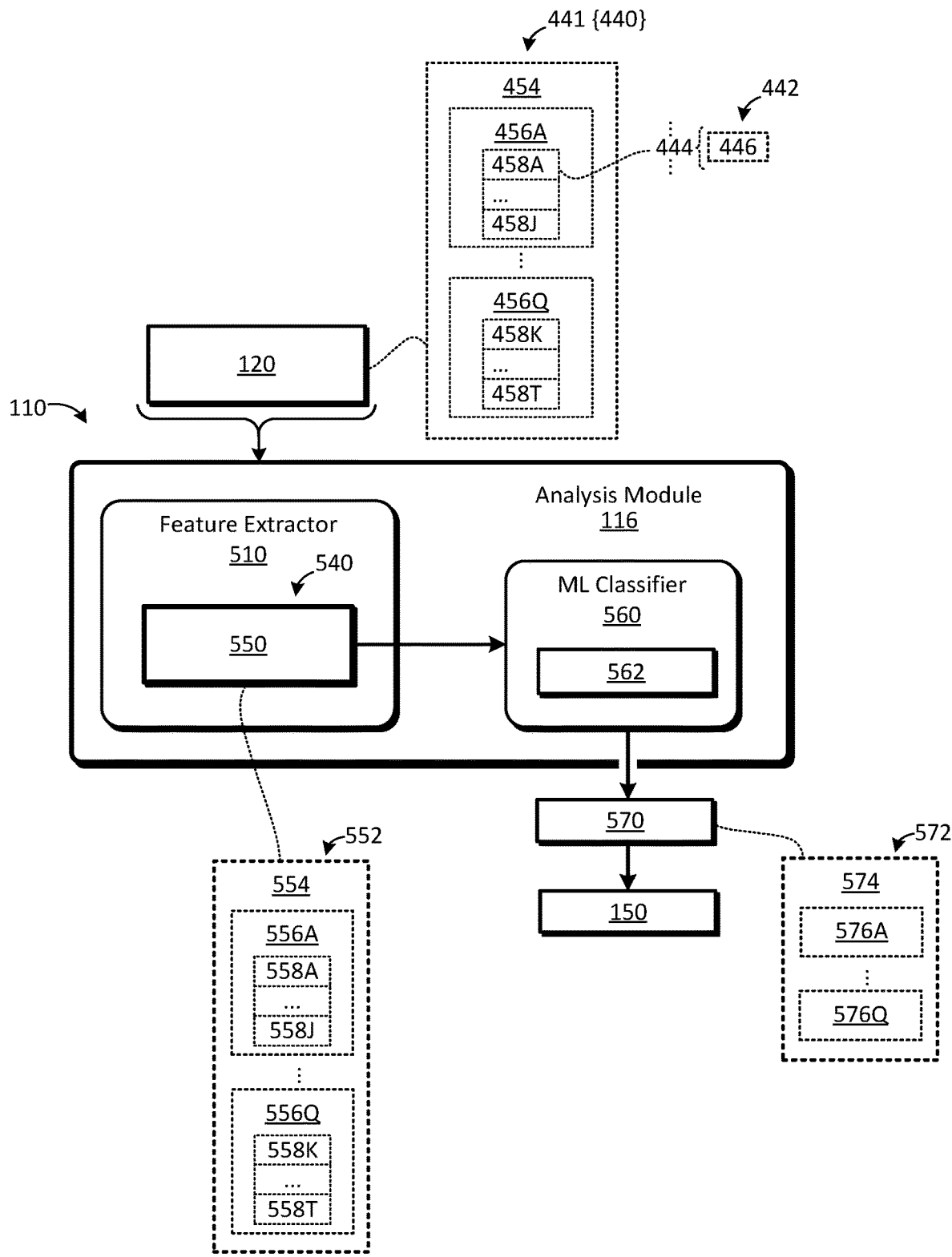
FIG. 5B illustrates a second example of a machine-learning and/or machine-learned analysis module for architecture-independent binary analysis.
Figure 5C:
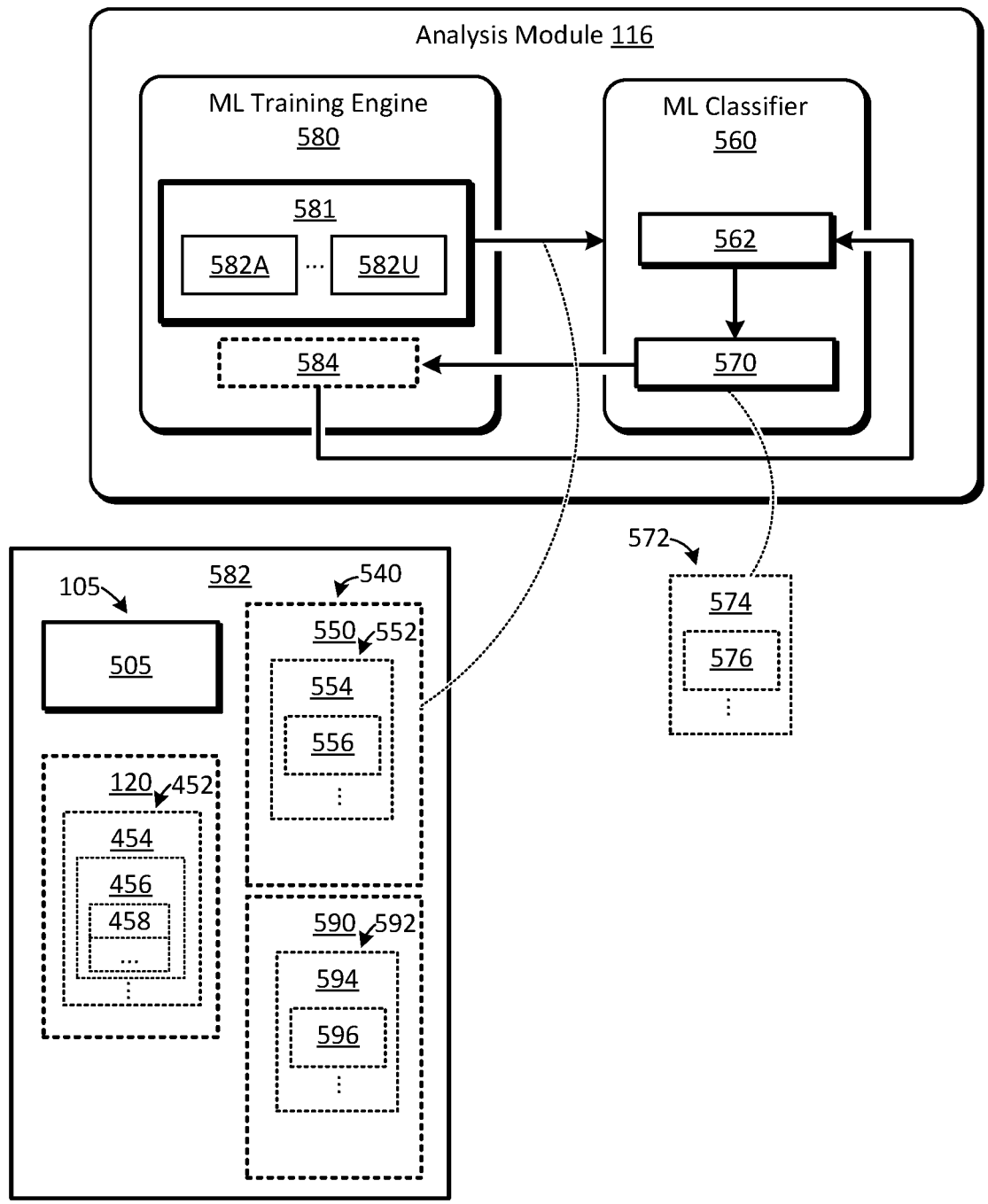
FIG. 5C illustrates a third example of a machine-learning and/or machine-learned analysis module for architecture-independent binary analysis.

FIG. 5B illustrates a second example of an analysis module 116. The analysis module 116 may include and/or be coupled to a feature module 510 and an ML classifier 560. The feature module 510 may be configured to derive feature vectors 550 for binaries 105 that are suitable for ML analysis techniques, as disclosed herein. In the FIG. SB example, the feature module 510 may be configured to generate feature vectors 550 that are suitable for use with the ML classifier 560 of the analysis module 116.

The ML classifier 560 may be configured to produce classifications 570 for binaries 105 based, at least in part, on feature vectors 550 extracted from the binaries 105 (or CIL representations 120 thereof). The ML classifier 560 may implement any suitable ML algorithm, technique, or ML model 562. The ML classifier 560 may implement one or more of an ANN, an AdaBoost ML algorithm, a Random Forest ML algorithm, a kNN ML algorithm, a Tree ML algorithm, an SVM, a Naïve Bayes ML algorithm, a Logistic Regression ML algorithm, and/or the like.

The classification 570 determined for a binary 105 may comprise a label, a classification label, a classification quantity, a classification value, a classification confidence, and/or the like. The classification 570 comprise and/or reference analysis data 150, such as a security label 155. The classification 570 may, therefore, be referred to as a security or threat classification 570. The security label 155 of the classification 570 may quantify a degree and/or confidence that the binary 105 is associated with security threats and/or vulnerabilities, indicate or reference security threats and/or vulnerabilities associated with the binary 105 (if any), indicate or reference security threats and/or vulnerabilities associated with respective components 452 of the binary 105, and/or the like.

In some aspects, the feature vectors 550 may be configured to characterize components 452 of the CIL representations 120 of respective binaries 105 (e.g., may be derived from the CIL code 441 associated with respective components 452 of the CIL representations 120). Therefore, in some implementations, the classifications 570 generated responsive to feature vectors 550 may comprise and/or reference component classifications 572 for respective components 452 of the binary 105. The component classifications 572 may comprise and/or reference security label 155 pertaining the components 452. The security label 155 associated with a component configured to quantify a degree and/or confidence that the component 452 (and/or corresponding binary 105) is associated with security threats and/or vulnerabilities, indicate or reference security threats and/or vulnerabilities associated with the component 452 (if any), and/or the like. A component classification 572 may comprise a label, a classification label, a classification quantity, a classification value, a classification confidence, and/or the like. As illustrated in the FIG. 5B example, the classification 570 determined for the binary 105 may comprise a binary component (BC) classification 574 and one or more function component (FC) classifications 576 (FC classifications 576A-Q). The BC classification 574 determined for a binary component 454 of the binary 105 may be configured to quantify a degree and/or confidence that the binary component 454 is associated with security threats and/or vulnerabilities, indicate or reference security threats and/or vulnerabilities associated with the binary component 454 (if any), and/or the like. The FC classification 576 of a function component 456 may be configured to quantify a degree and/or confidence that the function component 456 is associated with security threats and/or vulnerabilities, indicate or reference security threats and/or vulnerabilities associated with the function component 456 (if any), and/or the like. In the FIG. 5B example, the CIL representation 120 of the binary 105 may comprise a plurality of function components 456A-Q and the classification 570 determined for the binary 105 may comprise, incorporate, and/or be derived from FC classifications 576A-Q, each configured to indicate a confidence and/or degree to which a respective function component 456A-Q of the binary 105 is associated with security threats and/or vulnerabilities, identify and/or reference security threats and/or vulnerabilities associated with the respective function component 456A-Q (if any), and/or the like. As disclosed herein, analysis data 150 (and/or security label 155) determined for the binary 105 may comprise, incorporate, and/or be derived from the classification 570 (and/or component classifications 572) determined for the binary 105 by the ML classifier 560.

The ML classifier 560 may include an ML model 562, which may be configured and/or trained to output classifications 570 that accurately predict security threats and/or vulnerabilities of binaries 105. FIG. 5C illustrates a third example of an analysis module 116. In the FIG. 5C example, the analysis module 116 may include and/or be coupled to an ML training engine 580, which may be configured to develop, train, and/or refine the ML model 562 of the ML classifier 560 to accurately characterize security threats and/or vulnerabilities of binaries 105 based, at least in part, on feature vectors 550 extracted from the binaries 105.

The ML training engine 580 may include and/or be coupled to an ML training dataset 581 comprising one or more ML training entries 582 (e.g., ML training entries 582A through 560U). An ML training entry 582 may include, incorporate, and/or be derived from a training binary 505. The training binary 505 may comprise a binary 105 associated with determined, known, and/or predicted security threats and/or vulnerabilities. Alternatively, or in addition, the training binary 505 may comprise a binary 105 comprising component(s) 452 are associated with determined, known, and/or predicted security threats and/or vulnerabilities (e.g., binary component(s) 454, function component(s) 456, and/or code-block components 458 associated with determined, known, and/or predicted security threats and/or vulnerabilities).

An ML training entry 582 may include, incorporate, and/or be derived from an CIL representation 120 of the training binary 505. The CIL representation 120 may be produced by the normalization module 114, as disclosed herein. The CIL representation 120 of the training binary 505 may comprise CIL code 441, which may be organized into respective components 452, such as a binary component 454, one or more function components 456, one or more code-block components 458, and/or the like.

The ML training entry 582 may further include a feature vector 550 and verified or trusted classification (TC) data 590. The feature vector 550 may be extracted from the CIL representation 120 of the training binary 505 (e.g., by the feature module 510). In some implementations, the feature vector 550 may include, incorporate, and/or be derived from component vectors 552, such as BC vector(s) 554, function vector(s) 556, CBC vector(s) 558, and/or the like, as disclosed herein. The TC data 590 may comprise known, determined, verified, and/or trusted classification 570 of the training binary 505 (and/or components 452 thereof). The TC data 590 may indicate a confidence and/or degree to which the training binary 505 represents security threats or vulnerabilities, identify security threats and/or vulnerabilities associated with the binary 105 (if any), and/or the like.

The ML training engine 580 may utilize the ML training dataset 581 to implement a supervised and/or semi-supervised ML training technique or algorithm. The ML training engine 580 may be configured to train the ML classifier 560 to accurately reproduce TC data 590 of respective ML training entries 582 (e.g., reproduce the classification labels of the TC data 590). More specifically, the ML training engine 580 may be configured to train the ML classifier 560 to produce classifications 570 corresponding to the TC data 590 of respective ML training entries 582 in response to feature vectors 550 of the respective ML training entries 582.

In some implementations, the TC data 590 may comprise, incorporate, and/or be derived from training component (TC) classifications 592. The TC classifications 592 may be configured to indicate a degree and/or confidence that respective components 452 of the training binary 505 are associated with security threats and/or vulnerabilities, identify security threats and/or vulnerabilities associated with the component 452 (if any), and/or the like. The TC classification 592 of a component 452 may comprise a ground truth, predetermined classification, predetermined label, and/or the like. In some implementations, the TC classifications 592 may include a validated or trusted binary component (TBC) classification 594, one or more validated or trusted function component (TFC) classifications 596, and/or the like. The TBC classification 594 of a binary component 454 of a training binary 505 may indicate a degree and/or confidence that the binary component 454 is associated with security threats and/or vulnerabilities, identify security threats and/or vulnerabilities associated with the binary component 454 (if any), and/or the like. The TFC classification 596 determined for a function component 456 of a training binary 505 may indicate a confidence that the function component 456 is associated with security threats and/or vulnerabilities, identify security threats and/or vulnerabilities associated with the function component 456 (if any), and/or the like.

As disclosed above, the ML training engine 580 may be configured to train the ML classifier 560 to produce classifications 570 corresponding to the TC data 590 of respective ML training entries 582 in response to feature vectors 550 of the respective ML training entries 582. In some implementations, the ML training engine 580 may be further configured to train the ML classifier 560 to produce output classifications 570 comprising component classifications 572 that correspond to respective TC classifications 592 of the ML training entries 582 (in response to feature vectors 550 of the ML training entries 582).

The ML training engine 580 may implement one or more training iterations (iterations). An iteration may include: a) configuring the ML classifier 560 to output classification 570 in response to the feature vector 550 of an ML training entry 582 (e.g., inputting the feature vector 550 of the ML training entry 582 into the ML classifier 560); b) determining a classification error 584, which may quantify an error, difference, distance, edit distance, or other quantity determined between the classification 570 output by the ML classifier 560 and the TC data 590 of the ML training entry 582; and c) using the classification error 584 to refine, train, and/or validate the ML model 562.

The ML training engine 580 may implement any suitable training procedure. The ML training engine 580 may utilize the ML training dataset 581 to implement a supervised and/or semi-supervised ML training technique or algorithm. In some implementations, the ML training engine 580 may implement a training, validation, or test procedure in which the ML training dataset 581 are divided into a training set (about 80%), test set (about 10%), and validation set (about 10%). The ML training engine 580 may implement an iterative training procedure that includes one or more training phases, validation phases, and/or and testing phases. A training phase may include one or more epochs, each epoch including inputting ML training entries 582 of the training set into the ML classifier 560 and evaluating the resulting classification 570. The evaluating may include determining a classification error 584 between the classification 570 produced by the ML classifier 560 and the TC data 590 of the ML training entry 582. The ML training engine 580 may continue the training phase until one or more training criteria are satisfied (e.g., weights or other parameters of the ML model 562 converge to stable values, a threshold is reached, and/or the like).

The ML training engine 580 may use classification errors 584 to, inter alia, learn and/or refine the ML model 562. In some implementations, the ML training engine 580 implements an optimization algorithm that adjusts weights and/or other parameters of the ML model 562 to reduce the classification error 584. The ML training engine 580 may implement any suitable training and/or optimization algorithm including, but not limited to: gradient descent, batch gradient descent, stochastic gradient descent, Adam optimization, or the like. The optimization algorithm may incorporate any suitable cost or loss function, such as a binary cross-entropy as the loss function or the like. The ML training engine 580 may adjust the ML model 562 through the optimization algorithm in response to completing: an epoch (after processing the ML training entries 582 included in the training set), a plurality of epochs, one or more sub epochs (after processing a subset of the ML training entries 582 of the training set), and/or the like. The ML training engine 580 may continue the training phase until one or more training-phase criteria are satisfied (e.g., weights of the ML classifier 560 and/or ML model 562 converge to stable values, a threshold is reached, and/or the like).

The ML training engine 580 may be further configured to implement validation phases in response to completion of respective training phases. A validation phase may include evaluating classification 570 produced by the ML classifier 560 (as trained in the training phase) in response to ML training entries 582 of the validation set, which, as disclosed herein, may include a separate subset of the ML training dataset 581 from the training set utilized in the training phase. Classification error 584 determined during the validation phase may be used to validate the ML model 562 learned in the preceding training phase (e.g., may indicate a learn rate of the ML classifier 560 and/or training procedure). The ML training engine 580 may be further configured to utilize the classification error 584 determined during validation phases to iteratively implement training and validation phases until the ML classifier 560 (and/or ML model 562) converges to a local or global minima, or some other validation-phase criteria are satisfied.

The ML training engine 580 may be further configured to implement test phases in response to completion of validation phases. A test phase may include using ML training entries 582 of the test set to determine an unbiased evaluation of the ML model 562 of the ML classifier 560 learned through the preceding training and validation phases. Classification error 584 determined during the test phase may indicate an error rate of the ML classifier 560 (and/or ML model 562) when used to generate classification 570 for actual, unclassified binaries 105.

The analysis module 116 may utilize the ML model 562 learned during training to configure the ML classifier 560 to generate classification 570 that accurately identifies security threats and/or vulnerabilities within binaries 105 configured for operation on a plurality of different computing architectures. The ML model 562 may be used to configure other instances of the ML classifier 560 operating on and/or within other instances of the binary analysis device 101 (and/or other instances of the binary analysis platform 110). The ML model 562 may be maintained on and/or within a non-transitory storage medium, such as NV storage of the computing device 104. Although particular examples of ML training procedures are described herein, the disclosure is not limited in this regard and could be adapted to use and/or incorporate any suitable machine-learning mechanisms, techniques, and/or algorithms.

Figure 5D:
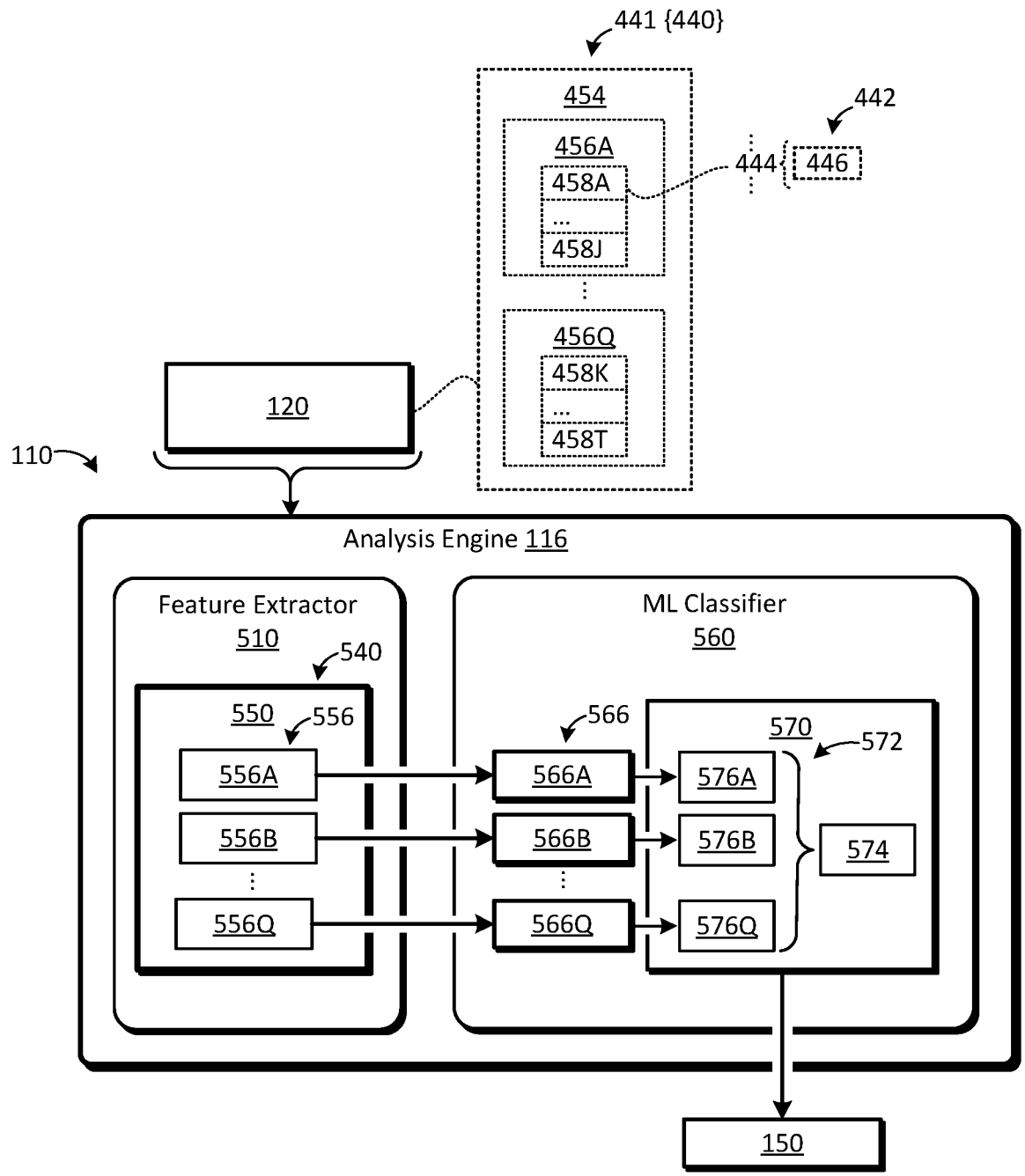
FIG. 5D illustrates a fourth example of a machine-learning and/or machine-learned analysis module for architecture-independent binary analysis.

FIG. 5D illustrates a fourth example of an analysis module 116 of a binary analysis platform 110. The analysis module 116 may comprise and/or be coupled to a feature module 510 and ML classifier 560. In the FIG. 5D example, the ML classifier 560 may comprise a machine-learning or machine-learned function classification (MLFC) model 566. The ML classifier 560 (and/or MLFC model(s) 566) may implement any suitable ML algorithm, technique, or ML model. The ML classifier 560 may implement one or more of an ANN, an AdaBoost ML algorithm, a Random Forest ML algorithm, a kNN ML algorithm, a Tree ML algorithm, an SVM, a Naïve Bayes ML algorithm, a Logistic Regression ML algorithm, and/or the like.

The MLFC model(s) 566 may be configured to produce FC classifications 576 for respective function components 456 of a binary 105. As disclosed herein, an FC classification 576 may comprise a label, a classification label, a classification quantity, a classification value, a classification confidence, and/or the like. An FC classification 576 may comprise and/or reference analysis data 150, such as security label 155 (e.g., may comprise and/or correspond to a security or threat classification). The security label 155 may quantify a degree and/or confidence that the corresponding function of the binary 105 is associated with security threats and/or vulnerabilities, indicate or reference security threats and/or vulnerabilities associated with the function (if any), and/or the like. In some implementations, an MLFC model 566 may be trained to identify function component(s) 456 that match (and/or are similar to) a target function component 456 (e.g., identify function component(s) 456 that match and/or are similar to respective function components 456 of the binary 105 being analyzed). The function components 456 of the binary 105 may be assigned FC classification 576 (and/or security classifications 155) of the matching (or similar) function components 456.

In the FIG. 5D example, the binary 105 may implement Q functions (represented by function components 456A-Q of the CIL representation 120). The classification 570 of the binary 105 may, therefore, comprise, incorporate, and/or be derived from FC classification 576A-Q determined for the respective function components 456A-Q of the binary 105. The FC classifications 576A-Q may be determined by an MLFC model 566, as disclosed herein.

The ML classifier 560 may comprise one or more MLFC model(s) 566. In some implementations, the ML classifier 560 may comprise a single MLFC model 566. The ML classifier 560 may utilize the MLFC model 566 to assign FC classifications 576 to respective function components 456 (e.g., assign FC classifications 576A-Q to function components 456A-Q sequentially or in series). Alternatively, the ML classifier 560 may comprise, instantiate, and/or be coupled to a plurality of MLFC models 566 (e.g., MLFC models 566A through 566Q). The MLFC models 566A-Q may be configured to determine FC classifications 576 for a plurality of function components 456 in parallel. In the FIG. 5D example, MLFC models 566A-Q may be configured to determine FC classifications 576A-Q for function components 456A-Q (based on feature vectors 556A-Q extracted from the function components 456A-Q). The BC classification 574 may incorporate and/or be derived from the FC classifications 576A-Q.

Figure 5E:
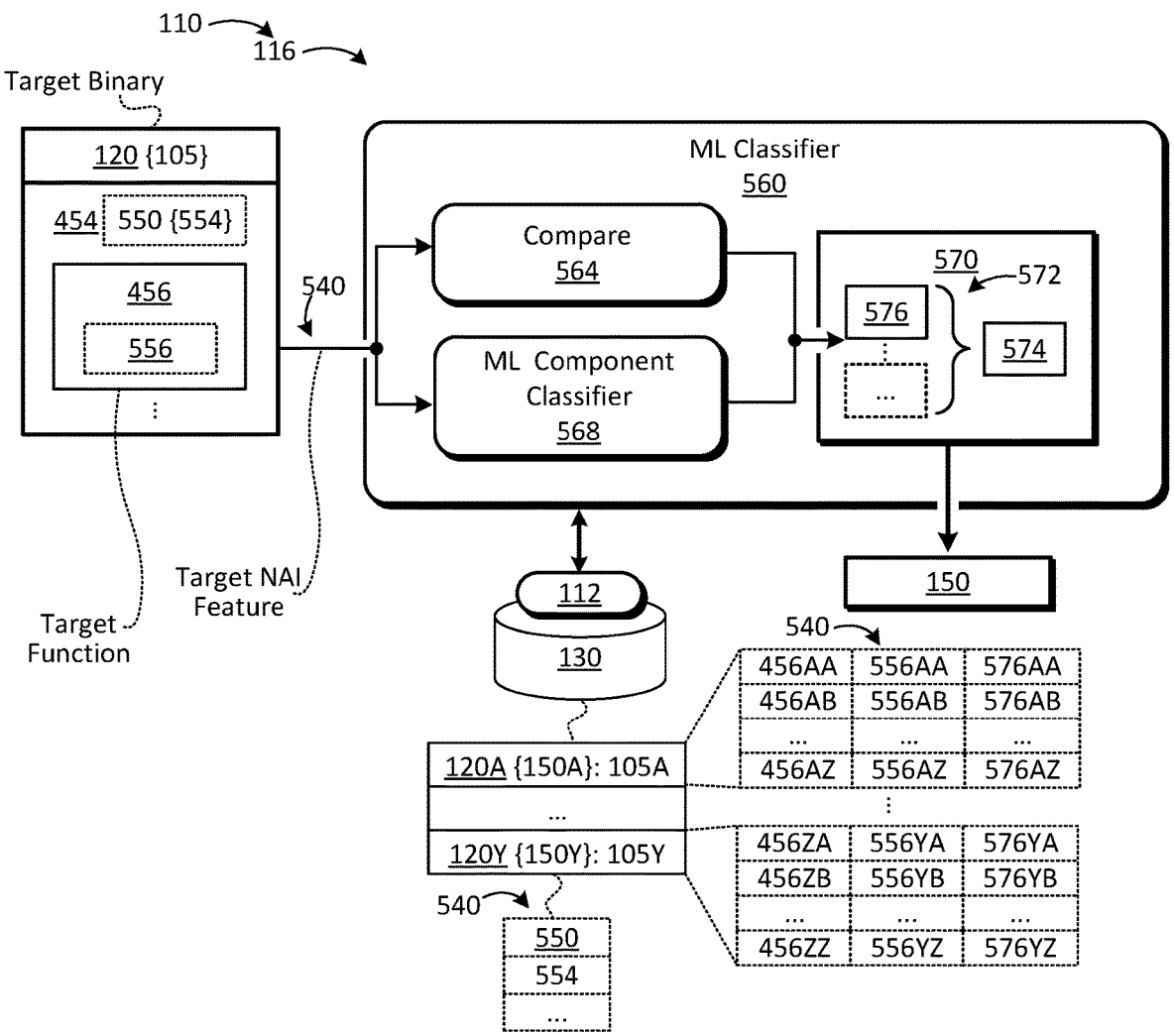
FIG. 5E illustrates a fifth example of a machine-learning and/or machine-learned analysis module for architecture-independent binary analysis.

Alternatively, the ML classifier 560 may be configured to identify binaries 105 having features 540 that match (or are similar) to features 540 of previously analyzed binaries 105 (e.g., binaries 105 maintained in an analysis library, such as the datastore 130, graph store 630, or the like). FIG. 5E illustrates a fifth example of an analysis module 116 comprising a ML classifier 560. In the FIG. 5E example, the ML classifier 560 may comprise and/or be coupled to a binary analysis library (datastore 130), compare module 564, and/or ML component classifier 568.

The datastore 130 may comprise CIL representations 120 of previously analyzed binaries 105 (e.g., CIL representations 120A-Z of binaries 105A-Z). The CIL representations 120 may include and/or reference analysis data 150. The analysis data 150 of each binary 105 may comprise security classifications 155, such as classifications 570, TC data 590, and/or the like. The security classifications 155 may quantify a degree and/or confidence that the corresponding binary 105 is associated with security threats and/or vulnerabilities, and/or may identify the security threats and/or vulnerabilities associated with the binary 105 (if any).

The analysis data 150 maintained within the datastore 130 may further comprise security classifications 155 pertaining to respective components 452, such as function components 456 or the like. As illustrated in the FIG. 5E example, the datastore 130 may comprise analysis data 150 pertaining to a plurality of function components 456AA through 456ZZ, including function components 456AA-AZ implemented by binary 105A, function components 456YA-YZ implemented by binary 105Y, and so on. The function components 456 maintained within the datastore 130 may comprise and/or reference FC classifications 576, which may be configured to quantify a degree and/or confidence that respective function components 456 are associated with security threats and/or vulnerabilities, indicate or reference security threats and/or vulnerabilities associated with the respective function components 456 (if any), and/or the like.

The compare module 564 may implement and/or be coupled to search functionality (e.g., a search engine 634 as disclosed in further detail herein). The compare module 564 may be configured to identify "matching" binaries 105 of a "target" binary 105 being analyzed. A "matching" binary 105 of a target binary 105 may comprise a binary 105 having CIL feature(s) 540 that match and/or are within a threshold to CIL feature(s) 540 of the target binary 105 (target CIL feature(s) 540). More specifically, a matching binary 105 may be a binary 105 having a feature vector 550 (or BC vector 554) that matches (or is within a threshold) of the feature vector 550 (or BC vector 554) of the target binary 105. If a matching binary 105 is identified, the ML classifier 560 may assign classification 570 or TC data 590 (and/or corresponding security label 155) of the matching binary 105 to the target binary 105.

Alternatively, the compare module 564 may be configured to analyze lower-level components 452 of the target binary 105. The compare module 564 may be configured to identify matching function components 456 of respective function components 456 of the target binary 105 (matches for target function components 456). The compare module 564 may detect a match in response to determining that the FC vectors 556 of the target function component 456 and matching function component 456 are equivalent (or within a threshold). The ML classifier 560 may assign function components 456 of the target binary 105 the FC classifications 576 (or TFC classifications 596) of matching function components 456 identified within the datastore 130 (if any). The ML classifier 560 may be further configured to determine a classification 570 for the target binary 105 based, at least in part, on FC classifications 576 assigned to the function components 456 of the target binary 105.

Figure 5F:
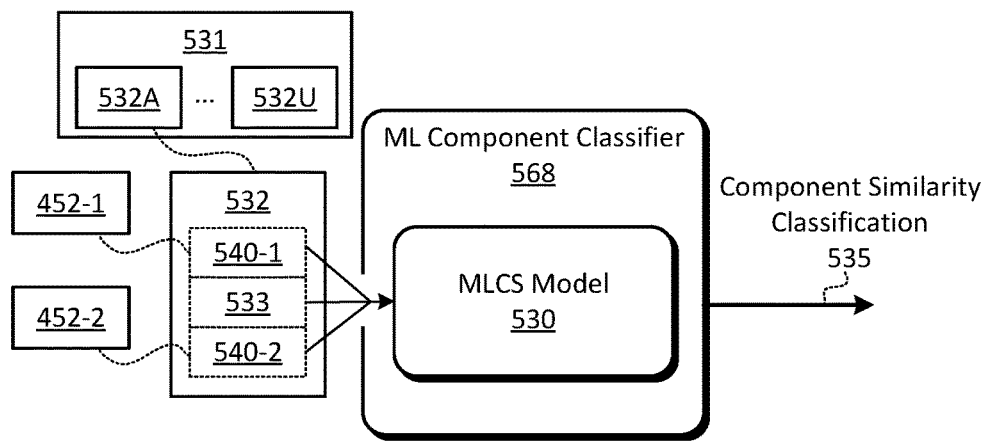
FIG. 5F illustrates an example of a machine-learning and/or machine-learned component classifier.

If matches for the target binary 105 (and/or target function(s) 456) are not identified, the ML classifier 560 may attempt to identify a similar (or equivalent) binary 105 (or component(s) 452) by use of the ML component classifier 568. As illustrated in FIG. 5F, the ML component classifier 568 may comprise and/or be coupled to an ML component similarity (MLCS) model 530. The MLCS model 530 may be trained to identify and/or quantify a functional similarity of binaries 105 (or components 452 of respective binaries 105) based, at least in part, on the CIL features 540 thereof. The MLCS model 530 may comprise and/or implement any suitable ML technique, architecture, or algorithm including, but not limited to: ANN, AdaBoost, Random Forest, clustering algorithm, kNN, Tree, SVM, Naïve Bayes, Logistic Regression, and/or the like.

In the FIG. 5F example, the MLCS model 530 may be trained using an MLCS dataset 531. The MLCS dataset 531 may include a plurality of MLCS training entries 532 (e.g., MLCS training entries 532A-U), each comprising CIL features 540 corresponding to a respective pair of components 452 (e.g., a pair of component features 552-1 and 552-2) and a validated or trusted component similarity (TCS) classification 533. The CIL features 540 of each MLCS training entry 532 may correspond to a same type of component 452 (a pair of binary components 454, function components 456, code-block components 458, or the like). Alternatively, or in addition, the MLCS model 530 may comprise a plurality of MLCS models 530, each trained to quantify functional similarity of a respective type of component 452, e.g., a first MLCS model 530 trained to quantify functionality similarity between binary components 454 (based on BC vectors 554), a second MLCS model 530 trained to quantify functional similarity between functional components 456 (based on FC vectors 556), and so on.

The TCS classification 533 of each MLCS training entry 532 may indicate a known or predetermined functional similarity between the specified components 452-1/452-2 per the specified features 540-1/540-2. The TCS classifications 533 may quantify functional similarity as a value between 0 and 1, with 1 being highly similar or equivalent and 0 being dissimilar. Alternatively, or in addition, the TCS classifications 533 may quantify similarity using labels, symbols, or the like.

The MLCS model 530 may be trained to learn correlations between functional similarity and feature 540 similarity. In the FIG. 5F example, the MLCS model 530 may be trained to accurately replicate the TCS classifications 533 of the MLCS training entries 532. More specifically, the MLCS model 530 may be trained to output component similarity (CS) classifications 535 that match (and/or are within an accuracy threshold) of the TCS classifications 533 of the MLCS training entries 532. The MLCS model 530 may be trained, refined, tested, and/or validated using any suitable training and/or optimization algorithm including, but not limited to: gradient descent, batch gradient descent, stochastic gradient descent, Adam optimization, or the like.

Referring back to FIG. 5E, if the compare module 564 fails to identify a matching component 452 for the target binary 105 (and/or one or more of the target function(s) 456 thereof), the ML classifier 560 may attempt to identify a similar binary 105 (or component 452) using the ML component classifier 568. The ML classifier 560 may detect a matching component 452 of a target component 452 in response to determining that the component similarity classification 535 for the components 452 satisfies a threshold (or is higher than component similarity classifications 535 determined of other component 452 within the datastore 130). The ML classifier 560 may apply the classification 570 (or TC data 590) of the matching component 452, generate analysis data 150 for the binary 105 based on the classification 570 (or TC data 590), and so on.

Figure 6A:
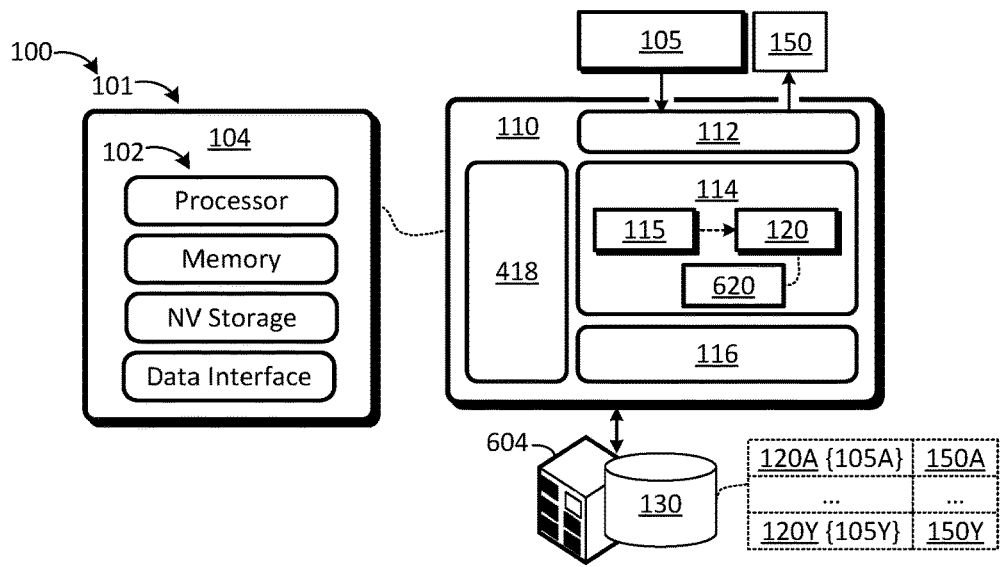
FIG. 6A illustrates another example of a binary analysis platform.

FIG. 6A illustrates another example of a system 100 comprising a binary analysis device 101 configured to implement aspects of architecture-independent binary analysis. The binary analysis device 101 may implement a binary analysis platform 110 on computing resources 102 of a computing device 104. The binary analysis platform 110 may include and/or be coupled to a normalization module 114 and analysis module 116.

In the FIG. 6A example, the binary analysis platform 110 may further include and/or be coupled to a code analyzer 418. The code analyzer 418 may be configured to capture and/or preserve structural and/or semantic information. The code analyzer 418 may be further configured to determine and/or capture information pertaining to interactions and/or relationships between the components 452 of respective binaries 105. The code analyzer 418 may record structural and/or semantic information pertaining to binaries 105 within CIL representations 120 of the binaries 105. In some implementations, the code analyzer 418 is configured to record structural and/or semantic information in graph representations 620. The graph representation 620 of a binary 105 may define and/or encode one or more of: an execution flow (e.g., an execution flow between components 452 of the binary 105), a call flow, a control flow, a data flow, and/or the like. The CIL representation 120 of the binary 105 may include and/or incorporate the graph representation 620 produced by the code analyzer 418.

In some implementations, the code analyzer 418 includes and/or is coupled to a datastore 130. The binary analysis platform 110 may be configured to maintain CIL representations 120 (and corresponding graph representations 620) of binaries 105 within the datastore 130. In the FIG. 6A example, the datastore 130 may comprise a plurality of CIL representations 120A through 120Y, each comprising a graph representation 620 of a respective binary 105 configured for operation on a respective computing architecture.

The datastore 130 may be maintained on persistent, non-transitory storage resources of a computing system 604, such as an internal storage device, an external storage device, a remote storage device, a NAS, a database management system (DBMS), a distributed storage system, a graph datastore, a soft schema datastore, and/or the like. The computing system 604 may comprise and/or be implemented by a device (e.g., the computing device 104), a server, a distributed computing system, a cloud computing system, a cluster, and/or the like.

Figure 6B:
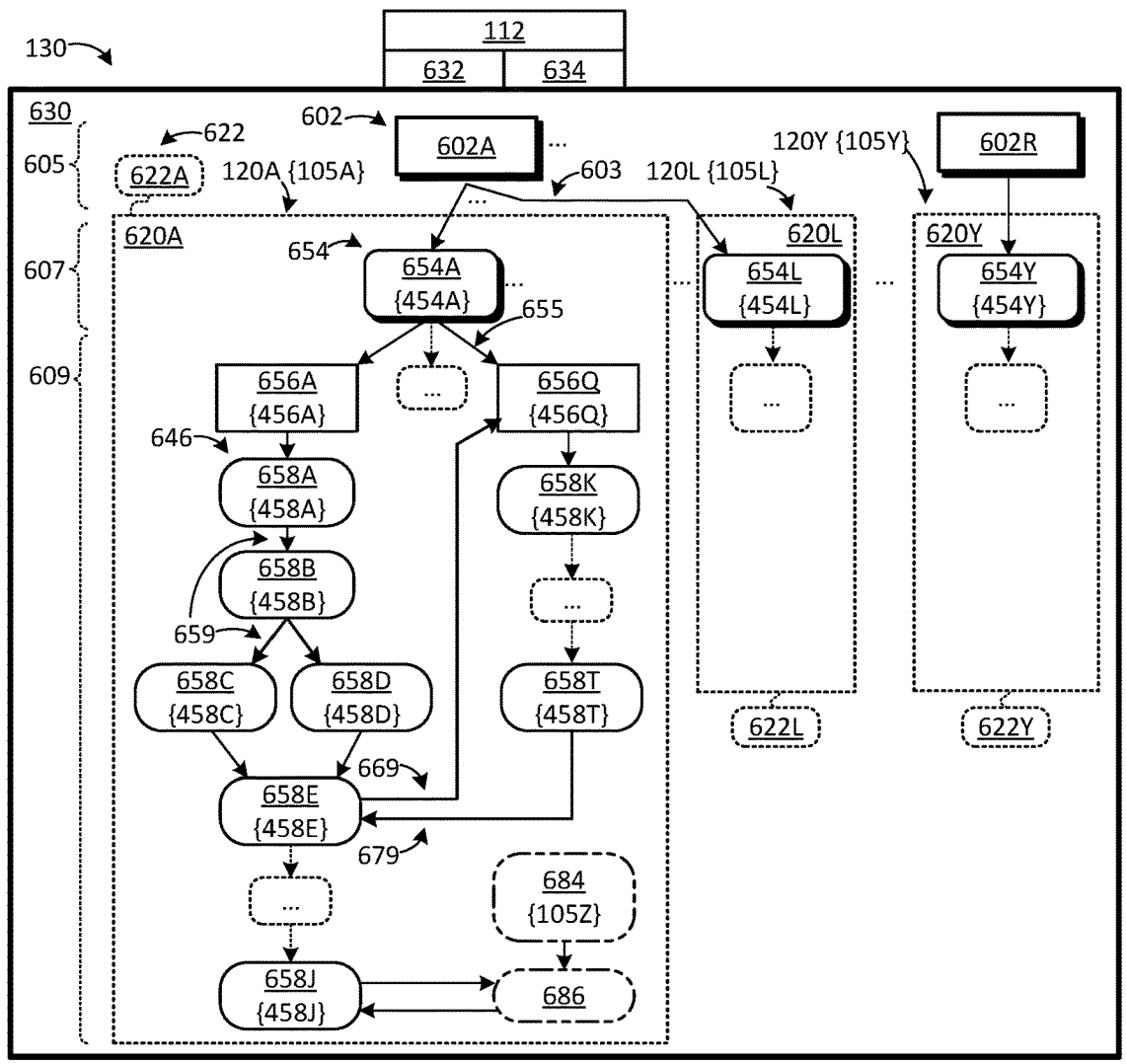
FIG. 6B illustrates an example of a datastore configured to maintain graph representations of binaries, the binaries configured for operation on a plurality of different computing architectures.

FIG. 6B illustrates an example of a datastore 130 comprising CIL representations 120 of binaries 105 configured for operation on a plurality of different computing architectures (and/or computing platforms). The datastore 130 may be configured to store, represent, and/or maintain CIL representations 120 of binaries 105. The datastore 130 may comprise CIL representations 120A-Y for binaries 105A-Y, respectively. As illustrated in FIG. 6B, the datastore 130 may comprise and/or implement a graph store 630. The datastore 130, binary analysis platform 110, and/or code analyzer 418 may comprise and/or be coupled to a datastore (DS) manager 632. The DS manager 632 may be configured to maintain graph representations 620 of binaries 105 within the graph store 630. As illustrated, the DS manager 632 may maintain graph representations 620A-Y, each corresponding to a respective binary 105A-Y. The binaries 105A-Y may be configured for operation on specified computing architectures of a plurality of computing architectures.

The DS manager 632 may be configured to implement a hierarchical arrangement and/or organization of the graph representations 620 within the graph store 630. The hierarchy may comprise a highest level, e.g., a root or computing architecture (CA) level 605. The CA level 605 may comprise vertices and/or nodes configured to represent respective computing architectures. A next lower level of the hierarchy (a binary level 607) may comprise child nodes of the root nodes. The binary level 607 may comprise vertices and/or nodes configured to represent respective binaries 105 and/or binary components 454 (may comprise and/or reference graph representations 620 of binaries 105 configured for operation on respective computing architectures). Lower levels 609 of the hierarchy (levels below the binary level 607) may comprise vertices and/or nodes configured to represent the functional and/or logical implementation of respective binaries 105 (e.g., represent respective functions implemented by the binaries 105).

As disclosed above, the DS manager 632 may be configured to organize graph representations 620 by computing architecture. In the FIG. 6B example, the graph representations 620A-Y of binaries 105A-Y may be organized based, at least in part, on the computing architectures on which the binaries 105A-Y are configured to operate. The graph store 630 may comprise and/or reference one or more computing architecture (CA) vertices or nodes 602 (within the CA level 605), each CA node 602 configured to represent a respective one of a plurality of computing architectures. A CA node 602 may include any suitable information pertaining to a computing architecture, including, but not limited to: an identifier of the computing architecture (e.g., a name, distinguished name, or other suitable identifier), a version of the computing architecture, a revision of the computing architecture, information pertaining to a computing platform of the computing architecture (an execution environment, operating system, operating system version, firmware, firmware version, or the like), CA metadata 250 of the computing architecture, and so on.

The CA nodes 602 may reference CIL representations 120 (and/or corresponding graph representations 620) of binaries 105 configured for operation on the computing architecture represented thereby. A CA node 602 may include and/or reference zero or more child nodes, each child node comprising the CIL representation 120 (and/or graph representation 620) of a respective binary 105. CIL representations 120 of binaries 105 configured for operation on a specified computing architecture may, therefore, be linked and/or referenced by the CA node 602 configured to represent the specified computing architecture within the graph store 630. In the FIG. 6B example, the graph store 630 comprises R root CA nodes 602 (CA nodes 602A-R), each configured to represent a respective computing architecture of a plurality of computing architectures (e.g., R different computing architectures).

In some implementations, CA nodes 602 may comprise zero or more "has binary" edges (binary edges 603), each corresponding to a respective binary 105 of the CA node 602. A binary edge 603 may reference the graph representation 620 of a binary 105. More specifically, each binary edge 603 may reference the top-level node of the graph representation 620 of a respective binary 105 (a "binary" node 654). A binary node 654 may be configured to represent a specified binary 105 (and/or a binary component 454 of the specified binary 105). In the FIG. 6B example, binary node 654A may represent binary 105A, binary node 654L may represent binary 105L, binary node 654Y may represent binary 105Y, and so on. The binaries 105A-Y may be configured for operation on respective computing architectures. For example, binaries 105A-L may be configured for operation on the computing architecture represented by CA node 602A and, as such, the graph representations 620A-L of the binaries 105A-L may be linked to the CA node 602A by respective binary edges 603. Graph representations 620 of binaries 105 configured for operation on other computing architectures may be linked to other CA nodes 602 of the graph store 630. For example, the binary 105Y may be configured for operation on the computing architecture represented by CA node 602R and, as such, the graph representation 620Y of the binary 105Y may be referenced by an binary edge 603 of CA node 602R.

A binary node 654 may comprise metadata including any suitable information pertaining to a binary 105, binary component 454, executable implemented by the binary 105, library implemented by the binary 105, firmware implemented by the binary 105, and/or the like. The metadata of a binary node 654 may include, but is not limited to: a identifier of the binary 105 and/or binary component 454 (e.g., name, a distinguished name, a unique identifier, a file name, and/or the like), a version identifier, a revision identifier, an identifier of a supplier or author of the binary 105, a creation date of the binary 105, a size of the binary 105, a signature of the binary 105 (e.g., a hash, cyclic redundancy check (CRC), and/or the like), CA metadata 250 determined for the binary 105, an entropy profile 230 of the binary 105, information pertaining to an executable implemented by the binary 105, information pertaining to a library implemented by the binary 105, information pertaining to firmware implemented by the binary 105, information pertaining to functionality implemented by the binary 105, information pertaining to objects implemented by the binary 105, AIL code 431 derived from the binary 105 (and/or associated with the binary component 454), CIL code 441 generated for the binary 105, and/or the like. In some implementations, binary nodes 654 may comprise ML metadata.

A binary node 654 may comprise and/or reference a feature vector 550 of the corresponding binary 105 and/or a BC vector 554 of the corresponding binary component 454. For example, the binary node 654A may comprise a feature vector 550 for binary 105A and/or a BC vector 554 for the corresponding binary component 454A. The feature vectors 550 and/or BC vectors 554 of respective binary nodes 654 may be generated by the feature module 510, as disclosed herein. The BC vector 554 of a binary node 654 may quantify occurrences of respective CIL opcodes 446 within the binary component 454 (e.g., within respective function components 456 of the binary component 454).

In some implementations, binary nodes 654 may further comprise and/or reference analysis data 150 and/or classifications 570 determined for respective binaries 105. The classification 570 of a binary node 654 may indicate a degree or confidence that the binary 105 (and/or binary component 454) represented by the binary node 654 comprises security threats and/or vulnerabilities, may indicate or reference security threats and/or vulnerabilities associated with the binary 105 (and/or binary component 454), and/or the like. In some implementations, the binary node 654 may comprise and/or reference one or more component classifications 572, such as an BC classification 574 determined for the binary component 454 of the binary node 654. The classification 570 and/or component classification(s) 572 may be determined by an ML implementation, such as an instance of the ML classifier 560 or the like. The classification 570 and/or component classifications 572 may be determined based, at least in part, on the feature vector 550 extracted from the binary 105 (and/or BC vector 554 extracted from the corresponding binary component 454).

Alternatively, or in addition, a binary node 654 may comprise and/or reference TC data 590 of the binary 105. As disclosed herein, the TC data 590 of a binary 105 may comprise and/or reference determined, known, and/or predicted security threats and/or vulnerabilities of the binary 105, indicate a confidence or degree to which the binary 105 is indicative of security threats and/or vulnerabilities, identify and/or reference security threats and/or vulnerabilities associated with the binary 105 (if any), and/or the like. The TC data 590 of a binary 105 may be based, at least in part, on knowledge and/or experience pertaining to the binary 105; the TC data 590 may be derived from binary analysis, execution traces, memory traces, runtime analysis, security analysis, and/or the like. The TC data 590 of a binary node 654 may comprise, incorporate, reference, and/or be derived from one or more TC classifications 592 (e.g., an TBC classification 594, and/or the like). The TC data 590 (and/or TBC classification 594) of a binary node 654 may enable the corresponding binary 105 to be used to train, validate, and/or test an ML classifier 560, as disclosed herein. More specifically, the TC data 590 (and/or TBC classifications 594) of a binary node 654 may enable the binary 105 of the binary node 654 to be used as a training binary 505 of an ML training entry 582.

The binary nodes 654 of the graph store 630 may comprise and/or reference graph representations 620 of respective binaries 105. A binary node 654 may include zero or more "function edges" 655, each function edge 655 comprising and/or referencing a respective function node 656 of the graph representation 620. The function nodes 656 may be configured to represent respective function components 456 of the binary component 454 (represent respective functions implemented by the binary 105). A function node 656 may include any suitable information pertaining to a function and/or function component 456 including, but not limited to: an identifier of the function (e.g., a name, symbol, or other semantic information), parameters of the function, input(s) to the function, output(s) of the function, a signature of the function, an address of the function within the binary 105 (e.g., a start address, end address, and/or the like), AIL code 431 associated with the function component 456, CIL code 441 associated with the function component 456, and so on. Function nodes 656 may further comprise function encodings determined for the corresponding function components 456, as disclosed in further detail herein (e.g., function encodings 1055 as disclosed below in conjunction with FIGS. 10A-D).

In some implementations, the function nodes 656 may further include CIL features 540, such as FC vectors 556. The FC vector 556 of a function node 656 may be derived from the CIL representation 120 of the function (e.g., may be derived from the function component 456, as disclosed herein). The FC vector 556 of a function node 656 may quantify occurrences of respective CIL opcodes 446 within the corresponding function component 456 (e.g., quantity of respective CIL opcodes 446 within the code-block components 458 of the function component 456).

A function node 656 may comprise and/or reference classification data, such as an FC classification 576. The FC classification 576 of a function node 656 may be configured to quantify a degree and/or confidence that the corresponding function component 456 is associated with security threats and/or vulnerabilities, indicate or reference security threats and/or vulnerabilities associated with the function component 456 (if any), and/or the like. The FC classification 576 may be determined by, inter alia, an ML implementation, such as an instance of the ML classifier 560. The FC classification 576 may be determined based, at least in part, on the feature vector 550 extracted from the binary 105 (and/or FC vector 556 extracted from the corresponding function component 456).

Alternatively, or in addition, a function node 656 may comprise and/or reference ML training data, such as a TFC classification 596. The TFC classification 596 of a function node 656 may indicate a degree and/or confidence that the function component 456 of the function node 656 is associated with security threats and/or vulnerabilities, indicate security threats and/or vulnerabilities associated with the function component 456, and/or the like. The TFC classification 596 may be based, at least in part, on knowledge and/or experience pertaining to the function component 456 of the binary 105; the TFC classification 596 may be derived from binary analysis, execution traces, memory traces, runtime analysis, security analysis, and/or the like.

In the FIG. 6B example, the binary 105A implements a plurality of functions (e.g., Q functions) and, as such, the CIL representation 120A of the binary 105A may comprise a plurality of function components 456 (e.g., function components 456A-Q), each configured to represent the functional implementation of a respective one of the Q functions implemented by the binary 105A. Thus, and as illustrated in FIG. 6B, the graph representation 620A of the binary 105A may comprise a plurality of function nodes 656 (e.g., function nodes 656A-Q), each configured to represent a respective one of the functions and/or function components 456A-Q. In FIG. 6B, function nodes 656 representing function components 456 of other binaries 105 (e.g., binaries 105L and 105Z) are not depicted to avoid obscuring details of the illustrated examples.

A function node 656 may comprise and/or reference a function graph 646. The function graph 646 may represent the functional implementation of the corresponding function (e.g., represent execution, call, control, and/or data flow of the function component 456). A function graph 646 may comprise one or more code-block nodes 658, each configured to represent a respective code-block component 458 of the function component 456. A code-block node 658 may comprise any suitable information pertaining a code block and/or code-block component 458, including, but not limited to: an identifier of the code block, a signature of the code block, an address of the code block within the binary 105, AIL code 431 associated with the code-block component 458, CIL code 441 associated with the function component 456, and so on. Code-block nodes 658 may further comprise ML feature data, such as CBC vectors 558 extracted from the corresponding code-block components 458.

The edges of a function graph 646 may represent execution, call, control, and/or data flow between respective code blocks of the corresponding function component 456. A function graph 646 may comprise control logic (CL) edges 659, which may represent control logic and/or control flow through the function graph 646. For example, the CL edge 659 of code-block 658A may represent "unconditional" control flow from code-block component 458A to code-block component 458B; the CL edges 659 of code-block node 658B may represent respective "true" and "false" conditions of code-block component 458B; and so on. Function graphs 646 may further comprise call edges 669 and/or return edges 679. A call edge 669 may represent a call directed to a method or function implemented by the binary 105 (an "internal" function or method call), a call directed to another binary 105 (an "externa" call), a call directed to a remote entity (a "remote" call), and/or the like. A return edge 679 may represent a return from a method or function call. In some implementations, a return edge 679 may identify the code-block node 658 from which the call returns. In the FIG. 6B example, the code-block component 458RE of code-block node 658E may call a function represented by function node 656Q (function component 456Q), which may return from the code-block component 458T represented by code-block node 658E. The call edge 669 of the code-block node 658E may, therefore, represent an internal call to a function implemented by the binary 105A.

As disclosed above, a call edge 669 may represent an "internal dependency" of a binary 105. As used herein, an "internal dependency" of a binary 105 refers to a dependency on functionality implemented by the binary 105 itself. For example, the call edge 669 of the code-block node 658E represents an internal dependency between function components 456A and 456Q of binary 105A (or between the code-block node 658E and the function node 656Q).

Alternatively, a call edge 669 may represent an "external dependency." As used herein, an "external dependency" refers to a dependency of a binary 105 on another entity, such as another binary 105 (a dependency on a library, remote execution, or the like). For example, a call edge 669 of the graph representation 620 of a first binary 105 may reference a function implemented by a second binary 105 and, as such, the first binary 105 may have an external dependency on the second binary 105. The DS manager 632 may be configured to represent external dependencies between binaries 105 with call and/or return edges 669/679 between graph representations 620 of the binaries 105 (e.g., between code-block and/or function nodes 658/656 of the graph representations 620 of the first and second binaries 105).

In some implementations, the DS manager 632 may be further configured to represent "remote dependencies" of a binary 105. As used herein, a "remote dependency" refers to a dependency involving remote execution, such as remote method invocation (RMI), a remote procedure call (RPC), and/or the like. A remote dependency may be represented by call and/or return edges 669/679 to a representation of the remote dependency within the graph store 630, such as a remote node or the like (not illustrated in FIG. 6B to avoid obscuring details of the illustrated examples).

The DS manager 632 may be further configured to represent "unresolved dependencies" within the graph store 630. As used herein, an "unresolved dependency" refers to a dependency or reference to a binary 105 for which no graph representation 620 is available within the graph store 630 (a reference or dependency on an "unprocessed" or "unavailable" binary 105). In the FIG. 6B example, the code-block node 658E of binary 105A may call a function implemented by binary 105Z, which may not have a graph representation 620 within the graph store 630 (the binary 105Z may be unprocessed or unavailable). The binary 105A may, therefore, have an unresolved dependency on binary 105Z.

In some implementations, the DS manager 632 may create placeholders 684 to represent unavailable binaries 105 within the graph store 630. The placeholder 684 for an unavailable binary 105 may include one or more placeholder function (PF) nodes 686, each configured to represent a function implemented by the binary 105 (e.g., a function referenced by the graph representation 620 of another binaries 105 within the graph store 630). In the FIG. 6B example, the code-block node 658J may call a function implemented by a binary 105Z. As disclosed above, the DS manager 632 may determine that a graph representation 620 for the binary 105Z is not available in the graph store 630. Accordingly, the graph representation 620A of binary 105A may have an unresolved dependency on binary 105Z. In response, the DS manager 632 may create a placeholder 684 to represent the unavailable binary 105Z within the graph store 630. Since the binary 105Z is referenced by the binary 105A, which is configured for operation on the computing architecture represented by CA node 602A, the placeholder 684 for binary 105Z may be linked to the CA node 602A by a binary edge 603 (or placeholder binary edge); not shown in FIG. 6B to avoid obscuring details of the illustrated examples. The placeholder 684 may comprise a PF node 686 configured to represent the function called by the code-block node 658J of binary 105A. The DS manager 632 may create call and/or return edges 669/679, or placeholder call/return edges, to represent the unresolved dependency of binary 105A on binary 105Z (e.g., represent the function call from code-block node 658J to the PF node 686 of the placeholder 684 for the unavailable binary 105Z).

The DS manager 632 and/or binary analysis platform 110 may be configured to attempt to resolve the unresolved dependencies of binaries 105. Resolving an unresolved dependency of a binary 105 may comprise: a) identifying unavailable binaries 105 referenced by the binary 105, and b) acquiring graph representations 620 of the unavailable binaries 105. The unresolved dependencies of a binary 105 may be identified by, inter alia, identifying placeholders 684 and/or PF nodes 686 referenced by the graph representation 620 of the binary 105. In the FIG. 6B example, the DS manager 632 may determine that binary 105A has an unresolved dependency on binary 105Z based, at least in part, on the call edge 669 linking the code-block node 658J of the graph representation 620A of the binary 105A to the PF node 686 of the placeholder 684 for the unavailable binary 105Z. Resolving the unresolved dependency may comprise acquiring a graph representation 620 of the binary 105Z and importing the acquired graph representation 620 into the graph store 630. The graph representation 620 of binary 105Z may be acquired by the binary analysis platform 110, as disclosed herein. The binary analysis platform 110 may be configured to produce an CIL representation 120 and/or graph representation 620 of the binary 105Z by use of the normalization module 114, code analyzer 418, and/or the like.

The DS manager 632 may be configured to import graph representations 620 of binaries 105 into the graph store 630. The DS manager 632 may be configured to import the graph representation 620 of binary 105Z in response to receiving the graph representation 620 from the binary analysis platform 110 (and/or normalization module 114 or code analyzer 418). Importing the graph representation 620 of the binary 105Z may comprise linking the graph representation 620 to the CA node 602 associated with the computing architecture on which the binary 105Z is configured to operate (e.g., CA node 602A). The Importing may further comprise replacing the placeholder 684 for the binary 105Z with the graph representation 620 of the binary 105Z within the graph store 630 (e.g., removing the unavailable designation or flag from the binary 105Z). The placeholder 684 for the binary 105Z may be replaced with a binary node 654 of the graph representation 620 generated for the binary 105Z.

Importing the graph representation 620 of the binary 105Z into the graph store 630 may further comprise modifying graph representations 620 of one or more other binaries 105, such as the graph representation 620A of binary 105A. The graph representations 620 may be modified to update unresolved dependencies associated with the binary 105Z. More specifically, the graph representations 620 may be modified to reference the graph representation 620 of the binary 105Z rather than the placeholder 684 for the binary 105Z (e.g., reference function nodes 656 of the binary 105Z rather than PF nodes 686 of the placeholder 684). In the FIG. 6B example, the graph representation 620 generated for binary 105Z may comprise a binary node 654, the binary node 654 comprising a function node 656 configured to represent the function called by the code-block node 658J of binary 105A. Importing the graph representation 620 of the binary 105Z may comprise: a) redirecting call edges 669 that previously referenced the PF node 686 of the placeholder 684 for the binary 105Z to reference the function node 656 of the graph representation 620 generated for the binary 105Z, and b) redirecting return edges 679 that previously referenced the PF node 686 to reference code-block nodes 658 of the graph representation 620 of the binary 105Z from which the calls return.

Although particular examples of graph representations 620 are described herein, the disclosure is not limited in this regard and could be adapted to include vertexes, nodes and/or edges representing any suitable aspect of a binary 105, CIL representation 120, component 452, binary component 454, function component 456, code-block component 458, and/or the like. In some implementations, the graph representations 620 may further include edges and/or nodes representing memory, variables, stack information, execution state, and so on, which may be linked to respective binaries 105 (e.g., linked to graph representations 620 and/or function graphs 646 of the respective binaries 105). Furthermore, components 452 having content that depends on runtime state may be represented as phi nodes with edges to context-specific child nodes.

As disclosed herein, the DS manager 632 may be configured to import graph representations 620 of binaries 105 into the graph store 630. Importing the graph representation 620 of binary 105 into the graph store 630 may comprise linking the graph representation 620 of the binary 105 to graph representations 620 of one or more other binaries 105 and/or representing unresolved dependencies of the binary 105 within the graph store 630. For example, code-block nodes 658 of the graph representation 620 of a first binary 105 may reference functions implemented by second and/or third binaries 105; the first binary 105 may comprise an executable that utilizes libraries implemented by the second and third binaries 105. The DS manager 632 may determine that the first binary 105 has unresolved dependencies on the second and third binaries 105 (e.g., determine that graph representations 620 of the second and third binaries 105 are not yet available within the graph store 630). Importing the graph representation 620 of the first binary 105 into the graph store 630 may comprise creating placeholders 684 for the second and third binaries 105 within the graph store 630. The placeholders 684 for the second and third binaries 105 may include respective PF nodes 686, each PF node 686 configured to represent a function referenced by one or more of the code-block components 458 of the first binary 105. The DS manager 632 may link code-block nodes 658 of the first binary 105 to corresponding PF nodes 686 of placeholders 684 by respective call edges 669, return edges 679, placeholder edge, and/or the like.

The DS manager 632 may attempt to resolve the unresolved dependencies of respective binaries 105. The DS manager 632 may identify unavailable binaries 105 pertaining to unresolved dependencies. The unavailable binaries 105 may be identified based, at least in part, by identifying placeholder(s) 684 within the graph store 630, as disclosed herein. In the example above, the DS manager 632 may attempt to resolve the unresolved dependencies of the first binary 105. The DS manager 632 may determine that the first binary 105 has unresolved dependencies on the second and third binaries 105 based on call edges 669 linking the graph representation 620 of the first binary 105 to placeholders 684 for the first and second binaries 105. In response, the DS manager 632 may request graph representations 620 of the second and/or third binary 105 from the binary analysis platform 110 (and/or request that the binary analysis platform 110 generate graph representations 620 of the second and/or third binaries 105).

The DS manager 632 may update the graph store 630 as graph representations of binaries 105 are generated by the binary analysis platform 110 (as executables, libraries, firmware, and/or other components are processed by the normalization module 114 and/or code analyzer 418). In the example above, the binary analysis platform 110 may generate a graph representation 620 of the second binary 105. The graph representation 620 of the second binary 105 may be generated responsive to a request from the DS manager 632 (e.g., to resolve the unresolved dependencies of the first binary 105 on the second binary 105). The DS manager 632 may receive or acquire the graph representation 620 of the second binary 105 and import the graph representation 620 into the graph store 630. The importing may include a) linking the graph representation 620 of the second binary 105 to a CA node 602 within the graph store 630 (by a binary edge 603), and b) updating the graph store 630 to resolve unresolved dependencies pertaining to the second binary 105. The updating may comprise modifying references to the placeholder 684 for the second binary 105 with references to the graph representation 620 of the second binary 105. The updating may include modifying call edges 669 to reference function nodes 656 of the second binary 105, modifying return edges 679 to reference code-block nodes 658 of the second binary 105, and so on. In the example above, the graph representation 620 of the first binary 105 may be modified to reference the graph representation 620 of the second binary 105. The unresolved dependencies of the first binary 105 on the second binary 105 may, therefore, be resolved (transition from unresolved dependencies to external dependencies). The dependencies of the first binary 105 on the third binary 105, however, may remain unresolved until a graph representation 620 of the third binary 105 is imported into the graph store 630.

The binary analysis platform 110, datastore 130, and/or DS manager 632, may comprise and/or be coupled to a datastore interface (or simply interface 112). The interface 112 may be configured to provide access to functionality implemented by the binary analysis platform 110 as well as data maintained within the datastore 130 and/or graph store 630. The interface 112 may implement an API, such as a binary analysis API, REST API or the like. The interface 112 may be configured to retrieve import data from a plurality of tools and/or platforms (e.g., a plurality of different tools, binary analysis platforms 110, different instances of the binary analysis platform 110, different architecture-specific modules 404, and/or the like). The interface 112 may, therefore, be capable of importing binaries 105 and/or AIL representations 115 of such binaries 105 from a plurality of different sources, each source configured to produce AIL representations 115 on a respective computing architecture or platform in a respective format or encoding (e.g., using respective architecture-specific modules 404 or tools), the AIL representations 115 comprising AIL code 431 in a respective AIL syntax 430 and/or having a respective AIL vocabulary, and/or the like. The interface 112 may be further configured to provide mechanisms for generating CIL representations 120 (and/or graph representations 620) from data acquired from the plurality of different sources (e.g., from AIL representations 115 targeting a plurality of different computing architectures and/or having a plurality of different formats, encodings, AIL syntaxes 430, AIL vocabularies, and/or the like). The interface 112 may, therefore, provide mechanisms for storing and/or retrieving data pertaining to binaries 105, such as AIL representations 115, CIL representations, graph representations 620, and/or the like, in a cross tool and/or cross platform manner.

The interface 112 may provide access to information pertaining to respective binaries 105 (retrieve, read, write, and/or modify information pertaining to respective binaries 105), such as AIL representations 115 of the binaries 105, CIL representations 120 of the binaries 105, graph representations 620 of the binaries 105, ML feature data of the binaries 105 (e.g., feature vectors 550, component vectors 552, BC vectors 554, FC vectors 556, CBC vectors 558, and/or the like), classifications 570 determined for the binaries 105 by, inter alia, the ML classifier 560 (e.g., an classification 570, component classifications 572, BC classifications 574, FC classifications 576, and/or the like), known and/or determined classification data pertaining to the binaries 105 (e.g., TC data 590, TC classifications 592, TBC classifications 594, TFC classifications 596, and/or the like), and so on.

The interface 112 may provide mechanisms for importing CIL representations into the datastore 130, importing graph representations 620 into the graph store 630, and/or the like. The interface 112 may be further configured to provide mechanisms for identifying and/or satisfying unresolved dependencies. The interface 112 (and/or DS manager 632) may attempt to satisfy unresolved dependencies by identifying unavailable binaries 105 associated with the unresolved dependencies, acquiring graph representations 620 of the unavailable binaries 105, and importing the acquired graph representations 620 into the graph store 630.

In some implementations, the interface 112 may implement a graph traversal API, such as a graph traversal retrieval API, a graph traversal query API, a graph traversal comparison API, or the like. As the unresolved dependencies of a binary 105 are resolved (by importing graph representations 620 of unavailable binaries 105 associated with the unresolved dependencies into the graph store 630), substantially all of the information related to an execution flow involving the binary 105 may be retrieved through a single graph traversal query issued through the interface 112.

The interface 112 may comprise and/or be coupled to a search engine 634. The search engine 634 may be implement mechanisms for comparing and/or evaluating CIL and/or graph representations 120/620 of respective binaries 105. The search engine 634 may provide mechanisms for quantifying the functional similarity between specified binaries 105 (e.g., a query or comparison API). The functional similarity between binaries 105 may be determined, at least in part, by comparing feature vectors 550 of the binaries 105 (e.g., may be based on an error, difference, distance, edit distance, or other quantity determined between the feature vectors 550). The search engine 634 may be provide mechanisms for identifying binaries 105 that are within a threshold functional similarity of a specified binary 105 (identify matching binaries 105 and/or components 452). The search engine 634 may provide mechanisms for determining whether a functional similarity between a designated binary 105 and binaries 105 associated with known security threats and/or vulnerabilities is within a threshold, which may indicate a likelihood that the designated binary 105 is subject to similar security threats and/or vulnerabilities.

In some implementations, the search engine 634 may be further configured to implement mechanisms for determining the functional similarity between components 452 of a specified binary 105 and components 452 of one or more other binaries 105. The functional similarity between components 452 may be based on a comparison of component vectors 552 of the components 452 (e.g., based on an error, difference, distance, edit distance, or other quantity determined between the component vectors 552). The search engine 634 may provide mechanisms for identifying function components 456 that are within a functional similarity threshold of respective function components 456 of a designated binary 105. The search engine 634 may implement mechanisms for determining whether a functional similarity between function component(s) 456 of specified binary 105 and function components 456 of binaries 105 associated with known security threats and/or vulnerabilities is within a threshold. Alternatively, or in addition, the search engine 634 may provide mechanisms for determining whether a functional similarity between a function component 456 of a specified binary 105 and function components 456 associated with known security threats and/or vulnerabilities is within a threshold.

The interface 112 may further comprise mechanisms for profiling specified binaries 105. The interface 112 may receive a binary 105, configure the normalization module 114 to produce an CIL representation 120 of the binary 105, configure the feature module 510 to produce an feature vector 550 for the binary 105, provide the feature vector 550 to the ML classifier 560, and retrieve an classification 570 produced by the ML classifier 560 responsive to the feature vector 550. As disclosed herein, the classification 570 may indicate a confidence and/or degree to which the binary 105 (and/or components 452 thereof) correspond to known security threats and/or vulnerabilities, may indicate security threats and/or vulnerabilities associated with the binary 105 (if any), and/or the like.

The interface 112 may further comprise mechanisms for designating TC data 590 of specified binaries 105. The TC data 590 of a binary 105 may indicate determined, known, and/or predicted security threats and/or vulnerabilities of the binary 105. Alternatively, or in addition, the TC data 590 may comprise, incorporate, and/or be derived from TC classifications 592 associated with determined, known, and/or predicted security threats and/or vulnerabilities of respective components 452 of the binary 105. The interface 112 may record TC data 590 in the datastore 130 (and/or graph store 630). The interface 112 may be further configured to provide TC data 590 associated with respective binaries 105 to the ML training engine 580. The ML training engine 580 may use the TC data 590 to construct ML training entries 582, which may be used to train, validate, and/or test an instance of the ML classifier 560 (and/or ML model 562 thereof).

In some implementations, the binary analysis platform 110 may be further configured to string representations 622 of binaries 105. The string representations 622 may comprise and/or be included within CIL representations 120 and/or graph representations 620 of the binaries 105. In the FIG. 6B example, the normalization module 114 may generate a string representation 622A of binary 105A, a string representation 622L of binary 105L, a string representation 622Y or binary 105Y, and so on. The string representation 622 of a binary 105 may comprise a string representation of the corresponding CIL code 441, graph representation 620, and/or the like. Alternatively, or in addition, the string representation 622 of a binary 105 may comprise a string representation of the feature vector 550 extracted from the binary 105, a classification 570 of the binary, TC data 590, and/or the like. As illustrated in the FIG. 6B example, the string representations 622 of respective binaries 105 may be maintained within the datastore 130 (and/or graph store 630).

Figure 7A:
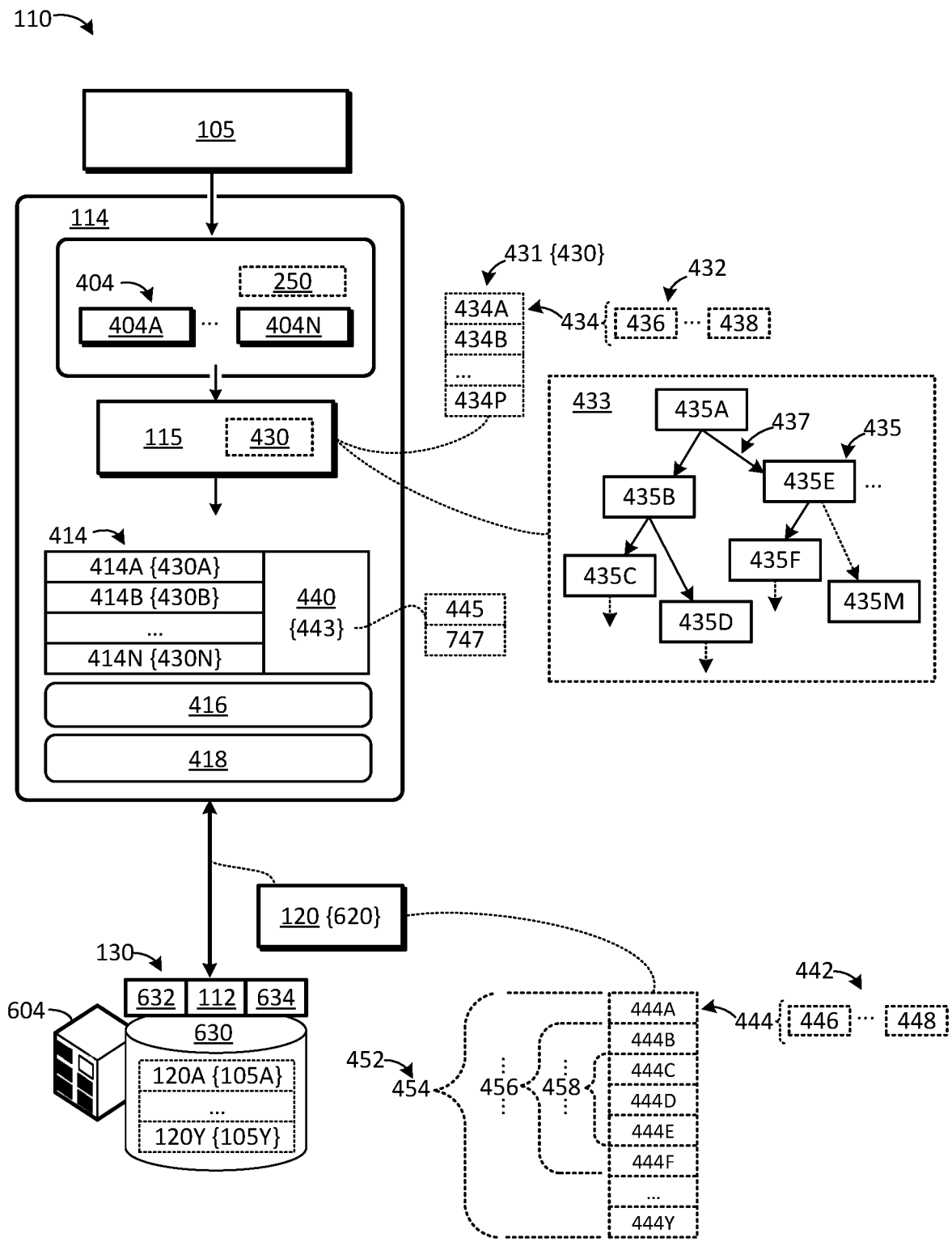
FIG. 7A illustrates another example of a normalization module configured to produce normalized, architecture-independent intermediate representations of binaries.

FIG. 7A illustrates another example of a normalization module 114 configured to produce CIL representations of binaries 105. As disclosed above, the normalization module 114 may be implemented as a component or module of the binary analysis platform 110. In some implementations, the normalization module 114 may be configured for operation on computing resources 102 of the operating environment (and/or system 100) illustrated in FIG. 1A; the normalization module 114 (and/or portions thereof) may be configured to operate on computing resources 102 realized by an electronic device, such as the computing device 104 or the like. Portions of the normalization module 114 may be implemented and/or embodied by computer-readable code stored on a non-transitory storage medium (e.g., NV storage of the computing device 104). Alternatively, or in addition, portions of the normalization module 114 may be implemented by hardware components, such as application-specific circuitry, programmable circuitry, and/or the like.

The normalization module 114 may be configured to generate CIL representations 120 of binaries 105, as disclosed herein. The CIL representation 120 of a binary 105 may be generated in an normalization process implemented by the normalization module 114. The normalization process may comprise a) constructing an AIL representation 115 of the binary 105 by use of an architecture-specific module 404 (selected from a plurality of architecture-specific modules 404A-N), and b) deriving the CIL representation 120 from the AIL representation 115 (e.g., transforming the AIL representation). The normalization process may comprise translating AIL opcodes 436 of AIL code 431 to CIL opcodes 446, mapping references to architecture-specific resources to normalized, architecture independent resources (e.g., by use of a selected one of the translation modules 414A-N), implementing one or more BSN operations (by use of a BSN module 416) and/or the like.

The normalization module 114 may be further configured to manage the vocabulary of CIL representations 120 (manage the size of the CIL vocabulary 443 of the corresponding CIL code 441). As disclosed herein, the CIL vocabulary 443 may comprise a CIL opcode vocabulary 445, which may enumerate and/or define the set of possible CIL opcodes 446 of the CIL syntax 440. The normalization module 114 may configure the CIL opcode vocabulary 445 to implement one-to-M mappings between AIL opcodes 436 of each AIL syntax 430A-N and corresponding CIL opcodes 446.

In the FIG. 7A example, the code analyzer 418 may further configured to capture structural and/or semantic information pertaining to AIL arguments 438. The CIL vocabulary 443 may, therefore, further comprise and/or define a CIL operand or argument vocabulary (CIL argument vocabulary 747), which may define the set of possible CIL arguments 448 of the CIL representation 120 (and/or CIL code 441). The code analyzer 418 may be configured to assign semantic CIL tokens 442 to AIL arguments 438, such as memory addresses and other values. The CIL tokens 442 may be included within the CIL representation 120 (e.g., as CIL arguments 448). Therefore, rather than omitting or ignoring AIL arguments 438 (and/or memory addresses referenced by the AIL representation 115), the code analyzer 418 may determine and/or preserve structural and/or semantic information pertaining to the manner in which the memory addresses and other values are utilized. As disclosed in further detail herein, the code analyzer 418 may be further configured to limit the size of the CIL vocabulary 443, such that the CIL vocabulary 443 does not cover the entire memory address space.

As disclosed above, the normalization process may comprise walking through AIL instructions 434 and/or an AST 433 and generating corresponding CIL instructions 444. The code analyzer 418 may be configured to analyze memory addresses and other information encountered during the normalization process (e.g., AIL arguments 438). The analysis may comprise assigning CIL tokens 442 to memory addresses (and/or other information). The CIL tokens 442 may capture and/or preserve aspects of how respective memory addresses (and/or information referenced by the respective memory addresses) are used within the binary 105. The code analyzer 418 may, therefore, normalize the memory address space of AIL code 431 into an CIL representation 120 that minimizes the amount vocabulary (minimizing the CIL vocabulary 443 and/or CIL argument vocabulary 747) while preserving structural and/or semantic information pertaining to the memory addresses. Accordingly, the resulting CIL representation 120 of the binary 105 (CIL code 441) may capture and preserve the structure and/or semantics of the binary 105 in an intermediate language format that is well formed for ML analysis techniques, without omitting or ignoring AIL arguments 438 and/or the memory address space.

In some implementations, the code analyzer 418 utilizes static analysis techniques to assign CIL tokens 442 to memory addresses and/or other information. The code analyzer 418 may be configured to apply predetermined analysis rule, which may include, but are not limited to: a) a first rule to rewrite data determined to be prone to changing between compiles with constant CIL tokens 442 (e.g., AIL arguments 438 or other data); b) a second rule to expand terse AIL instructions 434 into English-like representations (e.g., CIL instructions 444), c) a third rule to include type and/or value information for AIL arguments 438 (where possible), d) a fourth rule to implement cross referencing within the datastore 130 to resolve AIL arguments 438 and/or functions, e) a fifth rule to implement a consistent naming scheme for items that cannot be named through static analysis, and so on.

The static analysis techniques implemented by the code analyzer 418 may comprise operations to disambiguate memory addresses by, inter alia, identifying data, code, and/or other information at memory addresses referenced by the AIL code 431 (and/or resulting CIL code 441). The static analysis may comprise disambiguating references to locations within the binary 105 itself, references to locations within other binaries 105, references to remote locations, and/or the like.

The code analyzer 418 may be configured to disambiguate "internal" references of a binary 105. As used herein, an "internal" reference of a binary 105 may refer to a memory address or location within the binary 105, within memory allocated to the binary 105 during execution (e.g., within a stack or heap), and/or the like. An internal reference may refer to a constant, a local variable of a function or code block of the binary 105, a global variable of the binary 105, a function implemented by the binary 105, a memory location within the binary 105, a location within the stack or heap allocated to the binary 105 (or function implemented by the binary 105), or the like. Disambiguating an internal reference may comprise accessing data at the referenced location within the binary 105 (accessing the binary 105 and/or corresponding component 452) and/or utilizing static analysis techniques to determine structural and/or semantic information pertaining to the contents of the referenced location.

The code analyzer 418 may be further configured to disambiguate "external" references of a binary 105. As used herein, an "external" reference may refer to a memory address or location within another binary 105 (an external binary 105), such as a reference to a function implemented the external binary 105 (e.g., a library), a variable or object of the external binary 105, or the like. Disambiguating an external reference may comprise accessing the referenced location within the external binary 105 (within the CIL representation 120 and/or graph representation 620 of the external binary 105) utilizing static analysis techniques to determine structural and/or semantic information pertaining to the contents of the referenced location. The code analyzer 418 may access information pertaining to external references through an interface of the datastore 130 (e.g., the interface 112). As disclosed herein, an external memory reference of a binary 105 to an unavailable external binary 105 may result in an unresolved dependency (the binary 105 may have an unresolved dependency on the external binary 105). The code analyzer 418 may attempt to satisfy unresolved dependencies by, inter alia, acquiring CIL and/or graph representations 120/620 of external binaries 105 and/or importing the acquired CIL and/or graph representations 120/620 into the datastore 130 and/or graph store 630, as disclosed herein.

The code analyzer 418 may be further configured to disambiguate "remote" references of a binary 105. As used herein, a "remote" reference refers to a reference to a resource implemented by a remote entity or component (a remote binary 105), such as RMI, RPC, and/or the like. In some implementations, the code analyzer 418 may attempt to resolve remote references by importing CIL representations 120 of remote binaries 105 into the datastore 130, as disclosed herein.

Although particular examples of references are described herein (e.g., internal references, external references, remote references, and/or the like), the disclosure is not limited in this regard and could be adapted to represent, model, and/or disambiguate any suitable type of reference, memory address, and/or the like.

In a first example, the code analyzer 418 may determine that the memory address or register referenced by an AIL instruction 434 (e.g., a JMP instruction) refers to a function implemented by the binary 105 (e.g., is an internal reference to a memory address within the binary 105 itself). In response, the code analyzer 418 may assign a CIL token 442 that represents the function (and/or function component 456) to the memory address, such as "fund." The CIL argument(s) 448 of the resulting CIL instruction(s) 444 may reference the "fund" CIL token 442 as opposed to the memory address (or architecture-specific register). The CIL token 442 may capture and/or preserve semantic information pertaining to the memory address (the memory address refers to the internal function "fund") without covering the entire memory address space.

In a second example, the code analyzer 418 may determine that the memory address of an AIL argument 438 references a constant or local variable used within a function and/or one or more code blocks (based on static analysis of the memory address). In response, the code analyzer 418 may assign a CIL token 442 that represents the constant or local variable to the memory address (e.g., "const1"). The CIL instructions 444 that reference memory address(es) associated with the constant or local variable may comprise the CIL token 442 as opposed to the raw memory address(es).

In a third example, the code analyzer 418 may determine that the memory address of an AIL argument 438 references a global variable used within a plurality of functions and/or code blocks of the binary 105 (based on static analysis of the memory address and/or references to the memory address within other function(s) of the binary 105). In response, the code analyzer 418 may assign a CIL token 442 that represents the global variable to CIL instructions 444 that reference the global variable (and/or memory address(es) associated with the global variable).

In a fourth example, the code analyzer 418 may determine that the memory address of an AIL argument 438 references a function implemented by another binary 105 (a function implemented by an external binary 105). The code analyzer 418 may determine that the memory address references an external function in response to resolving the memory address to an CIL and/or graph representation 120/620 of the external binary 105 (e.g., a LOAD command associated with the external binary 105). The code analyzer 418 may access information pertaining to the external binary 105 through the interface 112 of the datastore 130 (and/or graph store 630), as disclosed herein. The code analyzer 418 may assign a CIL token 442 to the memory address associated with the external function and may incorporate the CIL token 442 in CIL instructions 444 that reference the external function. The CIL token 442 may reference and/or link to the corresponding function component 456 (or function node 656) of the external binary 105.

Table 1 below is an excerpt from an example of AIL code 431 of the AIL representation 115 of a binary 105.

TABLE 1 mov esi, dword [0x8148ae8]
mov dword [esp+0x8], 0x5
mov dword [esp+0x4], 0x8119cfc
mov dword [esp], 0x0
call 0x8049418
mov ecx, dword [0x814d232]
mov dword [esp+0x8], ecx
mov dword [esp+0x4], eax
mov dword [esp], esi
call 0x8049650
cmp dword [0x8148b78], 0x0
je 0x804e2a9

As illustrated, the AIL instructions 434 may comprise AIL opcodes 436 corresponding to a particular AIL syntax 430 (machine code instructions supported the computing architecture of the binary 105). The AIL instructions 434 may further comprise AIL arguments 438, which may include memory addresses and/or architecture-specific resources (e.g., reference architecture-specific registers or the like).

Table 2 illustrates an example of a portion of the CIL representation 120 of the binary 105, the portion comprising CIL code 441 corresponding to the AIL code 431 of Table 1.

TABLE 2 esp = esp + −28−
ebx = LOAD( program_name )
PUSH int64 5
PUSH %s: "no open output archive\n"
PUSH int64 0
CALL( dcgettext )
PUSH ebx
PUSH eax
PUSH int64 1
PUSH LOAD( stderr )
CALL( printf )
edx = LOAD( interactive )
esp = esp + −60 + 32
IF edx == 0 THEN BLOCK 23 ELSE BLOCK 27

As illustrated in Table 2, in the CIL code 441 of the CIL representation 120, AIL opcodes 436 of the AIL code 431 may be replaced with normalized, architecture-independent equivalents (CIL opcodes 446). The CIL code 441 may also replace references to architecture-specific resources, such as architecture-specific registers, with references to normalized, architecture-independent resources (e.g., a set of normalized, architecture-independent registers).

The code analyzer 418 may examine variables utilized within the AIL code 431. Based on static analysis of the AIL code 431, the code analyzer 418 may determine that the AIL code 431 utilizes a stack frame having a size of 28 bytes. In response, the code analyzer 418 may generate a corresponding CIL instruction 444 "esp=esp+−28−" to create the new stack frame (e.g., move the stack pointer down by 28 bytes). The code analyzer 418 may determine that the memory address of the AIL instruction 434 "mov, esi, dword [0x8148ae8]" references a "program_name" function. The "program_name" function may be implemented by the binary 105 or another, external binary 105. In response, the code analyzer 418 may determine a CIL token 442 to represent the "program_name" function within the CIL code 441, e.g., in the CIL instruction 444 "ebx=LOAD (program_name)." The static analysis implemented by the code analyzer 418 may also determine that the memory address referenced by the AIL instruction 434 "mov dword [esp+0x4], 0x8119cfc" refers to a string constant "no open output archive \n" and, in response, the code analyzer 418 may replace references to the memory address with a CIL token 442 that represents the string constant. Similarly, static analysis of the AIL instruction 434 "call 0x8049418" may indicate that the memory address refers to the "dcgettext" function. As such, the code analyzer 418 may replace references to the memory address "0x8049418" with a CIL token 442 representing the "dcgettext" function.

Through further static analysis, the code analyzer 418 may determine that the AIL instructions 434 "mov ecx, dword [0x814d232]," "mov dword [esp+0x8], ecx," "mov dword [esp+0x4], eax," and "mov dword [esp], esi" involve pushing arguments onto the stack for the following "call 0x8049650" AIL instruction 434. The code analyzer 418 may replace the reference to "dword [esp+0x4], eax" with a CIL token 442 representing a constant value (1), replace references to "dword [esp], esi" with a CIL token 442 representing the referenced function (or global variable) "stderr," and so on.

The code analyzer 418 may determine that the memory address referenced by the AIL instruction 434 "call 0x8049650" refers to the "printf" function implemented by an external binary 105 (e.g., implemented by a "stdio" library); for example, the code analyzer 418 may follow the reference to a corresponding call or load command for the external binary 105. The code analyzer 418 may replace references to the memory address "0x8049650" with semantic information pertaining to the corresponding function (a CIL token 442 identifying the "printf" function in the "CALL (printf)" CIL instruction 444).

As illustrated in Table 2, the code analyzer 418 may be further configured to generate a stack unwind instruction (CIL instruction 444 "esp=esp+−60+32"). The CIL instruction 444 may move the stack pointer up by 28 bytes (32-60). The CIL token 442 ("−60+32") may be expressed in terms of other quantities or CIL tokens 442 (e.g., "60" and "32") to reduce the quantity of unique values included in the CIL argument vocabulary 747. Finally, the CIL instruction 444 "IF edx==0 THEN BLOCK 23 ELSE BLOCK 27" may include CIL tokens 442 to disambiguate memory addresses referenced by the AIL instructions 434 "cmp dword [0x8148b78], 0x0" and "je 0x804e2a9."

The structural and/or semantic information determined by the code analyzer 418 may be included in CIL representations 120 (and/or corresponding graph representations 620)

Figure 7B:
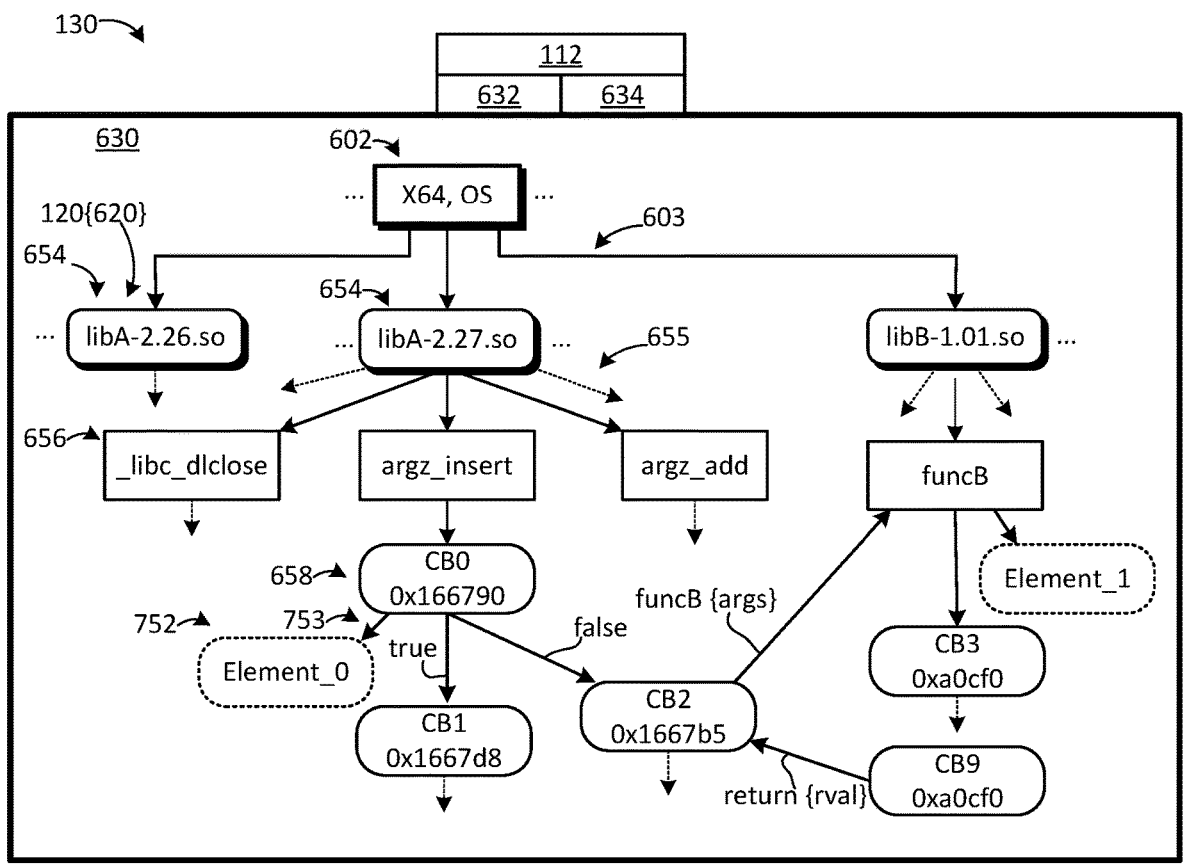
FIG. 7B illustrates another example of a datastore configured to maintain graph representations of binaries.

FIG. 7B illustrates another example of a datastore 130 configured to maintain graph representations 620 of binaries 105. The datastore 130 may comprise and/or implement a graph store 630, as disclosed herein. The graph store 630 may comprise graph representations 620 of respective binaries 105. The graph representations 620 may be organized by computing architecture. The FIG. 7B example illustrates examples of graph representations 620 for a plurality of binaries 105 "libA-2.26.so," "libA-2.27.so," and "libB-1.01.so." The binaries 105 may be configured for operation on an X64 computing architecture running a specified operating system (OS). The graph representations 620 may, therefore, be arranged under a corresponding CA node 602 ("x64, OS").

The graph store 630 may maintain CIL representations 120 of specific software versions, allowing specific tracking of how software changes between versions. In the FIG. 7B example, the graph store 630 comprises a CIL representation 120 for version 2.26 of "libA" ("libA-2.26.so"), a CIL representation 120 of another version 2.27 of "libA" ("libA-2.27.so"), an CIL representation 120 of version 1.01 of "libB" ("libB-1.01.so"), and so on. Differences between the graph representations 620 of "libA-2.26.so" and "libA-2.27.so" may indicate specific changes to the functionality of "libA" between version 2.26 and 2.27 (if any).

In the FIG. 7B example, "libA-2.27.so" implements functions "_libc_dlclose," "artz_insert," and "argz_add," "libB-1.01.so" implements a function "funcB," and so on (other functions not depicted to avoid obscuring details of the illustrated examples). The functions may be represented by respective function nodes 656, each corresponding to a respective function component 456. The functions may include and/or reference code-block nodes 658 (e.g., code-block nodes 658 CB0 through CB9, other code-block nodes 658 not depicted to avoid obscuring details of the illustrated examples).

The graph representations 620 may comprise structural and/or semantic information determined by the code analyzer 418. The graph representations 620 may include element nodes 752, which may be configured to represent constants, variables, local variables, global variables, the stack, system memory, and so forth. In the FIG. 7B example, element node 752 ("Element_0") may represent a local variable of code-block ("CB0"), element node 752 ("Element_1") may represent a global variable of function ("funcB"), and so on. The structural and/or semantic information may be embodied within edges connecting respective nodes. As illustrated, the code analyzer 418 may determine that the CL edge 659 from ("CB0") to ("CB1") corresponds to a "true" branch condition, that the CL edge 659 from ("CB0") to ("CB2") corresponds to a "false" branch condition, and so on. As further illustrated, the code analyzer 418 may determine that code-block ("CB2") calls "funcB" of an external binary 105 ("libB-1.01"), which may be represented by a call edge 669 from ("CB2") to ("funcB"), or code-block ("CB3"). The code analyzer 418 may be further configured to determine semantic information pertaining to arguments of the call (types and/or values of "args"). Similarly, the code analyzer 418 may determine that the call returns from code-block ("CB9"). The code analyzer 418 may determine semantic information pertaining to a return value (if any), e.g., type and/or value of "rval."

The graph store 630 may implement a soft schema, which may enable the graph store 630 to be extended to support dynamic addition of data fields to nodes and/or edges. Therefore, although particular examples of graph representations 620 are described, the disclosure is not limited in this regard and could be extended to capture and/or preserve any suitable information pertaining to code analysis of one or more binaries 105, as disclosed herein. For example, the graph representation 620 of a binary 105 may include phi nodes to represent content that is dependent on runtime state (with edges to correct context-specific child nodes).

FIG. 7C illustrates an example of a binary view 700 of an example of a datastore 130, as disclosed herein. The binary view 700 may comprise one or more entries 715, each comprising information pertaining to a respective binary 105. The entries 715 may correspond to respective binary nodes 654 (or binary components 454). The entries 715 may, therefore, be referred to as top-level or binary component (BC) entries 715. A BC entry 715 may correspond to an CIL representation 120 (and/or graph representation 620) of a respective binary 105. As illustrated, the BC entries 715 may comprise metadata, such as an identifier ("@rid"), version ("@version"), class ("@class"), and so on. The "@class"

may indicate a type of the binary 105, e.g., a library, executable, firmware, driver, or the like. The BC entries 715 may further comprise properties of respective binaries 105, such as an indicator of whether the binary 105 has been analyzed ("analyzed"), a computing architecture to which the binary 105 is targeted ("arch"), a base location of the binary 105 ("base"), a name of the binary 105, such as a file name ("name"), a path to the binary 105 ("path"), a unique identifier of the binary 105 ("uid"), a version of the binary 105 ("version"), and so on. The BC entries 715 may further include information pertaining to functions implemented by respective binaries 105, including references to functions implemented by the binary 105 ("in") by other binaries 105, external references from the binary 105 to other binaries ("out"), and so on.

FIG. 7D illustrates an example of a function view 701 of an example of a datastore 130, as disclosed herein. The function view 701 may comprise information pertaining to function(s) implemented by respective binaries 105. The function view 701 may comprise one or more entries 716, each comprising information pertaining to a respective function of a respective binary 105 (a respective function node 656 and/or function component 456). The entries 716 may, for example, correspond to respective function graphs 646. The entries 716 may, therefore, be referred to as function or function component (FC) entries 716. As illustrated, the FC entries 716 may comprise metadata pertaining to the functions, such as a function identifier ("@rid"), version ("@version"), class ("@class"), and/or the like. The FC entries 716 may further comprise properties of respective functions, such as an indication of whether the function has been analyzed ("analyzed"), a unique identifier of the function ("uid"), a name of the function ("name"), a reference to the binary 105 associated with the function ("library"), references to other functions ("has function"), calls made by the function ("calls"), code-blocks of the function ("has_block"), and so on.

FIG. 7E illustrates an example of a code-block view 702 of an example of a datastore 130, as disclosed herein. The code-block view 702 may comprise information pertaining to code-blocks of functions implemented by respective binaries 105. The code-block view 702 may comprise one or more entries 718, each comprising information pertaining to a respective code-block (a respective code-block node 658 and/or code-block component 458). The entries 718 may, therefore, be referred to as code block or code-block component (CBC) entries 718. In the FIG. 7E example, the CBC entries 718 are illustrated in a stacked arrangement for ease of reference (the "@rid" column replicated for each row). As illustrated, the CBC entries 718 may comprise metadata pertaining to respective code-blocks, such as a code-block identifier ("@rid"), version ("@version"), class ("@class"), and/or the like. The CBC 718 may further comprise properties of respective code blocks, such as an indication of whether the code block has been analyzed ("analyzed"), a unique identifier of the code block ("uid"), a name of the code block ("name"), a reference to features or elements of the code block ("features"), a block identifier ("block_id"), a reference to the binary 105 associated with the code block ("library"), a reference to the function associated with the code block ("function"), calls made by the function ("calls"), code-blocks of the function ("has_block"), and so on. The CBC entries 718 may further comprise information pertaining to call, execution, control, and/or data flow, including "IN" references to the code block, such as references to code blocks that reference the code block (IN→has block"), references to unconditional input CL edges 659 ("IN→branch_unconditional"), references to conditional input CL edges 659 ("IN→brach_true", "IN→branch_false" or the like), and so on. The CBC entries 718 may also include information pertaining to the code block itself, such as references to features or elements of respective code blocks ("OUT→has_feature"), a next instruction ("OUT→next_instruction"), outgoing CL edges 659 ("OUT→branch_true", "OUT→branch_false," or the like), outgoing unconditional CL edges 659 ("OUT→branch_unconditional"), references to functions called by the code block ("OUT→calls"), and so on.

FIGS. 7F and 7G illustrate an example of a traversal view 704 of a datastore 130, as disclosed herein. The traversal view 704 may comprise information pertaining to traversal through code-blocks of a function implemented by a specified binary 105. In example illustrated in FIGS. 7F and 7G, the traversal view 704 corresponds to function "argz_add." The traversal view 704 may comprise one or more traversal entries 710, each comprising information pertaining to traversal through a respective code block (a respective code-block node 658 and/or code-block component 458). The traversal entries 710 are illustrated in a stacked arrangement for ease of reference (the "@rid" column replicated for each row). As shown, the traversal entries 710 may comprise metadata, such as a traversal identifier ("@rid"), version ("@version"), class ("@class"), and/or the like. The "@class" column may indicate whether the traversal corresponds to a code-block, function, or the like. The entries 710 may further comprise properties for respective traversals, such as an indication of whether the traversal has been analyzed ("analyzed"), a unique identifier ("uid"), a name ("name" of the corresponding code block or function), a binary 105 associated with the traversal ("library"), an element or feature ("feature"), an identifier of the corresponding code block ("block_id"), an identifier of the corresponding function ("function"), computing architecture of the binary 105 ("arch"), base location of the corresponding binary 105 ("base"), path to the binary 105 ("path"), version of the binary 105 ("version"), and so on.

The properties of the traversal entries 710 may further comprise information pertaining to the execution state, such as constants involved in the traversal ("const"), calls ("calls"), the stack ("stack"), assignments ("assign"), registers ("register"), ALU functions ("math"), return status or value ("ret" or "noret"), system calls ("syscall"), comparisons (control logic status, such as "compare"), flag ("flag"), control ("control"), nop ("nop"), runtime state ("phi"), cast operations ("cast"), stop instructions ("stop"), jump instructions ("jump"), calls ("calls"), functions ("has function"), and so on.

Figure 7H:
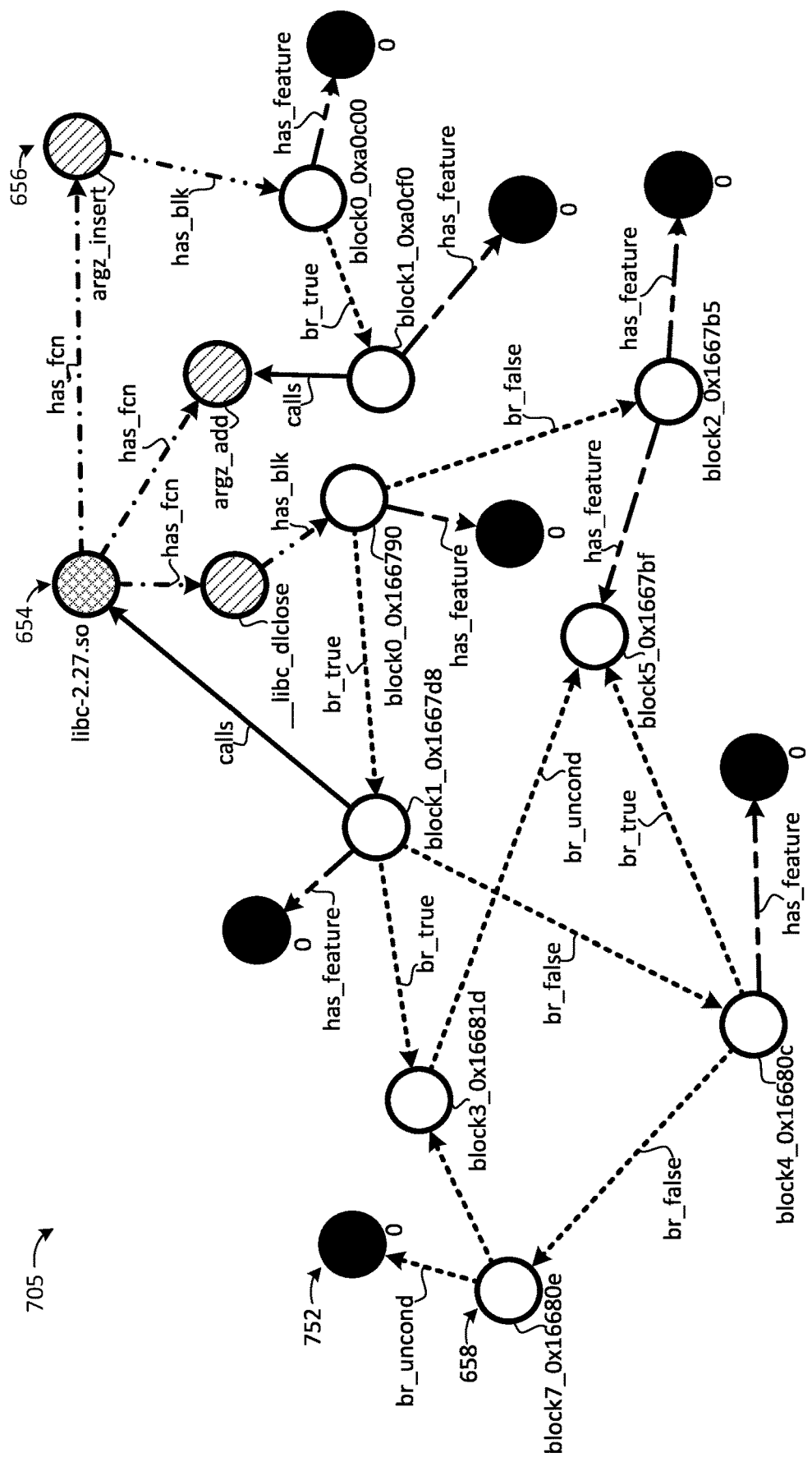
FIG. 7H illustrates an example of a graph view of a traversal within a datastore comprising normalized, architecture-independent representations of binaries, as disclosed herein.

FIG. 7H is a graph view 705 of the traversal illustrated in FIGS. 7F and 7G. The graph view 705 comprises a binary node 654 configured to represent the binary 105 ("libc-2.27.so"), function nodes 656 configured to represent functions implemented by the binary 105, e.g., function nodes 656 corresponding to functions "_libc_dlclose," "argz_add," and "argz_insert," and so on. The function nodes 656 may comprise respective function graphs 646 comprising code-block nodes 658, as disclosed herein. The graph view 705 may further comprise element nodes 752 configured to represent other data, such as constants, variables, local variables, global variables, the stack, system memory, and/or the like. Element nodes 752 may be coupled to corresponding binary, function, or code-block nodes 654/656/658 by element edges 753.

In some implementations, the CBC entries 718 may further comprise properties of respective code blocks, such as an indication of whether the code block has been analyzed ("analyzed"), a unique identifier of the code block ("uid"), a name of the code block ("name"), a reference to features or elements of the code block ("features"), a block identifier ("block_id"), a reference to the binary 105 associated with the code block ("library"), a reference to the function associated with the code block ("function"), calls made by the function ("calls"), code-blocks of the function ("has_block"), and so on. The CBC entries 718 may further comprise information pertaining to call, execution, control, and/or data flow, including "IN" references to the code block, such as references to code blocks that reference the code block (IN→has block"), references to unconditional input CL edges 659 ("IN→branch_unconditional"), references to conditional input CL edges 659 ("IN→brach_true", "IN→branch_false" or the like), and so on. The CBC entries 718 may also include information pertaining to the code block itself, such as references to features or elements of respective code blocks ("OUT→has_feature"), a next instruction ("OUT→next_instruction"), outgoing CL edges 659 ("OUT→branch_true", "OUT→branch_false," or the like), outgoing unconditional CL edges 659 ("OUT→branch_unconditional"), references to functions called by the code block ("OUT→calls"), and so on.

Referring back to FIG. 1B, the analysis module 116 may be configured to leverage structural and/or semantic information captured by the code analyzer 418. In some implementations, the analysis module 116 may implement ML sequence transduction, and may utilize the ML sequence transduction implementation to, inter alia, learn a language model for CIL representations 120 (e.g., learn CIL instruction 444 sequences). In some aspects, the analysis module 116 may implement ML sequence transduction using an encoding transformer architecture.

Figure 8:
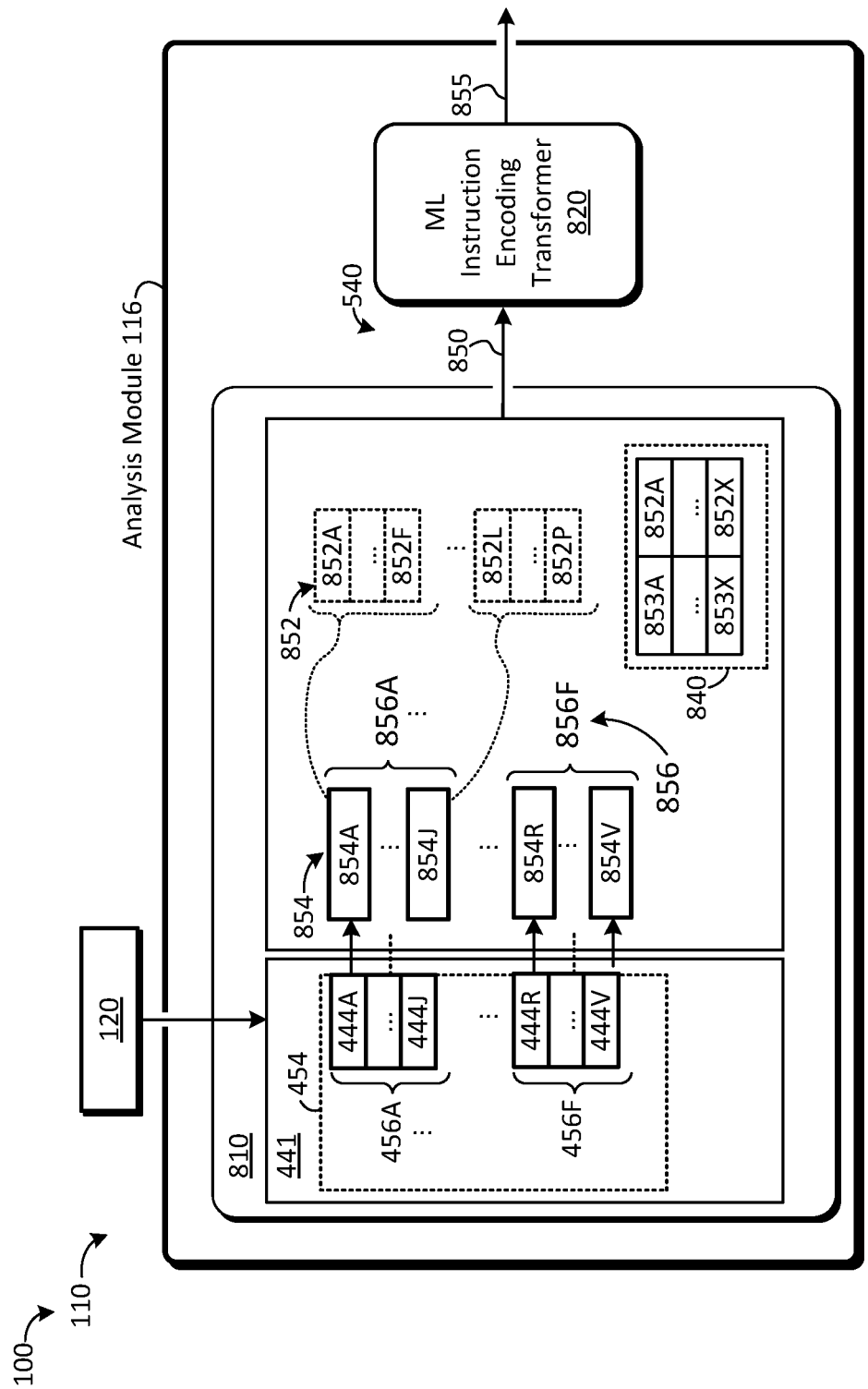
FIG. 8 illustrates an example of an analysis module configured to implement an encoding transformer architecture.

FIG. 8 illustrates and example of an analysis module 116 configured to implement aspects of ML sequence transduction. The analysis module 116 may comprise and/or be coupled to an encoder 810 and an ML instruction encoding (MLIE) transformer 820. The analysis module 116, encoder 810, and/or MLMLIE transformer 820 may be implemented as components of the binary analysis platform 110. In some implementations, these components may be configured for operation on computing resources 102 of the operating environment (and/or system 100) illustrated in FIG. 1A. Portions of the analysis module 116, encoder 810, and/or MLMLIE transformer 820 may be implemented and/or embodied by computer-readable code stored on a non-transitory storage medium (e.g., NV storage of the computing device 104). Alternatively, or in addition, portions of the analysis module 116, encoder 810, and/or MLMLIE transformer 820 may be implemented by hardware components, such as application-specific circuitry, programmable circuitry, and/or the like.

The encoder 810 may be configured to encode the CIL code 441 of CIL representations 120 of respective binaries 105 into a format suitable for vocabulary-based ML analysis. More specifically, the encoder 810 may be configured to produce CIL features 540 for binaries 105 (and/or respective functions). The CIL features 540 may comprise instruction features 850 (encoded CIL instructions 444), as disclosed in further detail herein.

The encoder 810 may be configured to break down CIL instructions 444 into smaller components or elements (referred to herein as instruction tokens 852). More specifically, each CIL instruction 444 of the CIL representation 120 may be broken down into a respective set or sequence of instruction tokens 852. The sequence of instruction tokens 852 derived from a CIL instruction 444 may be referred to as a vector, or instruction vector 854 of the CIL instruction 444.

In the FIG. 8 example, the CIL representation 120 may comprise a binary component 454 configured to represent a binary 105 configured to implement a plurality of functions (e.g., functions A through F). The binary component 454 may, therefore, comprise a plurality of function components 456 (function components 456A-F), each comprising and/or corresponding respective CIL instructions 444 (or respective set of code-block components 458) of a respective function implemented by the binary 105. The function component 456A may comprise CIL instructions 444A-J, the function component 456F may comprise CIL instructions 444R-V, and so on (CIL instructions 444 of other function components 456 not shown in FIG. 8 to avoid obscuring details of the illustrated examples).

As disclosed above, the instruction tokens 852 may comprise and/or correspond to elements of respective CIL instructions 444. An instruction token 852 may comprise one or more of: a token, a symbol, a character (e.g., a character encountered within a CIL instruction 444), text, a string, a CIL opcode 446, a CIL argument 448, a CIL token 442 (e.g., a CIL token 442 assigned to a memory address and/or other value by the code analyzer 418, as disclosed herein), a byte, a byte pair, a byte sequence, a tuple, and/or the like. The set of unique instruction tokens 852 encountered within the CIL instructions 444 may define the vocabulary of the instruction model (define a model vocabulary 840). The model vocabulary 840 may enumerate and/or define the set of unique instruction tokens 852 encountered within the CIL instructions 444 of respective CIL representations 120, binary components 454, function components 456, and/or the like.

The encoder 810 may be further configured to manage the computational complexity and/or size of the model vocabulary 840. The encoder 810 may encode instruction tokens 852 in a compact format, such as bytes, byte pairs, or the like. In the FIG. 8 example, the instruction tokens 852 may comprise byte pairs. Thus, the encoder 810 may transform each CIL instruction 444 into a respective instruction vector 854, each instruction vector 854 comprising a respective sequence of bytes or byte pairs. The instruction tokens 852 may be mapped to respective token symbols 853, which may comprise text or other representations of the instruction tokens 852 (e.g., may comprise the actual tokens or symbols extracted from the CIL code 441).

The encoder 810 (and/or model vocabulary 840) may comprise and/or implement means for translating between instruction tokens 852 and token symbols 853, such as a map, map data structure, mapping table, lookup data structure, lookup table, index, index data structure, and/or the like. In the FIG. 8 example, the model vocabulary 840 may comprise a set of unique token symbols 853A through 853X. The unique token symbols 853A-X may be maintained within a data structure and may be assigned respective instruction tokens 852 (bytes or byte pairs) based on the index of the token symbols 853A-X within the data structure (e.g., the token symbols 853A-X may be maintained in a list and the instruction tokens 852A-X may be indexes of the token symbols 853A-X within the list). The model vocabulary 840 may be maintained within any suitable storage resource, such as a non-transitory storage medium, NV storage of the computing device 104, NV storage of the computing system 604, the datastore 130 of the binary analysis platform 110, and/or the like.

As disclosed herein, the encoder 810 may be configured to encode CIL instructions 444 into respective instruction vectors 854, encoding a CIL instruction 444 may comprise: a) parsing the CIL instruction 444 into a plurality of token symbols 853, b) mapping the token symbols 853 to corresponding instruction tokens 852, and c) forming an instruction vector 854 from the resulting sequence of instruction tokens 852. In an example where the instruction tokens 852 (and/or token symbols 853) are defined to correspond to respective characters, and the model vocabulary 840 comprises the set of characters encountered within the CIL code 441, the CIL instruction 444 "PUSH LOAD(stderr)" may be encoded as a sequence of 19 digits as follows "12, 345, 8723, 2219, 87, 3521, 22458, 976, . . . , 1" (e.g., may include an instruction token 852 (digit) for each of the 19 characters comprising the CIL instruction 444).

In the FIG. 8 example, the encoder 810 may be configured to encode CIL instructions 444A through 444V into respective instruction vectors 854A through 854V, each of the instruction vectors 854A-V comprising a respective sequence of instruction tokens 852. The encoder 810 may parse CIL instruction 444A into an instruction vector 854A comprising a sequence of instruction tokens 852A through 852F, parse CIL instruction 444J into an instruction vector 854J comprising a sequence of instruction tokens 852L through 852P, and so on (instruction vectors 854 of other CIL instructions 444 not shown in FIG. 8 to avoid obscuring details of the illustrated examples).

The encoder 810 may be further configured to construct features configured to characterize respective functions (or function components 456). A function of a binary 105 (and/or corresponding function component 456) may be characterized by an instruction vector (IV) set 854. More specifically, the encoder 810 may be configured to generate IV sets 856 for respective function components 456, each IV set 856 comprising instruction vectors 854 derived from CIL instructions 444 of the respective function component 456. In the FIG. 8 example, an IV set 856A comprising instruction vectors 854A-J may be generated for function component 456A, an IV set 856F comprising instruction vectors 854R-V may be generated for function component 456F, and so on (IV sets 856 of other function components 456 not shown in FIG. 8 to avoid obscuring details of the illustrated examples).

The MLMLIE transformer 820 may utilize the instruction vectors 854 and/or IV sets 856 to learn instruction token sequences or, more specifically, learn sequences in which instruction tokens 852 appear within respective CIL instructions 444, functions (function components 456), binaries 105 (binary components 454), and/or the like. The MLIE transformer 820 may implement any suitable ML algorithm, technique, and/or architecture. In some aspects, the MLIE transformer 820 may comprise an ML sequence learning implementation, such as an ML transformer or the like. The MLIE transformer 820 may receive CIL features 540 (instruction features 850) produced by the encoder 810 and, in response, produce an instruction encoding transformer (IET) output 855 indicating a probability that the input instruction features 850 correspond to a learned instruction sequence. In some implementations, the IET output 855 may comprise an instruction encoding. Alternatively, or in addition, the IET output 855 may predict upcoming instruction tokens 852 (and/or CIL instructions 444) based on the input instruction token sequence (instruction features 850). The IET output 855 may comprise probabilities of next instruction tokens 852 (and/or next CIL instructions 444).

Figure 9A:
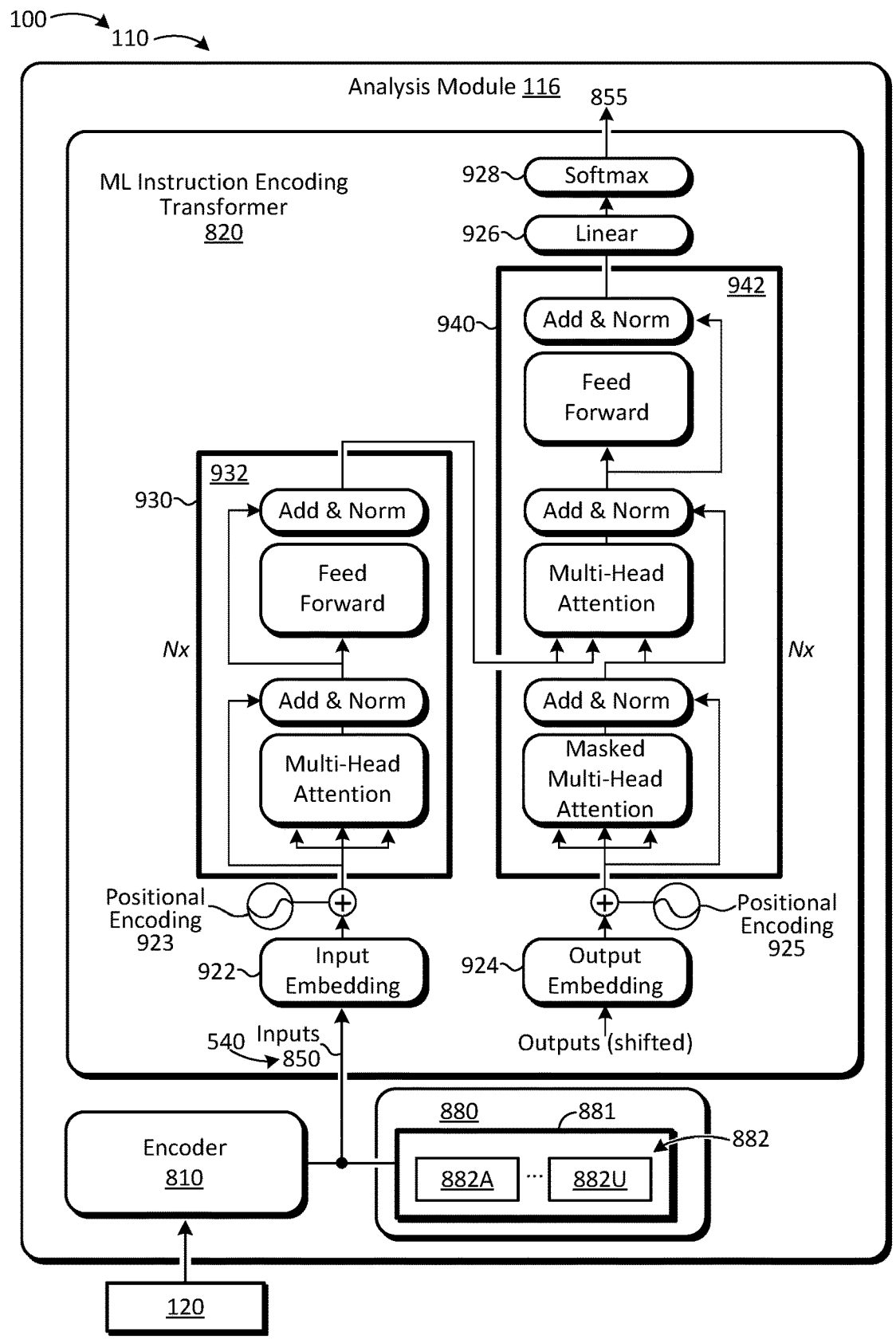
FIG. 9A illustrates an example of an analysis module configured for instruction sequence transduction.

FIG. 9A illustrates another example of an analysis module 116. In the FIG. 9A example, MLIE transformer 820 may comprise a recurrent neural network (a transformer neural network). The MLIE transformer 820 may comprise an input embedding module 922 configured to generate and/or process instruction features 850 (e.g., produce instruction features 850 from CIL representations 120, receive instruction features 850 generated by the instruction encoder 810, or the like). In some implementations, the input embedding module 922 utilizes learned embeddings to convert inputs, such as instruction features 850 (e.g., instruction tokens 852) to vectors of a selected dimension ($d_{model}$) Similarly, an output embedding module 924 may utilize learned embeddings to implement corresponding conversions on output tokens.

The MLIE transformer 820 may comprise an encoder 930 and decoder 940. The encoder 930 may be configured to map an input sequence (e.g., instruction features 850) to a sequence of continuous representations (z). In response, the decoder 940 may generate an output sequence (IET outputs 855), which may comprise predicted next-token probabilities (probabilities of next instruction tokens 852). The encoder 930 and decoder 940 may comprise stacked self-attention and pointwise, fully connected ANN layers (encoder layers 932 and decoder layers 942, respectively).

The encoder 930 may comprise a stack of substantially similar encoder layers 932 (e.g., N=6 substantially similar encoder layers 932). Each encoder layer 932 may comprise a plurality of sub-layers (e.g., two sub-layers, as illustrated in the FIG. 9 example). The sub-layers of each encoder layer 932 may include a multi-head self-attention (MHSA) layer and a position-wise fully connected feed-forward network (feed forward layer). Outputs of each sub-layer may further comprise layer normalization (an "Add & Norm" module or layer). The encoder layers 932 (and decoder layers 942) may produce outputs having a same dimension (e.g., a dimension $d_{model}$ of 505 or other suitable quantity).

The decoder 940 may comprise a stack of substantially similar decoder layers 942 (e.g., N=6 substantially similar decoder layers 942). Each decoder layer 942 may comprise a plurality of sub-layers (e.g., three sub-layers, as illustrated in the FIG. 9A example). The sub-layers of the decoder layers 942 may include a masked, multi-head attention sub-layer, an MHSA sub-layer, and a position-wise fully connected feed-forward network (feed forward layer). The masked, multi-head attention layer may be configured to perform multi-head attention over the output of the encoder 930 (e.g., to prevent positions from attending to subsequent positions).

Figure 9B:
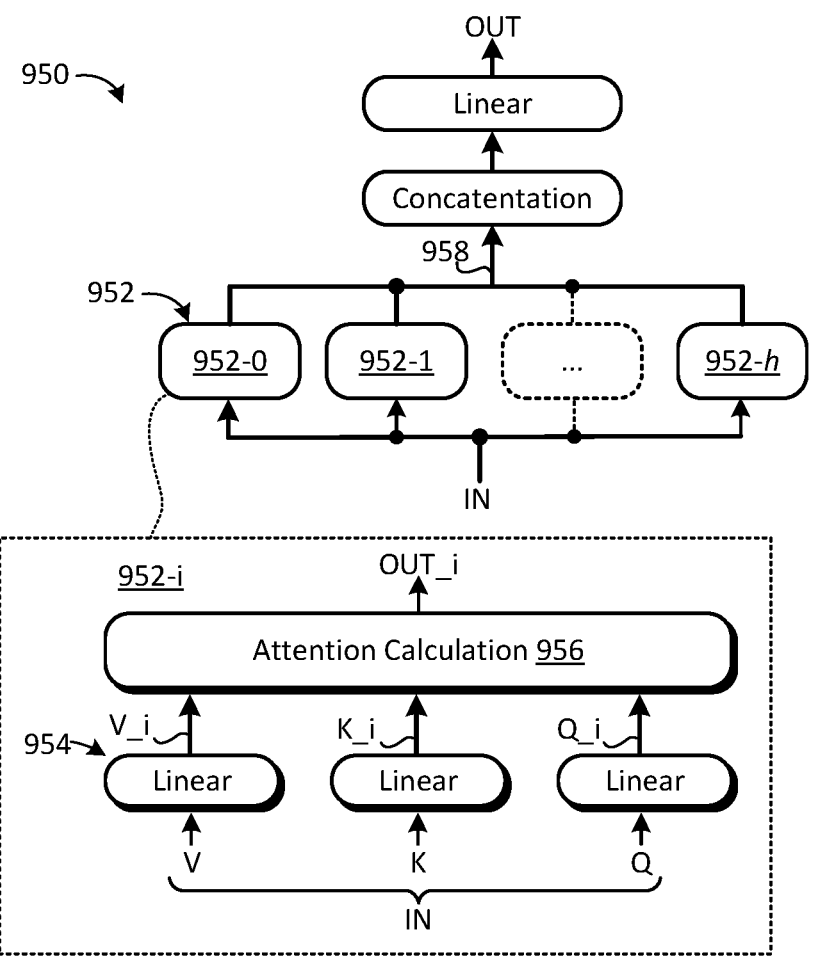
FIG. 9B illustrates another example of an analysis module configured for instruction sequence transduction.

The MHSA sub-layers may implement an attention function, $$\text{Attention}(Q, K, V) = \text{softmax}\left(\frac{QK^T}{\sqrt{d_k}}\right)V,$$

where Q is a query matrix, K and V are key-value pairs of dimension $d_k$ (e.g., 505). In some implementations, the encoder/decoder layers 932/942 may be configured to implement a plurality of MHSA functions in parallel. FIG. 9B illustrates an example of an MHSA sub-layer 950. The MHSA sub-layer 950 may implement the MHSA sub-layer of an encoder layer 932, decoder layer 942, or the like. The MHSA sub-layer 950 may comprise a plurality of attention modules 952 (attention modules 952-0 through 952-h), each configured to implement an attention function on a respective one of h linear projections of input quantities V, K, and Q. As illustrated, each attention module 952-i may receive inputs (IN) comprising V, K, and Q quantities, and implement respective linear projections to $d_q$, $d_k$, and $d_v$ dimensions using respective projection modules 954 resulting in $V_i$, $K_i$, and $Q_i$. An attention calculation module 956 implements an attention function on the projected quantities yielding an output (OUT_i). The attention calculation module 956 may implement any suitable attention function, such as an additive attention function, a dot-product attention function, a scaled dot-product attention function, and/or the like. In the FIG. 9B example, attention modules 952-0 through 952-h may yield $d_v$-dimensional output values 958, which may be concatenated and projected to produce an output value (OUT) of the MHSA sub-layer 950 (by the illustrated concatenation and linear projection modules).

Referring back to FIG. 9A, each encoder/decoder layer 932/942 may comprise a fully connected feed-forward network (a feed forward network). The feed forward network may implement two linear transformations with rectified linear unit (ReLU) activation therebetween, such that fully connected, feed-forward network is applied to each position separately and substantially identically. The linear transformations may utilize different parameters from layer 932/942 to layer 932/942. The feed forward networks may be described as implementing two convolutions with a kernel size of 1, input/output dimensionality of $d_{model}$ (e.g., 505), and inner-layer dimensionality dff of 4 $d_{model}$ (e.g., 2048).

The positional encoding modules 923 and 925 may be configured to inject information pertaining to the relative and absolute position of tokens in the input sequence (e.g., relative and absolute position of instruction tokens 852 within instruction features 850). The position encoding modules 923 and 925 may incorporate positional encodings into the input and output embeddings 922/924. The positional encodings may have substantially the same dimension as the embeddings ($d_{model}$), which may enable the positional encodings and embeddings to be combined through a sum or other operation. The position encoding modules 923/925 may implement any suitable positional encoding technique (e.g., a geometric progression of sine and cosine functions of different frequencies).

The MLIE transformer 820 may further comprise a linear transform module (linear module 926) and softmax module 928. The linear module 926 and softmax module 928 may implement a learned linear transformation and softmax function to covert outputs of the decoder 940 to predicted next-token probabilities of the IET output 855.

In some implementations, the analysis module 116 may further comprise and/or be coupled to an instruction encoding transformer (IET) training engine 880. The IET training engine 880 may comprise and/or be coupled to an IET training dataset 881 comprising a plurality of IET entries 882 (IET entries 882A-U). The IET entries 882 may comprise instruction features 850 derived from respective function components 456 of CIL representations 120 of respective binaries 105. The IET training dataset 881 may comprise a vast number of entries covering binaries 105 configured for operation on a plurality of different computing architectures. The IET training engine 880 may utilize the IET training dataset 881 to cause the MLIE transformer 820 to learn a transformer-based language model (e.g., learn instruction token 852 sequences). The IET training engine 880 may implement any suitable training algorithm or technique.

The analysis module 116 may be configured to process the CIL representation of a binary 105. The CIL representation 120 may be generated by a normalization module 114 of the binary analysis platform 110, as disclosed herein. The CIL representation 120 may include a binary component 454 comprising a plurality of function components 456, each function component representing a respective function implemented by the binary 105. The instruction encoder 810 may be configured to derive instruction features 850 from the CIL representation 120. The instruction features 850 may comprise IV sets 856, each IV set 856 corresponding to a respective function component 456 of the CIL representation 120. Each IV set 856 may comprise a set of instruction vectors 854, each instruction vector 854 comprising a sequence of instruction tokens 852 derived from a respective CIL instruction 444 of the corresponding function component 456. The analysis module 116 may input the instruction features 850 into the MLIE transformer 820, which may produce IET outputs 855, which may indicate the degree to which the instruction sequences of the IV sets 856 conform to the learned instruction sequences. Alternatively, or in addition, the IET outputs 855 may identify expected instruction sequences and/or an error, difference, and/or distance between the instruction sequences characterized by the instruction features 850 and the expected instruction sequences.

Figure 10A:
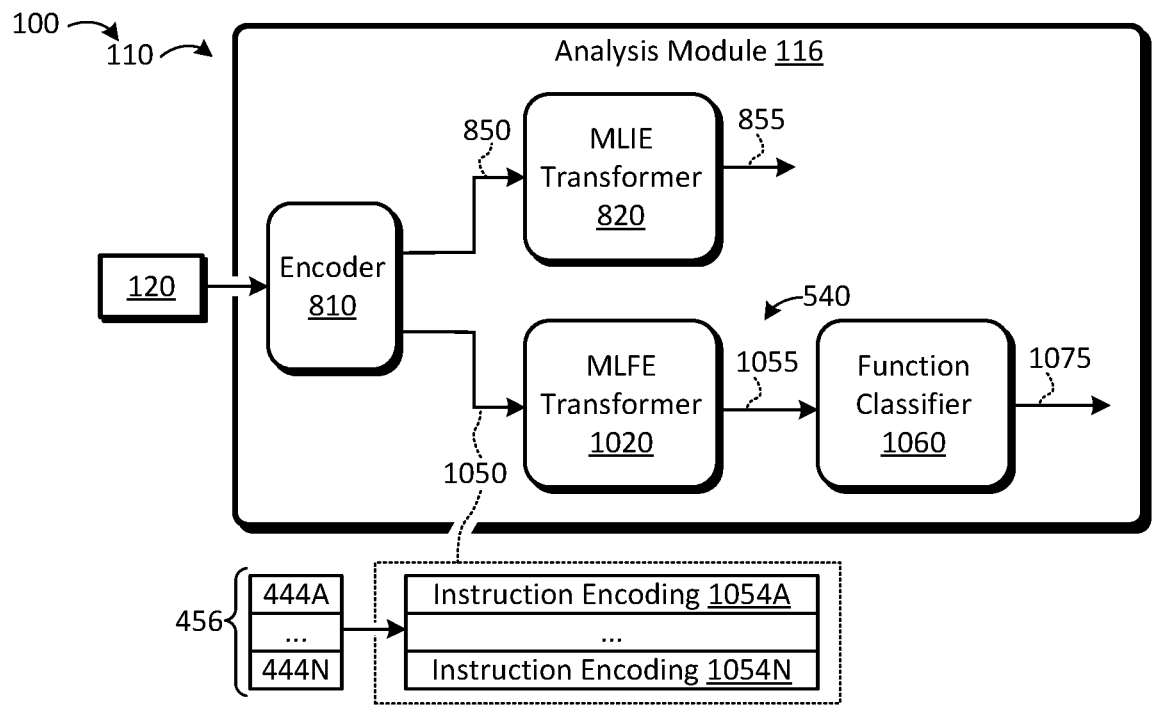
FIG. 10A illustrates an example of an analysis module configured for instruction and function transduction.

FIG. 10A illustrates another example of an analysis module 116. In the FIG. 10A example, analysis module 116 may be configured to implement aspects of instruction and/or function transduction. The analysis module 116 may comprise and/or be coupled to a plurality of components including an encoder 810, MLIE transformer 820, ML function encoding (MLFE) transformer 1020, and/or function classifier 1060. In some aspects, the components may be implemented and/or embodied by the binary analysis platform 110. The components of the analysis module 116 may be configured for operation on computing resources 102 of the operating environment (and/or system 100) illustrated in FIG. 1A. Portions of the components may be implemented and/or embodied by computer-readable code stored on a non-transitory storage medium (e.g., NV storage of the computing device 104, the computing system 604, or the like). Alternatively, or in addition, portions of the components may be implemented by hardware, such as application-specific circuitry, programmable circuitry, and/or the like.

Figure 10B:
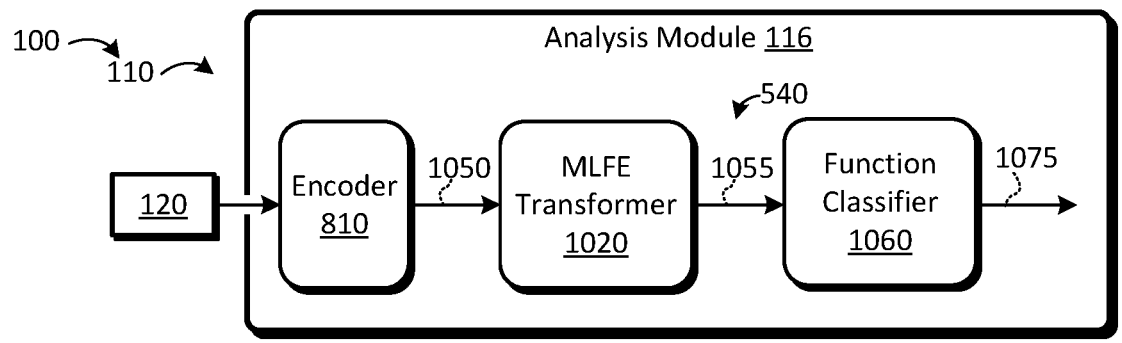
FIG. 10B illustrates another example of an analysis module configured for instruction and function transduction.

The encoder 810 may be configured to extract instruction features 850 from the CIL representation 120 of a binary 105 and the MLIE transformer 820 may be configured to produce IET outputs 855 responsive to the instruction features 850, as disclosed herein. As illustrated in FIG. 10B, in some implementations, the analysis module 116 may not include an MLIE transformer 820 (may include an encoder 810, FE transformer, and function classifier 1060).

The MLFE transformer 1020 may be configured to process instruction sequences 1050, each comprising a respective sequence of instruction encodings 1054. In some implementations, the instruction sequences 1050 may correspond to respective functions (and/or function components 456). In the FIG. 10A example, the illustrated instruction sequence 1050 may correspond to a function component 456 comprising N CIL instructions 444 (CIL instructions 444A through 444N). The instruction sequence 1050 generated for the function component 456 may, therefore, comprise N instruction encodings 1054; e.g., instruction encodings 1054A through 1054N, each corresponding to a respective one of the CIL instructions 444A through 444N. In some implementations, the instruction encodings 1054 may comprise instruction vectors 854; each instruction encoding 1054 may comprise a sequence of instruction tokens 852 extracted from the corresponding CIL instruction 444. In these implementations, the instruction sequences 1050 may comprise respective IV sets 856 (e.g., IV sets 856 corresponding to respective function components 456).

The MLFE transformer 1020 may be configured to implement aspects of ML sequence transduction. The MLFE transformer 1020 may be further configured to produce CIL features 540, such as function encodings 1055, as disclosed in further detail herein. The MLFE transformer 1020 may comprise and/or implement an ML transformer model configured to receive sequences of instruction encodings 1054 (instruction sequences 1050) and, in response, learn how the instructions co-occur. The MLFE transformer 1020 may comprise a multi-head attention layers, each attention head configured to focus on how entire instructions interact with other functions. The MLFE transformer 1020 may be configured to generate CIL features 540 configured to characterize binaries 105 and/or respective functions implemented by the binaries 105 (respective function components 456). The CIL features 540 may comprise function encodings 1055. The MLFE transformer 1020 may generate function encodings 1055 responsive to instruction sequences 1050, the function encodings 1055 configured to characterize functions (and/or function components 456) associated with the instruction sequences 1050.

Figure 10C:
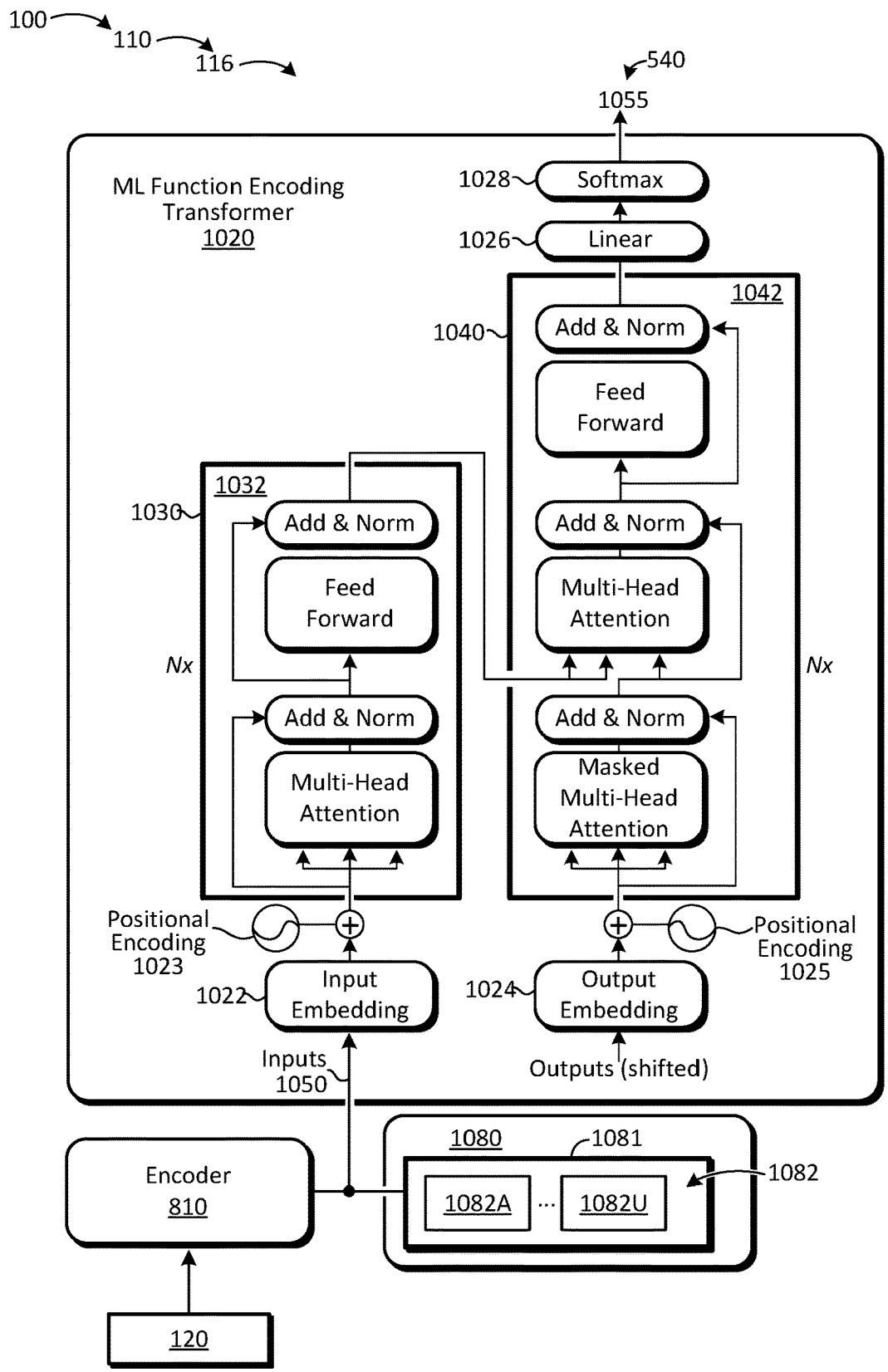
FIG. 10C illustrates an example of a function encoding transformer.

FIG. 10C illustrates an example of an MLFE transformer 1020. The MLFE transformer 1020 may implement a transformer neural network. The MLFE transformer 1020 may comprise an input embedding module 1022 and output embedding module 1024, which may be configured to utilize learned embeddings to convert input instruction sequences 1050 (e.g., sequences of instruction encodings 1054) into vectors of a selected dimension ($d_{model}$), which comprise a 505 byte array. The MLIE transformer 820 may further comprise an encoder 1030 and decoder 1040, which may be similar to the encoder/decoder 930/940 described above in conjunction with FIG. 9A.

The MLFE transformer 1020 may include positional encoding modules 1023 and 1025 configured to inject information pertaining to the relative and absolute position of tokens in the input sequence, as disclosed herein (e.g., relative and absolute position of instruction encodings 1054 within respective instruction sequences 1050).

The linear transform module (linear module 1026) and softmax module 1028 may be configured to implement a learned linear transformation and softmax function to covert outputs of the decoder 1040 into function encodings 1055. The function encodings 1055 may comprise a byte array of dimensions $d_{model}$ (e.g., a 505-byte array). The function encodings 1055 determined for respective function components 456 may be maintained in the datastore 130 (e.g., in metadata pertaining to respective function components 456). Alternatively, or in addition, the function encodings 1055 may be included in respective function nodes 656 (in the graph store 630).

Referring back to FIG. 10A, the analysis module 116 may further comprise a function classifier 1060. The function classifier 1060 may be configured quantify function similarity. More specifically, the function classifier 1060 may be configured to quantify a degree of similarity between functions (or function components 456). The degree of similarity may be inversely proportional to an error, difference, distance, edit distance, or other value quantifying deviation between function encodings 1055 of the function components 456 (deviation between respective 505-byte arrays).

In some implementations, the analysis module 116 may further comprise and/or be coupled to a function encoding transformer (FET) training engine 1080. The FET training engine 1080 may comprise and/or be coupled to an FET training dataset 1081 comprising a plurality of FET entries 1082 (FET entries 1082A-U). The FET entries 1082 may comprise instruction sequences 1050 derived from respective function components 456 of CIL representations 120 of respective binaries 105. The FET training dataset 1081 may comprise a vast number of entries covering binaries 105 configured for operation on a plurality of different computing architectures. The FET training engine 1080 may utilize the FET training dataset 1081 to cause the MLFE transformer 1020 to learn how instructions co-occur, interact with other functions, and/or the like. The FET training engine 1080 may implement any suitable training algorithm or technique.

Figure 11:
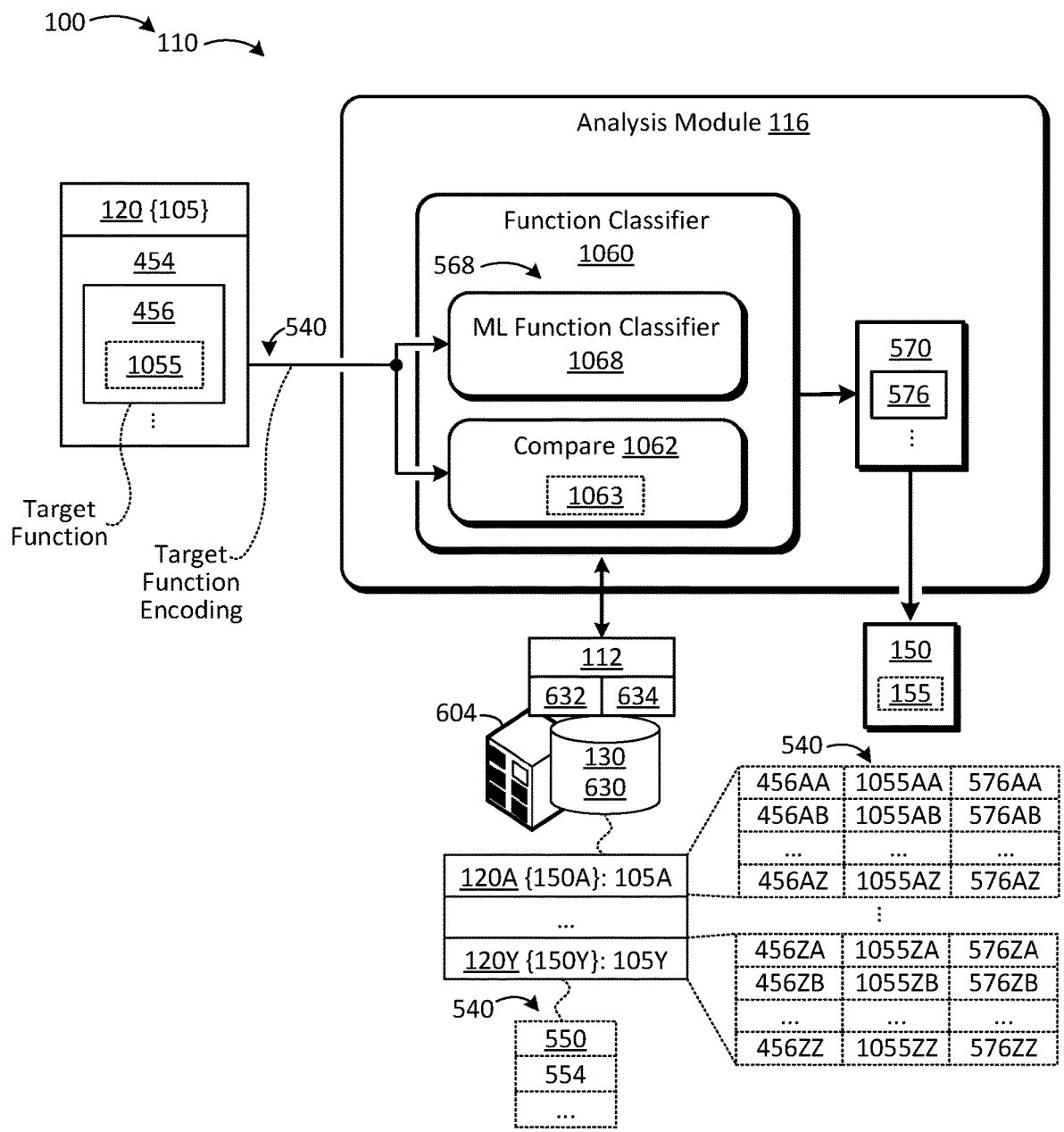
FIG. 11 illustrates an example of a function classifier.

FIG. 11 illustrates an example of a function classifier 1060 of an analysis module 116. The function classifier 1060 may be configured to implement function classification operations. The function classification operations may comprise assigning classifications 570 to binaries 105, assigning FC classifications 576 to specified function components 456 (or function nodes 656), identifying function component(s) 456 that match (and/or are determined to be functionally similar) to specified function components 456, and/or the like. The function classifier 1060 may be implemented and/or embodied by an analysis module 116 of a binary analysis platform 110. The function classifier 1060 may be configured for operation on computing resources 102 of the operating environment (and/or system 100) illustrated in FIG. 1A. Portions of the function classifier 1060 may be implemented and/or embodied by computer-readable code stored on a non-transitory storage medium (e.g., NV storage of the computing device 104, the computing system 604, or the like). Alternatively, or in addition, portions of the function classifier 1060 may be implemented by hardware, such as application-specific circuitry, programmable circuitry, and/or the like.

The function classifier 1060 may be communicatively coupled to a datastore 130 of the binary analysis platform 110 through, inter alia, an interface 112. The datastore 130 may comprise analysis data 150 pertaining to a plurality of binaries 105. In some implementations, the datastore 130 may comprise and/or implement a graph store 630, as disclosed herein. The datastore 130 may comprise analysis data 150 pertaining to respective binaries, which may comprise analysis data 150 and/or features 540 for respective binaries 105 (and/or components 452 thereof). In the FIG. 11 example, the datastore 130 comprises analysis data 150A-Z pertaining to respective binaries 105A-Z. The analysis data 150 of each binary 105 may comprise information pertaining to function components 452, such as function components 456AA-AZ of binary 105A, function components 456ZA-ZZ of binary 105Z, and so on. The analysis data 150 may further include features 540, such as function encodings 1055.

The CIL feature 540 (target function encoding 1055) may be derived from the target function component 456 by an encoder 810 and/or MLFE transformer 1020 of the analysis module 116, as disclosed herein. In some implementations, the CIL representation 120 may comprise a graph representation 620 and the target function encoding 1055 may be maintained within a function node 656 associated with the target function component 456.

The function classifier 1060 may comprise and/or be coupled to a compare module 1062, which may be configured to identify functionally similar components 452 based, at least in part, on encodings of the components 452. The compare module 1062 may be configured to identify matching (or similar) function components 456 based, at least in part, on comparisons between function encodings 1055 of the function components 456.

In some implementations, the compare module 1062 may implement and/or utilize search functionality. The compare module 1062 may utilize and/or implement aspects of a search engine 634, as disclosed herein. Identifying function components 456 that match the target function component 456 may comprise searching the function encodings 1055A-Z maintained within the datastore 130. The compare module 1062 may identify function component(s) 456 with function encodings 1055 that match the target function encoding 1055 (if any) as "matching" or "exact match" function components 456. If the compare module 1062 identifies a matching function component 456, the matching function component 456 may be included and/or referenced in the resulting classification output 1075. The classification output 1075 may assign the FC classification 576 of the matching function component 456 to the target function component 456.

If no matching function components are identified, the compare module 1062 may be configured to attempt to identify a function component 456 having a similar function encoding 1055 within the datastore 130. As used herein, "similar" function encodings 1055 refer to function encodings 1055 having an error metric 1063 within a similarity threshold. The error metric 1063 may quantify an error, difference, deviation, distance, edit distance, and/or other quantity between the function encodings 1055. The compare module 1062 may be configured to determine error metrics 1063 between the target function encoding 1055 and one or more of the function encodings 1055A-Z within the datastore 130 and identify a similar function encoding 1055 to the target function encoding 1055 in response to determining that the corresponding error metric 1063 satisfies the similarity threshold (e.g., is at or below a similarity error threshold).

If the compare module 1062 identifies a similar function component 456, the similar function component 456 may be included and/or referenced in the resulting classification output 1075. The classification output 1075 may assign the FC classification 576 of the similar function component 456 to the target function component 456. The classification output 1075 may be further configured to indicate that the similar function component 456 was not an exact match and/or include the error metrics 1063 determined for the similar function component 456. In some implementations, a confidence of the FC classification 576 assigned to the target function component 456 may be adjusted based, at least in part, on the error metrics 1063 (e.g., with higher error metrics 1063 resulting in lower confidence quantities and lower error metrics 1063 resulting in higher confidence quantities).

Figure 12A:
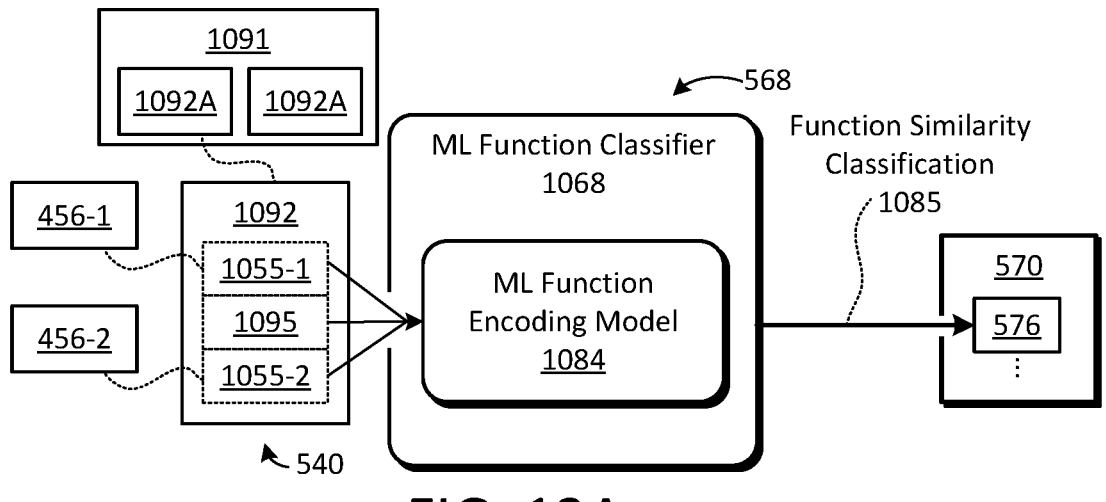
FIG. 12A illustrates an example of a ML function classifier.

Alternatively, if no exact matches for the target function component 456 are identified, the function classifier 1060 may attempt to identify a similar (or equivalent) function component by use of an ML component classifier 568. In the FIG. 11 example, the ML component classifier 568 comprises an ML function classifier 1068. As illustrated in FIG. 12A, the ML function classifier 1068 may comprise and/or be coupled to an ML function encoding (MLFE) model 1084, which may be trained to learn functional similarities between respective function encodings 1055. More specifically, the MLFE model 1084 may be configured to learn how differences between function encodings 1055 correlate with functional similarities (and/or differences) between the corresponding function components 456. The MLFE model 1084 may implement any suitable ML technique, architecture, or algorithm including, but not limited to: ANN, AdaBoost, Random Forest, clustering algorithm, kNN, Tree, SVM, Naïve Bayes, Logistic Regression, and/or the like.

The MLFE model 1084 may be trained using an MLFE training dataset 1091 comprising a plurality of MLFE training entries 1092, each comprising a plurality of different function encodings 1055 (e.g., a pair of function encodings 1055-1 and 1055-2) and a validated or trusted similarity (TS) classification 1095. The TS classification 1095 may quantify a functional similarity between the function components 456 associated with the function encodings 1055-1 and 1055-2 (a functional similarity between functional components 456-1 and 456-2). The TS classification 1095 may quantify functional similarity as a value between 0 and 1, with 1 being highly similar or equivalent and 0 being dissimilar. Alternatively, or in addition, the TS classification 1095 may quantify similarity using labels, symbols, or the like. The MLFE model 1084 may be trained to accurately replicate the TS classifications 1095 of the MLFE training entries 1092, as disclosed herein. More specifically, the MLFE model 1084 may be trained to output function similarity (FS) classifications 1085 that match (and/or are within an accuracy threshold) of the TS classifications 1095 of the MLFE training entries 1092. The MLFE model 1084 may be trained, refined, tested, and/or validated using any suitable training and/or optimization algorithm including, but not limited to: gradient descent, batch gradient descent, stochastic gradient descent, Adam optimization, or the like.

Figure 12B:
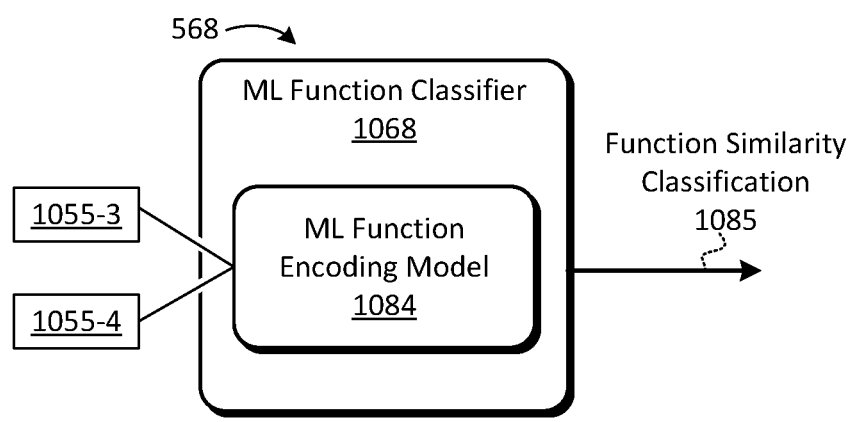
FIG. 12B illustrates another example of an ML function classifier.

As illustrated in FIG. 12B, the MLFE model 1084 may be trained to produce FS classifications 1085 that accurately quantify the similarity between function components 456 in response to function encodings 1055 determined for the function components 456. In the FIG. 12B example, the FS classification 1085 may quantify the functional similarity between function components 456-3 and 456-4 based on the function encodings 1055-3 and 1055-4 derived therefrom.

Referring back to FIG. 11, the ML function classifier 1068 may be configured to identify function components 456 that are functionally similar to the target function component 456. The ML function classifier 1068 may be configured to determine FS classifications 1085 to quantify the similarity between the target function component 456 and one or more of the function components 456A-Z within the datastore 130. The ML function classifier 1068 may detect functional similarity based, at least in part, on the FS classifications 1085 (e.g., based on the classification label, similarity quantity, or the like). The classification output 1075 may assign the FC classification 576 of the similar function component 456 identified by the ML function classifier 1068 to the target function component 456. The classification output 1075 may be further configured to indicate that the similar function component 456 was not an exact match, include error metrics 1063 determined for the similar function component 456 (if any), include the FS classification 1085 determined for the similar function component 456, and/or the like. In some implementations, a confidence of the FC classification 576 assigned to the target function component 456 may be adjusted based, at least in part, on the error metrics 1063 and/or FS classification 1085 (e.g., less confident FS classifications 1085 resulting in lower confidence quantities and more confident FS classifications 1085 resulting in higher confidence quantities).

FIG. 13 is a flow diagram of an example of a method 1300 for architecture-independent binary analysis and, in particular, for determining a computing architecture of a binary 105. Portions of the method 1300 (and other methods, procedures, and/or operations disclosed herein) may be implemented by the binary analysis device 101 and/or components of the binary analysis platform 110. Portions of the method 1300 (and other methods, procedures, and/or operations disclosed herein) may be implemented and/or embodied by computer-readable instructions stored on a non-transitory storage medium (e.g., may be implemented and/or embodied by software modules maintained within NV storage). Alternatively, or in addition, portions of the method 1300 (and other methods, procedures, and/or operations disclosed herein) may be implemented and/or embodied by hardware, such as a processor, a CPU, an AILC, an FPGA, circuitry, logic circuitry, programmable logic, and/or the like.

Step 1310 may comprise selecting segments 205 of the binary 105 for computing architecture analysis. Step 1310 may comprise identifying segments 205 of the binary 105 from which information pertaining to the computing architecture of the binary 105 may be determined (e.g., identifying suitable segments 205 and/or filtering unsuitable segments 205, as disclosed herein). Step 1310 may comprise identifying code segments 205 of the binary 105 (e.g., distinguishing the code segments 205 from unsuitable segments 205 comprising encrypted data, constants, data, or the like). The segments 205 may be selected by use of an entropy profiler 214, which may divide the binary 105 into a plurality of segments 205, as disclosed herein. The binary 105 may be divided into respective segments 205 based, at least in part, on entropy metrics 235 determined within the respective segments 205 (e.g., the segments 205 may include contiguous portions of the binary 105 having same or similar entropy metrics 235, such as entropy metrics 235 within a threshold). Step 1310 may comprise identifying suitable segments 205 of the binary 105 by, inter alia, selecting segments 205 of the binary 105 having entropy metrics 235 between a first, high-entropy threshold and a second, low-entropy threshold. Alternatively, or in addition, step 1310 may comprise filtering or omitting unsuitable segments 205 of the binary 105. The unsuitable segments 205 may be identified as having entropy metrics 235 that are at or above the first, high-entropy threshold and/or are at or below the second, low-entropy threshold.

Step 1320 may comprise extracting one or more CA features 225 from the selected segments 205 of the binary 105 (e.g., from the segments 205 of the binary 105 selected at 1310). The CA features 225 may comprise byte histogram(s) determined within respective segments 205 of the segments 205 identified at step 1310. In some implementations, extracting the CA features 225 may comprise forming a plurality of windows or blocks from the identified segments 205 (BD blocks 315). The BD blocks 315 may be configured to have a substantially same or uniform size. In some implementations, each BD block 315 may comprise about 10 KB of contiguous data of a segment 205. The BD blocks 315 may be further configured to overlap with one or more other proximate or adjacent BD blocks 315. In some implementations, each BD block 315 may be configured to have about 50% overlap with adjacent BD blocks 315. Extracting the CA features 225 at 1320 may comprise determining byte histogram(s) within respective BD blocks 315. In some implementations, step 1320 may comprise extracting a plurality of CA features 225 from the binary 105, each CA feature 225 comprising a byte histogram calculated within a respective BD block. Alternatively, or in addition, step 1320 may comprise generating CA feature(s) 225 covering a plurality of BD blocks 315. Step 1320 may comprise producing a CA feature 225 that comprises, incorporates, and/or is derived from byte histograms calculated across a plurality of DB blocks 315. A CA feature 225 extracted at 1320 may comprise a combination of byte histograms calculated within respective BD blocks 315 of a plurality of BD blocks 315, such as an average, mean, or other combination or aggregation.

In some implementations, step 1320 may further comprise determining an endianness of the binary 105. The endianness of the binary 105 may be determined based, at least in part, on byte pairs corresponding to increments of one (0x0001 vs 0x0100) and/or decrements of one (0xFFFE vs 0xFEFF) within the binary 105 (and/or within suitable segments 205 of the binary 105). The increments and/or decrements may be counted within the segments 205 selected at 1310 (e.g., within opcode or code segments 205 of the binary 105). The endianness of the binary 105 may be based the quantity of increments corresponding to a BE endianness (e.g., 0x0001) versus increments corresponding to a LE endianness (e.g., 0x0100). A higher quantity of BE increments versus LE increments may indicate that the binary 105 corresponds to a BE format whereas a lower quantity of BE increments versus LE increments may indicate that the binary 105 corresponds to an LE format.

Step 1330 may comprise utilizing the CA feature(s) extracted at step 1320 to determine the computing architecture of the binary 105. Step 1330 may comprise generating CA metadata 250 for the binary 105. The CA metadata 250 may be determined by an MLCA classifier 220, as disclosed herein. Determining the CA metadata 250 for the binary 105 at 1330 may comprise: a) providing CA input data 325 to the MLCA classifier 220 (and/or MLCA model 320 thereof), and b) configuring the MLCA classifier 220 to produce CA metadata 250 responsive to the provided CA input data 325. The CA input data 325 may comprise the one or more CA features 225 determined at 1320. In some implementations, the CA input data 325 may further indicate the endianness of the binary 105 determined at 1320. The MLCA model 320 may be trained to produce CA classifications 350 responsive to CA input data 325. The CA classification 350 determined responsive to the CA features 225 extracted from the binary 105 may identify the computing architecture of the binary 105. The CA metadata 250 for the binary 105 may comprise, incorporate, and/or be derived from the CA classification 350.

In some implementations, step 1330 may comprise providing the CA input data 325 to a plurality of MLCA models 320 (e.g., providing the CA input data 325 to MLCA models 320A-N), configuring the plurality of MLCA models 320 to produce respective architecture estimates, and combining the architecture estimates produced by respective MLCA models 320 of the plurality of MLCA models 320 to determine the CA classification 350 for the binary 105.

The MLCA model(s) 320 utilized in step 1330 may be configured to implement any suitable ML algorithm, technique, or architecture such as ANN, AdaBoost, Random Forest, clustering algorithm, kNN, Tree, SVM, Naïve Bayes, Logistic Regression, and/or the like. The MLCA model(s) 320 may be trained to distinguish computing architectures of a plurality of computing architectures, as disclosed herein. The MLCA model(s) 320 may be trained using one or more CA training datasets 381, each comprising CA training entries 382 having respective CA features 225 and corresponding CA labels 340. The CA features 225 of the CA training entries 382 may be extracted from binaries 105 corresponding to known, predetermined computing architectures. The CA labels 340 may indicate the known, predetermined computing architectures of the binaries 105 from which the CA features 225 were extracted (e.g., may comprise a ground truth or "true" CA classification 350 of the CA features 225). In some implementations, step 1330 may comprise training one or more MLCA model(s) 320 to accurately reproduce CA labels 340 of CA training entries 382 responsive to CA features 225 of the CA training entries 382. Alternatively, step 1330 may comprise configuring the one or more MLCA model(s) 320 to implement a previously learned ML configuration (e.g., implement an ML configuration learned in a previous training process or procedure).

FIG. 14 illustrates a flow diagram of an example of a method 1400 for architecture-independent binary analysis. The method 1400 may be configured to implement aspects of architecture-independent analysis pertaining to a binary 105. Step 1410 may comprise generating an CIL representation 120 of the binary 105. Generating the CIL representation 120 may comprise: a) selecting an architecture-specific module 404 for the binary 105 from a plurality of architecture-specific modules 404 (from architecture-specific modules 404A-N), b) producing an AIL representation 115 of the binary 105 by use of the selected architecture-specific module 404, c) and generating the CIL representation 120 of the binary 105 based, at least in part, on the AIL representation 115.

At 1410, the architecture-specific module 404 may be selected based on the computing architecture of the binary 105 (e.g., based on the computing architecture on which the binary 105 is configured to operate). The architecture-specific module 404 may be selected based on CA metadata 250 associated with the binary 105. The CA metadata 250 may be determined by a CA analysis module 216, as disclosed herein (e.g., may be determined per method 1300 illustrated in FIG. 13).

Producing the AIL representation 115 of the binary 105 at 1410 comprise decompiling, disassembling, and/or otherwise converting the binary 105 into an AIL representation 115 by use of the selected architecture-specific module 404. The architecture-specific module 404 may comprise and/or correspond to one or more of a decompiler, disassembler, assembler lifter, debugger, memory analyzer, execution tracer, and/or the like.

Generating the CIL representation 120 of the binary 105 at 1410 may comprise transforming the AIL representation 115 into normalized, architecture-independent representation data. Generating the CIL representation 120 may comprise transforming AIL code 431 of the AIL representation 115 into CIL code 441. Step 1410 may comprise converting AIL instructions 434 into respective groups of one or more CIL instructions 444. Step 1410 may comprise defining an CIL syntax 440 and/or CIL opcode vocabulary 445 configured to define one-to-M translations between AIL instructions 434 (and/or AIL opcodes 436) and CIL instructions 444 (and/or CIL opcodes 446) for each AIL syntax 430 of a plurality of AIL syntaxes 430A-N. The CIL syntax 440 may be configured such that each AIL instruction 434 (and/or AIL opcode 436) of each AIL syntax 430A-N may be converted into at least one CIL instruction 444 (and/or CIL opcode 446). In some implementations, generating the CIL representation 120 at 1410 comprises transforming respective AIL instructions 434 into corresponding CIL instructions 444. Alternatively, or in addition, generating the CIL representation 120 may comprise walking an AST 433 and emitting CIL instruction(s) 444 for each AST node 435 and/or AST edge 437 thereof.

Step 1410 may further comprise managing the size of the CIL vocabulary 443 of the CIL representation 120. In some implementations, the size of the CIL vocabulary 443 may be limited by, inter alia, ignoring and/or omitting memory addresses referenced by and/or within AIL representation 115. The CIL code 441 of the CIL representation 120 may include CIL opcodes 446 corresponding to respective AIL opcodes 436 but may omit CIL arguments 448 corresponding to respective AIL arguments 438. The CIL vocabulary 443 may, therefore, comprise an CIL opcode vocabulary 445 configured to span the AIL opcode vocabularies of each AIL syntax 430A-N and may omit an CIL argument vocabulary 747 corresponding to the AIL argument vocabulary of the AIL representation 115.

Alternatively, step 1410 may comprise representing memory addresses and other values of the AIL representation 115 with CIL tokens 442 within the CIL representation 120. In these implementations, generating the CIL representation 120 may comprise capturing and/or preserving additional semantic and/or structural pertaining to the binary 105. Step 1410 may comprise disambiguating memory addresses and other data referenced within the AIL representation 115, such as, function calls, variables, local variables, global variables, constants, internal dependencies, external dependencies, remote dependencies, and/or the like. The disambiguated memory addresses (and/or other data) may be represented by a limited number of unique CIL tokens 442 of the CIL vocabulary 443 (by unique CIL tokens defined within an CIL argument vocabulary 747). The utilization and/or semantics of respective memory addresses and/or other data may be determined through various techniques, including static analysis, as disclosed herein.

Step 1420 may comprise extracting a feature 540 for the binary CIL representation 120 of the binary 105 generated at 1410 (an CIL feature 540). The feature 540 may be configured to characterize the binary 105 and/or one or more functions implemented by the binary 105 (one or more function components 456). The feature 540 may comprise one or more feature vector(s) 550 or fingerprint(s), instruction encoding(s) 850, function encoding(s) 1055, and/or the like. In a first example, extracting the feature 540 may comprise extracting an opcode feature vector 550 from CIL code 441 of the CIL representation 120, as disclosed herein. In the first example, the feature 540 may be configured to quantify CIL opcodes 446 within respective components 452 of the CIL representation 120 (e.g., within respective code-block components 458, function components 456, binary components 454, and/or the like). In a second example, generating the feature 540 may comprise determining one or more instruction encodings (instruction features 850) by use of an encoder 810, transforming the instructions (by an MLIE transformer 820), and/or the like. In a third example, the feature 540 generated at 1420 may comprise one or more function encodings 1055. The function encodings 1055 may be generated by processing instruction encodings 850 of respective function components 456 by an MLFE transformer 1020, as disclosed herein. Step 1420 may comprise generating a plurality of function encodings 1055, each configured to characterize a respective function implemented by the binary 105 (e.g., characterize a respective function component 456 of the CIL representation 120 of the binary 105).

Step 1430 may comprise applying a security label 155 to the binary 105 in response to classification of the feature 540 by a machine-learning or machine-learned classifier. In a first example, step 1430 may comprise utilizing an ML classifier 560 to produce a classification 570 for the binary 105, as disclosed herein. The classification 570 may comprise and/or reference a security label 155. In the first example, step 1430 may comprise providing the feature 540 to the ML classifier 560 (e.g., inputting a feature vector 550 into the ML model 562 of the ML classifier 560), and configuring the ML classifier 560 (and/or ML model 562 thereof) to produce a classification 570 responsive to the feature vector 550. The feature vector 550 may comprise one or more component feature vectors 552, such as BC vector(s) 554, FC vector(s) 556, and/or the like. The classification 570 may comprise and/or correspond to a security label 155, as disclosed herein.

In some implementations, step 1430 may comprise identifying a binary 105 having same (or similar) features 540 as the binary 105. Step 1430 may comprise comparing features 540 extracted from the binary 105 to features 540 determined for other binaries 105 maintained within the datastore 130, e.g., compare the feature vector 550 extracted from the binary 105 at 1420 to feature vectors 550 determined for the other binaries 105. Step 1430 may comprise identifying an exact match or are within a similarity threshold. If no matches are found, step 1430 may comprise
identifying a binary 105 that matches and/or is within a proximity threshold of the binary 105. Step 1430 may comprise applying the security label 155 assigned to the matching binary 105.

In a second example, step 1430 may comprise processing instruction encodings 850 by an MLIE transformer 820, as disclosed herein. In a third example, step 1430 may comprise identifying a matching binary 105 (and/or matching function components 456) by use of the function encodings 1055 determined for the binary 105. In the third example, step 1430 may comprise searching for matching function encodings 1055 within a datastore 130 (and/or graph store 630). If no matching function encodings 1055 are identified, step 1430 may comprise identifying same (or similar) functions using an ML function classifier 1068 (and/or ML function encoding model 1084), as disclosed herein. Step 1430 may comprise applying security classifications 155 assigned to the matching (or similar) function components 456 to the binary 105 (and/or corresponding function components 456 of the binary 105).

Figure 15:
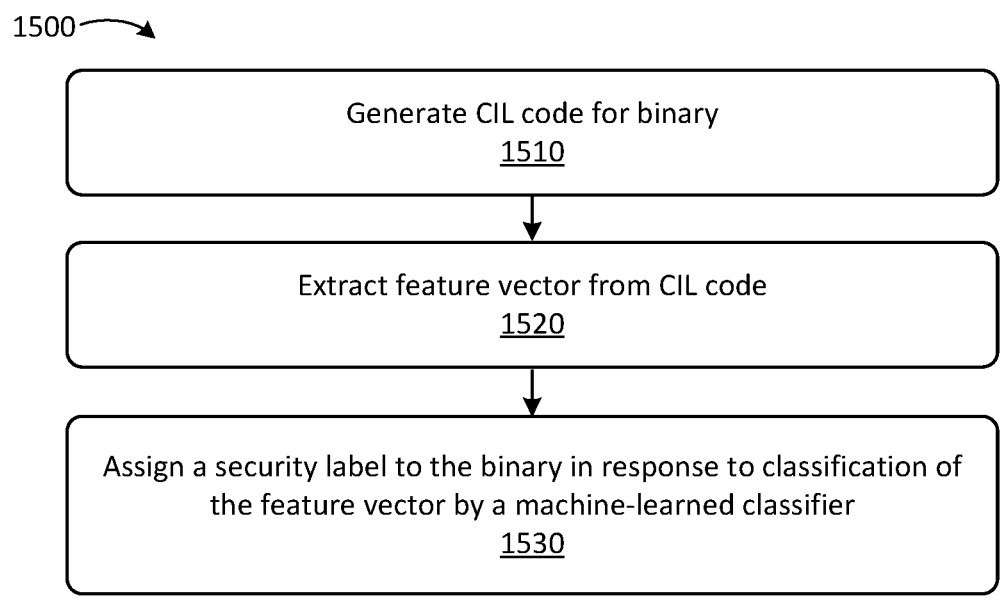

FIG. 15 is a flow diagram of another example of a method 1500 for architecture-independent binary analysis. Step 1510 may comprise generating CIL code 441 for the binary 105, as disclosed herein. Step 1520 may comprise extracting a feature vector 550 from the CIL code 441. The feature vector 550 may comprise one or more function component vectors 556, each configured to characterize a respective function of the binary 105. As disclosed herein, the function component vectors 556 may be derived from CIL instructions 444 associated with respective functions of the binary 105 (e.g., CIL instructions 444 of respective function components 456). Step 1530 may comprise assigning a security label 155 to the binary 105 in response to classification of the feature vector 550 by an ML classifier 560, as disclosed herein. The ML classifier 560 may be configured to assign security labels 155 to respective functions of the binary 105 and the security label 155 assigned to the binary 105 may be based, at least in part, on the function security labels 155.

In some implementations, the step 1510 may further comprise associating functions of the binary 105 with respective sets of CIL instructions 444 of the CIL code 441 and step 1520 may further include deriving FC vectors 556 for respective functions from the CIL instructions 444 associated with the respective functions. Step 1530 may comprise assigning the security label 155 to the binary 105 based, at least in part, on security labels 155 determined for one or more functions of the binary 105 (e.g., FC classifications 576).

In some embodiments, step 1520 may comprise determining FC vectors 556 for respective functions, each FC vector 556 based on quantities of respective opcodes within the CIL instructions 444 associated with the respective functions. For example, generating the CIL code 441 for the binary 105 may comprise identifying memory addresses within AIL instructions of the AIL code and excluding the identified memory addresses from corresponding CIL instructions of the CIL code generated for the binary.

In some implementations, generating the CIL code 441 for the binary 105 may comprise generating an AIL syntax tree representation of the binary 105 (e.g., an AST 433) and appending one or more CIL instructions 444 to the CIL code 441 in response to traversing respective nodes 435 of the AIL syntax tree. Alternatively, or in addition, generating the CIL code 441 may comprise assigning an CIL token 442 to a memory address of an AIL instruction 434 of the AIL code 431 and replacing the memory address with the assigned CIL token 442 in one or more CIL instructions 444 corresponding to the AIL instruction 434 in the CIL code 441. The CIL token 442 may be assigned to the memory address in response to resolving the memory address; the CIL token 442 may correspond to one or more of a type of the resolved memory address, a value of data associated with the resolved memory address, a name assigned to a variable associated with the resolved memory address, and a name assigned to a function at the resolved memory address.

In some implementations of the method 1500, determining a first function vector 556 for a first function of the binary 105 comprises producing instruction encodings 1054 for respective CIL instructions 444 associated with the first function, deriving a first function encoding 1055 from the determined instruction encodings 1054 by use of an MLFE transformer 1020, and assigning a security label 155 to the first function based, at least in part, on the first function encoding 1055. Producing an instruction encoding 1054 for a CIL instruction 444 may comprise parsing the CIL instruction 444 into a set of instruction tokens 852, each instruction token 852 corresponding to an entry in a vocabulary of an ML MLIE transformer 820.

In some embodiments, the method 1500 may further include identifying a second function encoding 1055 that is within a similarity threshold of the first function encoding 1055 and assigning a security label 155 to the first function of the binary 105 based, at least in part, on a security label 155 associated with the second function encoding 1055.

The binary 105 may be configured for operation within a first computing environment and the method 1500 may further include generating CIL code 441 for training binaries 105, wherein the training binaries 105 comprise functions associated with predetermined security labels 155 and are configured for operation on respective computing environments of a plurality of different computing environments, including a second computing environment different from the first computing environment; and training an ML classifier 560 by use of feature vectors 550 derived from the CIL code 441 generated for the training binaries 105 and the predetermined security labels 155. Assigning the security label 155 to the binary 105 may comprise predicting a security label 155 by use of the ML classifier 560. Alternatively, or in addition, generating the CIL code 441 for the binary 105 may comprise mapping AIL opcodes 436 of respective AIL instructions 434 to CIL opcodes 446 of corresponding CIL instructions 444 of the CIL code 441 by use of a translation layer, the translation layer comprising many-to-one mappings between opcodes of a plurality of different AIL vocabularies to CIL opcodes of a single CIL vocabulary 443. Accordingly, translating a first AIL instruction 434 of the AIL code 431 may comprise expanding the first AIL instruction 434 into a plurality of CIL instructions 444.

In some embodiments, the method 1500 may include extracting an architecture vector from a designated portion of the binary 105 (e.g., a CA feature 225), the designated portion selected based on entropy metrics determined with respective portions of the binary 105; determining an architecture of the binary 105 based on the extracted architecture vector; and selecting one of a plurality of disassemblers to generate the AIL code 431 of the binary 105 based on the determined architecture of the binary 105. The extracting may comprise defining a plurality of windows within the designated portion of the binary 105, each one of the windows overlapping at least a portion of another one of the plurality of windows; and calculating architecture vectors for respective windows of the plurality of windows, wherein calculating an architecture vector for a window comprises calculating a byte histogram within the window.

Although the subject matter has been described in language specific to structural features and/or methodological operations, it is to be understood that the subject matter defined in the appended claims is not necessarily limited to the specific examples, features, or operations described herein, including orders in which they are performed.

We claim:

1. A method for binary code security analysis, comprising:
generating canonical intermediate language (CIL) code for binary from architecture-specific, intermediate language (AIL) code of the binary;
extracting a feature vector from the CIL code; and
assigning a security label to the binary in response to classification of the feature vector by a machine-learned classifier, the security label configured to quantify a security threat associated with the binary.

2. The method of claim 1, further comprising:
associating functions of the binary with respective sets of CIL instructions of the CIL code;
deriving function vectors for respective functions of the binary from the CIL instructions associated with the respective functions; and
assigning the security label to the binary based, at least in part, on security labels determined for one or more functions of the binary.

3. The method of claim 2, further comprising determining the function vectors for the respective functions based on quantities of respective opcodes within the CIL instructions associated with the respective functions.

4. The method of claim 2, wherein determining a first function vector for a first function of the binary comprises:
producing instruction encodings for respective CIL instructions associated with the first function;
deriving a first function encoding from the instruction encodings by use of a machine-learned function encoding transformer; and
assigning a security label to the first function based, at least in part, on the first function encoding.

5. The method of claim 4, wherein producing an instruction encoding for a CIL instruction comprises parsing the CIL instruction into a set of instruction tokens, each instruction token corresponding to an entry in a vocabulary of a machine-learned instruction encoding transformer.

6. The method of claim 4, further comprising:
identifying a second function encoding that is within a similarity threshold of the first function encoding; and
assigning a security label to the first function of the binary based, at least in part, on a security label associated with the second function encoding.

7. The method of claim 1, wherein generating the CIL code for the binary comprises:
identifying memory addresses within AIL instructions of the AIL code; and
excluding the identified memory addresses from corresponding CIL instructions of the CIL code generated for the binary.

8. The method of claim 7, wherein the binary is configured for operation within a first computing environment, the method further comprising:
generating CIL code for training binaries, wherein the training binaries comprise functions associated with predetermined security labels and are configured for operation on respective computing environments of a plurality of different computing environments, including a second computing environment different from the first computing environment; and
training a machine-learned classifier by use of feature vectors derived from the CIL code generated for the training binaries and the predetermined security labels;
wherein assigning the security label to the binary comprises predicting a security label by use of the machine-learned classifier.

9. The method of claim 8, wherein generating the CIL code for the binary comprises:
mapping AIL opcodes of respective AIL instructions to CIL opcodes of corresponding CIL instructions of the CIL code by use of a translation layer, the translation layer comprising many-to-one mappings between opcodes of a plurality of different AIL vocabularies and CIL opcodes of a single CIL vocabulary;
wherein translating a first AIL instruction of the AIL code comprises expanding the first AIL instruction into a plurality of CIL instructions.

10. The method of claim 1, wherein generating the CIL code for the binary comprises:
generating an AIL syntax tree representation of the binary; and
appending one or more CIL instructions to the CIL code in response to traversing respective nodes of the AIL syntax tree.

11. The method of claim 10, wherein generating the CIL code from the AIL code of the binary comprises:
assigning a CIL token to a memory address of an AIL instruction of the AIL code; and
replacing the memory address with the assigned CIL token in one or more CIL instructions corresponding to the AIL instruction in the CIL code.

12. The method of claim 11, further comprising assigning the CIL token to the memory address in response to resolving the memory address, wherein the CIL token corresponds to one or more of a type of the resolved memory address, a value of data associated with the resolved memory address, a name assigned to a variable associated with the resolved memory address, and a name assigned to a function at the resolved memory address.

13. The method of claim 1, further comprising:
extracting an architecture vector from a designated portion of the binary, the designated portion selected based on entropy metrics determined with respective portions of the binary;
determining an architecture of the binary based on the extracted architecture vector; and selecting one of a plurality of disassemblers to generate the AIL code of the binary based on the determined architecture of the binary.

14. The method of claim 13, wherein the extracting comprises:
defining a plurality of windows within the designated portion of the binary, each one of the windows overlapping at least a portion of another one of the plurality of windows; and
calculating architecture vectors for respective windows of the plurality of windows, wherein calculating an architecture vector for a window comprises calculating a byte histogram within the window.

15. A system, comprising:
a processor coupled to a memory; and
a binary analysis platform configured for operation on the processor, the binary analysis platform comprising:
a normalization module configured to generate canonical intermediate language (CIL) code for binary from architecture-specific, intermediate language (AIL) code of the binary,
a feature module configured to determine feature vectors for respective functions of the binary based on CIL code associated with the respective functions, and
a machine-learned (ML) classifier configured to assign a security label to the binary based, at least in part, on the feature vectors determined for one or more of the functions, the security label configured to quantify a security threat associated with the binary.

16. The system of claim 15, wherein the function vectors of the respective functions are configured to quantify occurrences of respective opcodes within the CIL code associated with the respective functions.

17. The system of claim 15, further comprising:
an ML instruction encoding transformer configured to produce instruction encodings for respective CIL instructions of the CIL code; and
an ML function encoding transformer configured to determine function encodings for the respective functions of the binary based, at least in part, on the instruction encodings produced from CIL instructions associated with the respective functions,
wherein the ML classifier is configured to assign the security label to the binary based, at least in part, on the determined function encodings.

18. The system of claim 17, further comprising an encoder configured to parse CIL instructions of the CIL code into respective sets of instruction tokens, each instruction token corresponding to an entry in a vocabulary of the ML instruction encoding transformer, wherein producing an instruction encoding of a CIL instruction comprises processing a set of instruction tokens corresponding to the CIL instruction by the ML instruction encoding transformer.

19. The system of claim 17, wherein:
the ML function encoding transformer is configured to determine a first function encoding of a first function of the binary; and
the ML classifier is configured to identify a second function encoding that is within a similarity threshold of the first function encoding and assign the security label to the binary based, at least in part, on a security label associated with the second function encoding.

20. The system of claim 15, further comprising a many-to-one mapping layer configured to map opcodes of a plurality of different AIL vocabularies to CIL opcodes of a single CIL vocabulary, wherein the normalization module is configured to translate a first AIL instruction of the AIL code to a plurality of CIL instructions by use of the many-to-one mapping layer.

21. A non-transitory computer-readable storage medium comprising instructions configured to cause a computing device to implement operations for binary code analysis, the operations comprising:
generating canonical intermediate language (CIL) code for a binary;
extracting feature vectors for respective functions of the binary from the CIL code; and
assigning a security label to the binary based, at least in part, on classification of one or more of the feature vectors by a machine-learned (ML) classifier, the security label configured to quantify a security threat associated with the binary.

22. The non-transitory computer-readable storage medium of claim 21, the operations further comprising:
deriving architecture-specific intermediate language (AIL) code from the binary;
translating AIL instructions of the AIL code to CIL instructions of the CIL code, the translating comprising omitting arguments of AIL instructions from corresponding CIL instructions;
extracting function vectors from the CIL code, each function vector corresponding to CIL code associated with a respective function of the binary; and
assigning a security label to the binary based, at least in part, on security labels determined for one or more functions of the binary by the ML classifier.

23. The non-transitory computer-readable storage medium of claim 21, wherein determining a first function vector for a first function of the binary comprises:
parsing CIL instructions associated with the first function into respective token sequences, the token sequences comprising tokens corresponding to a vocabulary of an ML instruction encoding transformer;
processing the token sequences by the ML instruction encoding transformer to produce instruction encodings for the first function;
processing the instruction encodings by an ML function encoding transformer to determine a first function encoding of the first function; and
assigning a security label to the first function based, at least in part, on the first function encoding.

24. The non-transitory computer-readable storage medium of claim 23, the operations further comprising:
identifying a second function encoding that is within a similarity threshold of the first function encoding; and
assigning the security label to the first function of the binary based, at least in part, on a security label associated with the second function encoding.

25. The non-transitory computer-readable storage medium of claim 24, the operations further comprising configuring the ML classifier to assign a security label to the first function in response to processing the first function encoding.

* * * * *